United States Patent
Krassner et al.

(10) Patent No.: US 8,356,247 B2
(45) Date of Patent: Jan. 15, 2013

(54) CONTENT RENDERING CONTROL SYSTEM AND METHOD

(75) Inventors: Brad Krassner, Miami Beach, FL (US); Nikolai Mentchoukov, Miami Beach, FL (US); Alan Edwards, Miami Beach, FL (US); Igor Tchibirev, Miami Beach, FL (US)

(73) Assignee: Rich Media Worldwide, LLC, Miami Beach, FL (US)

( * ) Notice: Subject to any disclaimer, the term of this patent is extended or adjusted under 35 U.S.C. 154(b) by 477 days.

(21) Appl. No.: 12/589,321

(22) Filed: Oct. 21, 2009

(65) Prior Publication Data

US 2010/0153544 A1     Jun. 17, 2010

Related U.S. Application Data

(63) Continuation-in-part of application No. 12/316,781, filed on Dec. 16, 2008.

(51) Int. Cl.
*G06F 17/24* (2006.01)
(52) U.S. Cl. ....................................... 715/234
(58) Field of Classification Search ................... 715/234
See application file for complete search history.

(56) References Cited

U.S. PATENT DOCUMENTS

| | | | |
|---|---|---|---|
| 5,572,643 A | 11/1996 | Judson | |
| 5,675,510 A | 10/1997 | Coffey et al. | |
| 5,708,780 A | 1/1998 | Levergood et al. | |
| 5,710,883 A | 1/1998 | Hong et al. | |
| 5,717,860 A | 2/1998 | Graber et al. | |
| 5,732,218 A | 3/1998 | Bland et al. | |
| 5,737,619 A | 4/1998 | Judson | |
| 5,740,549 A | 4/1998 | Reilly et al. | |
| 5,796,952 A | 8/1998 | Davis et al. | |
| 5,838,790 A | 11/1998 | McAuliffe et al. | |

(Continued)

FOREIGN PATENT DOCUMENTS

JP     2002092475     3/2002

(Continued)

OTHER PUBLICATIONS

Kofman, "Implementing Dynamic Scroll with Ajax, JavaScript, and XML," Jun. 6, 2007, Developer.com.*

(Continued)

*Primary Examiner* — Laurie Ries
*Assistant Examiner* — Tionna Smith
(74) *Attorney, Agent, or Firm* — Baker Botts L.L.P.

(57) ABSTRACT

A system and method for controlling of rendering of content via electronic networks, whereby content is rendered at a content page only when and to the extent that a pre-defined area of the content page is within the viewer's browser window dimensions and scrolling position, or within a pre-defined distance outside of said browser window dimensions and scrolling position. When a viewer accesses a content page and as the viewer scrolls up or down or left or right on the page, or increases or decreases the dimensions of the viewer's browser window, content that has been designated to render in the content page area corresponding to the viewer's then current browser window dimensions and scrolling position is rendered. Content relating to areas of the content page that are not within (or within such pre-defined distance from) the viewer's browser window dimensions and scrolling position is not rendered unless or until such area is within such browser window dimensions and scrolling position or said pre-defined distance outside of same.

35 Claims, 44 Drawing Sheets

U.S. PATENT DOCUMENTS

| | | | |
|---|---|---|---|
| 5,848,396 | A | 12/1998 | Gerace |
| 5,937,390 | A | 8/1999 | Hyodo |
| 5,960,409 | A | 9/1999 | Wexler |
| 5,999,912 | A | 12/1999 | Woodarz et al. |
| 6,009,411 | A | 12/1999 | Kepecs et al. |
| 6,011,537 | A | 1/2000 | Slotznick |
| 6,041,309 | A | 3/2000 | Laor |
| 6,081,829 | A | 6/2000 | Sidania |
| 6,108,637 | A | 8/2000 | Blumenau |
| 6,112,246 | A | 8/2000 | Horbal et al. |
| 6,115,680 | A | 9/2000 | Coffee et al. |
| 6,119,165 | A | 9/2000 | Li et al. |
| 6,138,115 | A | 10/2000 | Agrawal et al. |
| 6,141,010 | A | 10/2000 | Hoyle |
| 6,167,382 | A | 12/2000 | Sparks et al. |
| 6,185,586 | B1 | 2/2001 | Judson |
| 6,205,432 | B1 | 3/2001 | Gabbard et al. |
| 6,243,865 | B1 | 6/2001 | Wei et al. |
| 6,268,856 | B1 | 7/2001 | Bruck et al. |
| 6,269,361 | B1 | 7/2001 | Davis et al. |
| 6,275,854 | B1 | 8/2001 | Himmel et al. |
| 6,279,036 | B1 | 8/2001 | Himmel et al. |
| 6,310,601 | B1 | 10/2001 | Moore et al. |
| 6,314,451 | B1 | 11/2001 | Landsman |
| 6,317,761 | B1 | 11/2001 | Landsman |
| 6,317,782 | B1 | 11/2001 | Himmel et al. |
| 6,327,619 | B1 | 12/2001 | Blumenau |
| 6,347,398 | B1 | 2/2002 | Parthasarathy et al. |
| 6,393,407 | B1 | 5/2002 | Middleton, III et al. |
| 6,418,470 | B2 | 7/2002 | Blumenau |
| 6,449,634 | B1 | 9/2002 | Capiel |
| 6,466,967 | B2 | 10/2002 | Landsman |
| 6,516,338 | B1 | 2/2003 | Landsman et al. |
| 6,553,417 | B1 | 4/2003 | Gampper |
| 6,587,837 | B1 | 7/2003 | Spagna et al. |
| 6,643,696 | B2 | 11/2003 | Davis et al. |
| 6,654,539 | B1 | 11/2003 | Duruoz et al. |
| 6,657,647 | B1 | 12/2003 | Bright |
| 6,691,281 | B1 | 2/2004 | Sorge et al. |
| 6,693,649 | B1 | 2/2004 | Lipscomb et al. |
| 6,710,790 | B1 | 3/2004 | Fagioli |
| 6,728,753 | B1 | 4/2004 | Parasnis et al. |
| 6,763,386 | B2 | 7/2004 | Davis et al. |
| 6,789,108 | B1 | 9/2004 | McMillan |
| 6,791,579 | B2 | 9/2004 | Markel |
| 6,990,630 | B2 | 1/2006 | Landsman et al. |
| 7,047,294 | B2 | 5/2006 | Johnson et al. |
| 7,120,590 | B1 | 10/2006 | Eisen et al. |
| 7,143,075 | B1 | 11/2006 | Chickering et al. |
| 7,146,401 | B2 | 12/2006 | Hansell et al. |
| 7,155,508 | B2 | 12/2006 | Sank Uratripati et al. |
| 7,155,663 | B2 | 12/2006 | Landsman et al. |
| 7,310,609 | B2 | 12/2007 | Middleton, III et al. |
| 7,313,590 | B2 | 12/2007 | Mentchoukov |
| 7,376,722 | B1 | 5/2008 | Sim et al. |
| 7,376,907 | B2 | 5/2008 | Santoro et al. |
| 7,386,473 | B2 | 6/2008 | Blumenau |
| 7,613,635 | B2 | 11/2009 | Blumenau |
| 7,716,326 | B2 | 5/2010 | Blumenau |
| 7,756,974 | B2 | 7/2010 | Blumenau |
| 2001/0029585 | A1 | 10/2001 | Simon et al. |
| 2001/0037232 | A1 | 11/2001 | Miller |
| 2002/0002491 | A1 | 1/2002 | Whitfield et al. |
| 2002/0010631 | A1 | 1/2002 | Sato et al. |
| 2002/0016736 | A1 | 2/2002 | Cannon et al. |
| 2002/0063714 | A1 | 5/2002 | Haas et al. |
| 2002/0077891 | A1 | 6/2002 | Castle et al. |
| 2002/0112005 | A1 | 8/2002 | Namias |
| 2002/0116494 | A1 | 8/2002 | Kocol |
| 2002/0120564 | A1 | 8/2002 | Strietzel |
| 2002/0124246 | A1 | 9/2002 | Kaminsky et al. |
| 2002/0141584 | A1 | 10/2002 | Razdan et al. |
| 2002/0147634 | A1 | 10/2002 | Jacoby et al. |
| 2003/0004804 | A1 | 1/2003 | Landsman et al. |
| 2003/0005000 | A1 | 1/2003 | Landsman et al. |
| 2003/0023488 | A1 | 1/2003 | Landsman et al. |
| 2003/0023489 | A1 | 1/2003 | McGuire et al. |
| 2003/0050833 | A1 | 3/2003 | Hamzy |
| 2003/0070182 | A1 | 4/2003 | Pierre et al. |
| 2003/0163372 | A1 | 8/2003 | Kolsy |
| 2003/0171985 | A1 | 9/2003 | Prabhu et al. |
| 2003/0200145 | A1 | 10/2003 | Krassner et al. |
| 2004/0030615 | A1 | 2/2004 | Ling |
| 2004/0039754 | A1 | 2/2004 | Harple, Jr. |
| 2004/0059683 | A1 | 3/2004 | Epstein et al. |
| 2004/0103426 | A1 | 5/2004 | Ludvig et al. |
| 2004/0117259 | A1 | 6/2004 | Morrisoe et al. |
| 2004/0143667 | A1 | 7/2004 | Jerome |
| 2004/0168184 | A1 | 8/2004 | Steenkamp et al. |
| 2004/0186778 | A1 | 9/2004 | Margiloff et al. |
| 2004/0205651 | A1* | 10/2004 | Dutta et al. .................. 715/530 |
| 2005/0021642 | A1 | 1/2005 | Nonaka |
| 2005/0033641 | A1 | 2/2005 | Jha et al. |
| 2005/0038900 | A1 | 2/2005 | Krassner et al. |
| 2005/0039130 | A1 | 2/2005 | Paul |
| 2005/0055277 | A1 | 3/2005 | Green |
| 2005/0091160 | A1 | 4/2005 | Kitze et al. |
| 2005/0091216 | A1 | 4/2005 | Kranz et al. |
| 2005/0108095 | A1 | 5/2005 | Perlmutter |
| 2005/0149396 | A1 | 7/2005 | Horowitz et al. |
| 2005/0182677 | A1 | 8/2005 | Hill |
| 2005/0192871 | A1 | 9/2005 | Galuten et al. |
| 2005/0204309 | A1 | 9/2005 | Szeto |
| 2005/0289475 | A1 | 12/2005 | Martin et al. |
| 2006/0136839 | A1 | 6/2006 | Makela |
| 2006/0174199 | A1* | 8/2006 | Soltis et al. .................. 715/700 |
| 2006/0224697 | A1 | 10/2006 | Norris |
| 2006/0277481 | A1 | 12/2006 | Forstall et al. |
| 2007/0033531 | A1 | 2/2007 | Marsh |
| 2007/0118640 | A1 | 5/2007 | Subramanian |
| 2007/0130602 | A1* | 6/2007 | Gulli et al. .................. 725/113 |
| 2007/0150353 | A1 | 6/2007 | Krassner et al. |
| 2007/0185763 | A1 | 8/2007 | Miura et al. |
| 2007/0265923 | A1 | 11/2007 | Krassner et al. |
| 2007/0282693 | A1 | 12/2007 | Staib et al. |
| 2008/0059571 | A1 | 3/2008 | Khoo |
| 2008/0086368 | A1 | 4/2008 | Bauman et al. |
| 2009/0265243 | A1 | 10/2009 | Krassner et al. |
| 2010/0275221 | A1 | 10/2010 | Du Vall et al. |
| 2011/0307329 | A1 | 12/2011 | Krassner et al. |

FOREIGN PATENT DOCUMENTS

| | | |
|---|---|---|
| WO | WO 2005081155 | 9/2005 |

OTHER PUBLICATIONS

Li, Ying, Examiner's First Report on Patent Application No. 2006331610, pp. 1-2, Jan. 7, 2011, Australian Government-IP Australia, Australia.

Luu, Teri (IPEA/US), PCT International Preliminary Report on Patentability, PCT Applic. No. PCT/US06/48805, pp. 1-7, Jan. 20, 2011, Alexandria, Virginia.

Dunn, Tom (IPEA/US), PCT International Preliminary Report on Patentability, PCT Applic. No. PCT/US09/05733, pp. 1-16, Jan. 5, 2011, Alexandria, Virginia.

* cited by examiner

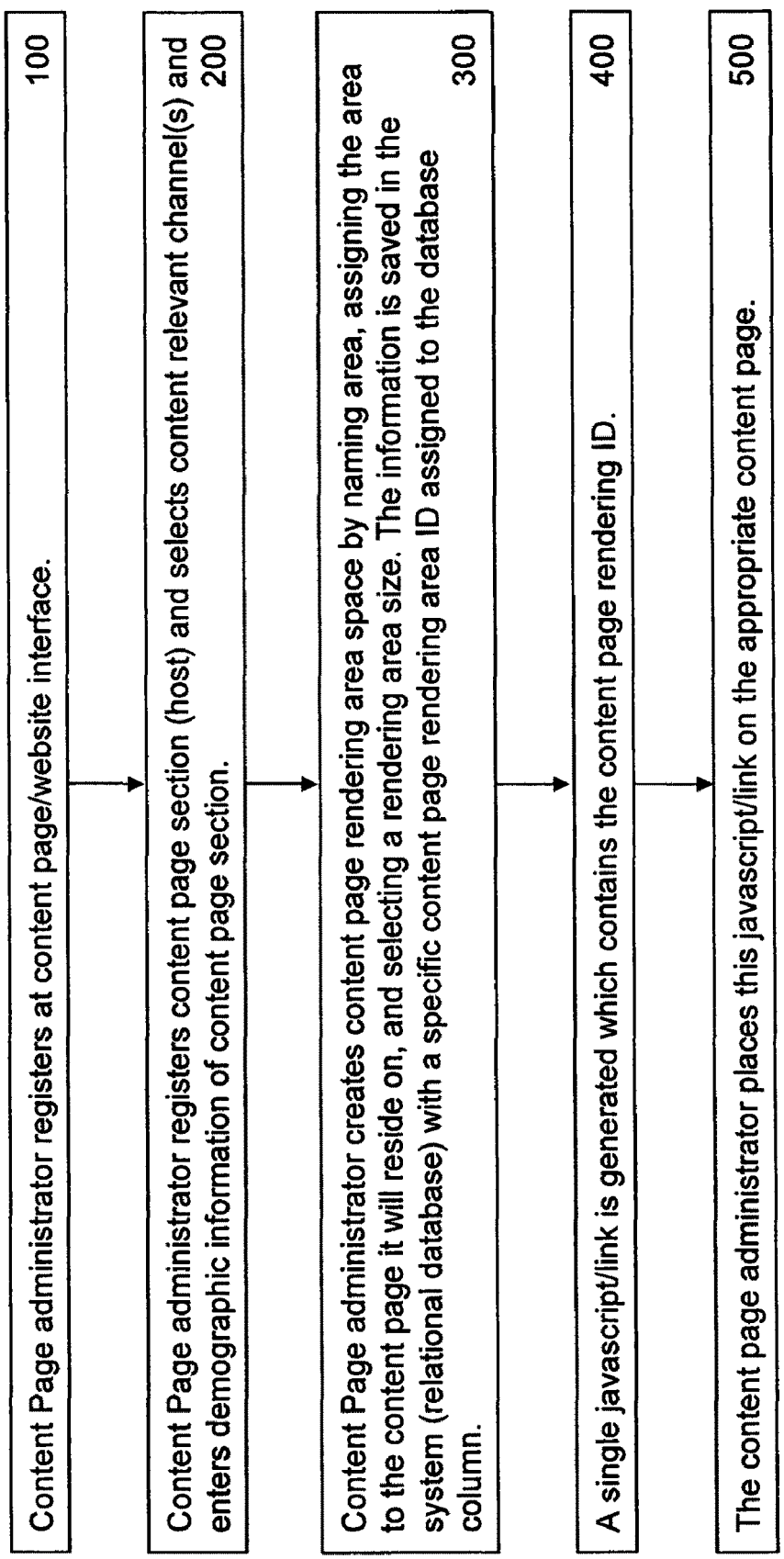
FIG. 4-A

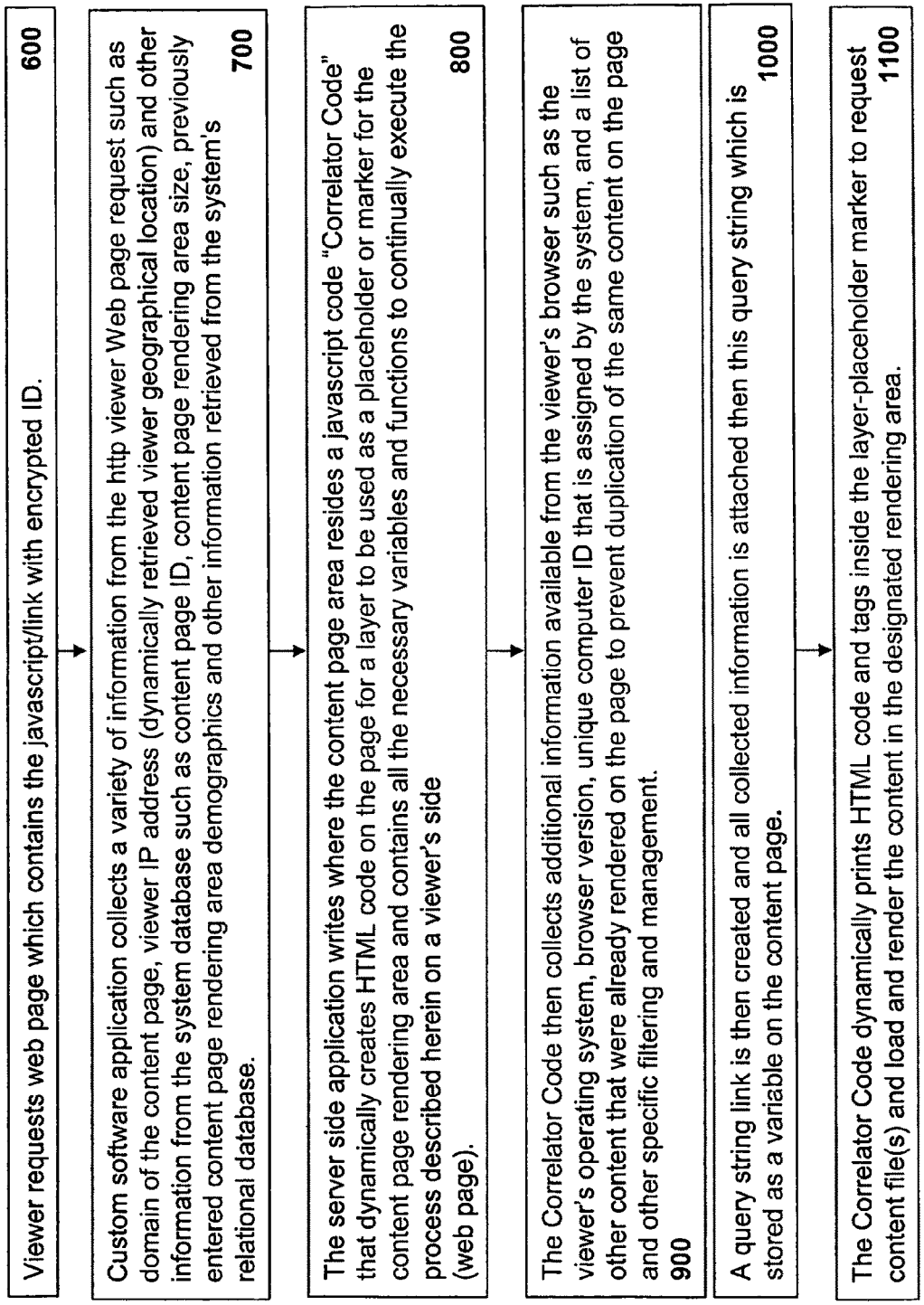
FIG. 4-B

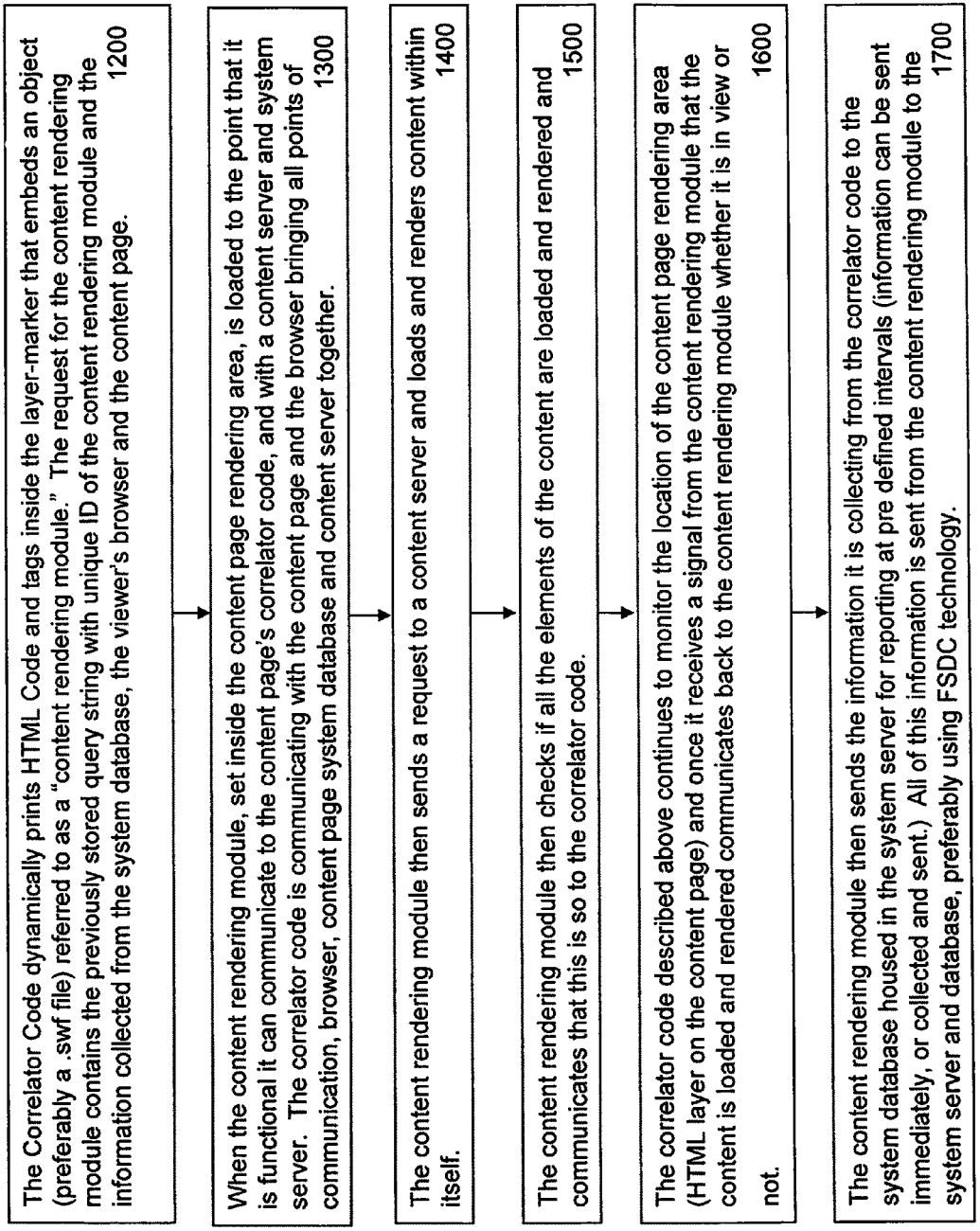
FIG. 4-C register new account

| | | |
|---|---|---|
| Referred by (website): | | |

Login

| | | |
|---|---|---|
| User ID: | ◆ | |
| Password: | ◆ | |
| Confirm Password: | ◆ | |

Name

| | | | | |
|---|---|---|---|---|
| First Name: | ◆ | | MI: | |
| Last Name: | ◆ | | | |

Contact Information

| | | |
|---|---|---|
| Title: | | |
| Company: | ◆ | |
| Address: | ◆ | |
| Address 2: | | |
| City: | ◆ | |
| State/Province: | ◆ | — Select State — |
| Zip Code: | ◆ | |
| Phone: | ◆ | |
| Fax: | | |
| Website: | | |
| E-mail: | ◆ | |
| Confirm E-mail: | ◆ | |

About Your Business

| | | |
|---|---|---|
| Business Type: | ◆ | |
| Company Size: | ◆ | — Select — |
| Company Revenue: | ◆ | — Select — |
| How did you learn about | | — Select — |

◆ ☐ I agree to the     Terms of Use and Network Affiliate Agreement

→ submit

FIG. 6

Select region that best represent your website's (website section) content. Select as many regions as you feel appropriate, or Not Regional if your website is not bed to any specific region or local business.

Defined Region:
☑ Pittsburgh-New Castle, PA

☐ Complete Network (Show ads based on a viewer location)

[ Find ]

A B C D E F G H I J K L M N O P Q R S T U V W X Y Z

☐ Aberdeen, SD                              ☐ Alexandria, MN
☐ Aberdeen, WA                             ☐ Alice, TX
☐ Abilene, TX                               ☐ Allentown-Bethlehem-Easton, PA-NJ
☐ Ada, OK                                   ☐ Alma, MI
☐ Adjuntas, PR                              ☐ Alpena, MI
☐ Adnan, MI                                 ☐ Altoona, PA
☐ Aguadilla-Isabela-San Sebastin, PR        ☐ Altus, OK
☐ Alamogordo, NM                            ☐ Amanilo, TX
☐ Albany, GA                                ☐ Americus, GA
☐ Albany-Corvallis-Lebanon, OR              ☐ Ames-Boone, IA
☐ Albany-Schenectady-Amsterdam, NY          ☐ Anchorage, AK
☐ Albert Lea, MN                            ☐ Andrews, TX
☐ Albertmile, AL                            ☐ Angola, IN
☐ Albuquerque, NM                           ☐ Anniston-Oxford, AL
☐ Alexandria, LA                            ☐ Appleton-Oshkosh-Neenah, WI

FIG. 9

Select Channel(s) for www.3cdepot.com

→ <u>Attributes</u> → <u>Region</u> → Channel → <u>Demographics</u>

Select channels that best represent your website's (website section) content. Selecting the right channels here will help the CityAds Dispatcher target advertising that is most interesting to your viewers. Select as many channels as you feel appropriate.

| | |
|---|---|
| ☐ Adult | ☐ Men's |
| ☑ Arts & Hobbies | ☐ Music |
| ☐ Automotive | ☐ Pets & Animals |
| ☑ Business & Finance | ☐ Real Estate |
| ☐ Culture & Society | ☐ Restaurants, Wine & Food |
| ☐ Education & Employment | ☑ Retail |
| ☐ Entertainment | ☐ Social Networking |
| ☐ Family & Parenting | ☐ Sports |
| ☐ Games | ☐ Tech |
| ☐ Health & Fitness | ☐ Teen |
| ☐ Kids | ☐ Travel & Hotels |
| ☐ Media, News & Info | ☐ Women's |

[ Back ]   [ Continue ]

FIG. 10

Billboard

→ Billboard Attributes → Billboard Size → Get Code

Enter a Name for your billboard. The billboard Name is for your reference so you can find, track or update this billboard later. Select the website you will be placing the billboard on. To prevent fraud, you must place this billboard on a webpage belonging the domain you select here or the billboard will generate an error message.
Select a broadcast program for this billboard. Select CityAds Ads to display all paid advertising. Including ads that are made online by other registered users.
Select CityAds Limited means and only display paid ads sold or approved by CityAds. Select "Show only my own ads" if you want to rotate your own advertising in this billboard. In this way you can use the CityAds.net platform for your own marketing needs or create your own network. You will not earn advertising or Free Trade credits if you choose this program. You may change the program for a billboard at any time without changing the code of the billboard on your web page.

Billboard Name: ♦ HomePage Box

Website/Section: 3cdepot/Home Page

Broadcast: My Own ads only

[Continue] 

My Websites

The websites you have registered are listed below. To edit a website's information, click on the website name. To create and place a new billboard click Create New Billboard above. To view tracking data on each of your billboards click on the number in the billboard # column below or My Billboard above.

[FIND]

Report Period: Mon, Nov 24, 08 - Now ▼

| Website ↓ | Date Created | Billboards # | CPM Views # | Actual (CPV) Views # | Ad View Rate | Total Clicks # | Click Rate | Video Watched # | Earned Views # | Earned Credits |
|---|---|---|---|---|---|---|---|---|---|---|
| kdka.com/entertainment | Mon, Aug 04, 08 | 3 | 124,392 | 6,401 | 5.15% | 260 | 4.0619% | 153 | 0 | 24,298 |
| www.kjzz.com | Fri, May 02, 08 | 11 | 79,122 | 21,197 | 26.79% | 844 | 3.9817% | 480 | 0 | 2,703 |

Display [20 ▼] records per page.

FIG. 22

My Billboards

Here are the CityAds billboards you have created. Click on a billboard name to copy and paste the billboard code to your website. You can also track billboard statistics here including views and earned credits. Sort billboards by website using the website drop down and search for billboards by name with the find field. Sort statistics for better analysis by clicking on the column names.

—All Websites— ▼    [          ] FIND    Broadcast: All Billboards ▼    Period: 11/24/2008 - Now ▼

| Billboard Name ↓ | Size | Date Created | CPM Views # | Billboard Loads # | Ads Rendered # Partial Views | CPV Views # | Ad Views Rate | Total Clicks # | Click Rate | Video Watched # | Earned Views # | Earned Credits |
|---|---|---|---|---|---|---|---|---|---|---|---|---|
| Bonnie Hunt [1] | 300 x 250 px | Thu, Aug 14, 08 | 1,801 | 314 | 274 | 521 | 28.93% | 107 | 20.537% | 70 | 0 | •0 |
| Bottom Leaderboard | 728 x 90 px | Thu, May 15, 08 | 122,578 | 26,224 | 6,331 | 5,872 | 4.79% | 153 | 2.6056% | 83 | 0 | •24,298 |
| Cooking Delight [1] | 300 x 250 px | Fri, Jul 18, 08 | 1,431 | 376 | 329 | 603 | 42.14% | 145 | 24.0464% | 83 | 0 | •0 |
| Cooking Delight [1] [2] | 300 x 250 px | Tue, Sep 30, 08 | 13 | 0 | 0 | 8 | 61.54% | 0 | | 0 | 0 | •0 |
| erwe | 728 x 90 px | Thu, Oct 30, 08 | 0 | 0 | 0 | 0 | | 0 | | 0 | 0 | •0 |
| HomePage | 300 x 250 px | Thu, May 15, 08 | 38,071 | 10,542 | 9,120 | 1,722 | 4.52% | 245 | 14.2276% | 141 | 0 | •2,703 |
| Internal Rotating My ADS ONLY | 300 x 250 px | Wed, May 28, 08 | 13,980 | 1,027 | 934 | 7,151 | 51.15% | 63 | 0.8810% | 35 | 0 | •0 |
| Joseph Smith Papers [1] | 300 x 250 px | Thu, May 15, 08 | 3,227 | 1,124 | 982 | 1,419 | 43.97% | 112 | 7.8929% | 96 | 0 | •0 |
| KJZZ Cafe | 300 x 250 px | Thu, May 15, 08 | 7,447 | 595 | 530 | 2,685 | 36.05% | 139 | 5.1769% | 69 | 0 | •0 |
| Maverik KickStart [1] | 300 x 250 px | Mon, Jun 02, 08 | 0 | 0 | 0 | 0 | | 0 | | 0 | 0 | •0 |

FIG. 23

| Display Resolution | | Avg Viewable Area | | Total Views # | Views % | Avg Vertical Scroll (px) | Avg Horizontal Scroll (px) |
|---|---|---|---|---|---|---|---|
| 1024 x 768 | | 995 x 565 | | 243 | 23.19% | 316 | 0 |
| 1280 x 800 | | 1230 x 605 | | 172 | 16.41% | 408 | 0 |
| 1280 x 1024 | | 1229 x 799 | | 149 | 14.22% | 427 | 0 |
| 1440 x 900 | | 1399 x 708 | | 119 | 11.35% | 519 | 0 |
| 1680 x 1050 | | 1511 x 825 | | 108 | 10.31% | 395 | 2 |
| 1920 x 1200 | | 1519 x 916 | | 40 | 3.82% | 440 | 0 |
| 1152 x 864 | | 1104 x 648 | | 36 | 3.44% | 422 | 0 |
| 1366 x 768 | | 1331 x 568 | | 34 | 3.24% | 288 | 0 |
| 1920 x 1080 | | 1697 x 829 | | 22 | 2.10% | 514 | 0 |
| 1600 x 900 | | 1507 x 653 | | 12 | 1.15% | 114 | 0 |
| 1280 x 768 | | 1219 x 581 | | 12 | 1.15% | 424 | 0 |
| 1400 x 1050 | | 1301 x 824 | | 11 | 1.05% | 189 | 0 |
| 1280 x 960 | | 1213 x 731 | | 9 | 0.86% | 229 | 0 |
| 1024 x 640 | | 1001 x 479 | | 9 | 0.86% | 116 | 0 |
| 800 x 600 | | 768 x 377 | | 8 | 0.76% | 349 | 25 |

FIG. 39

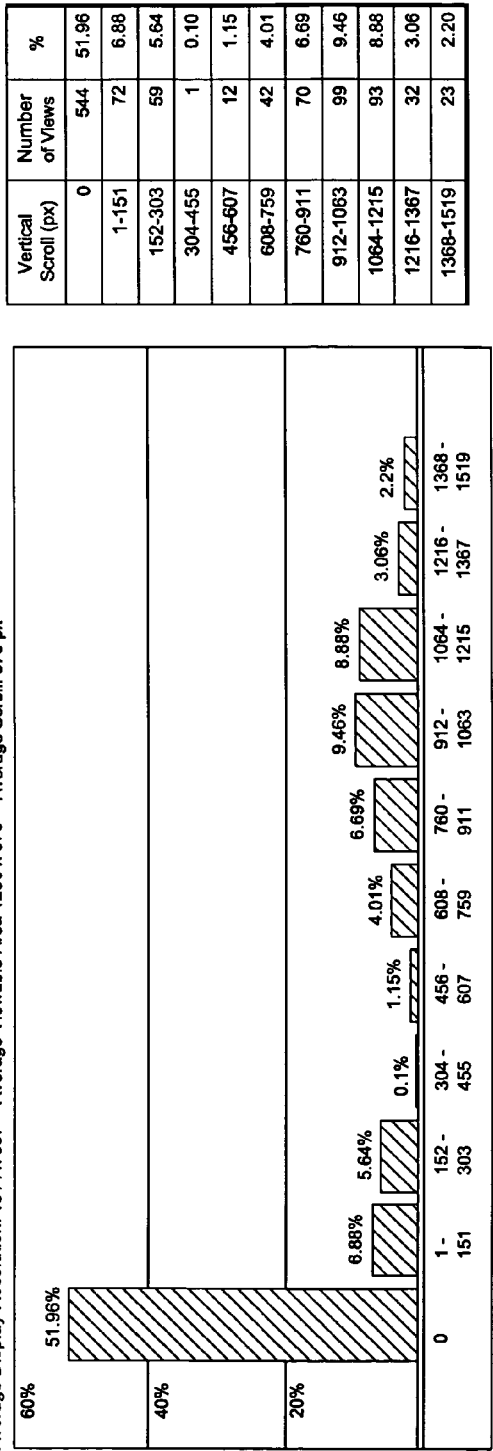
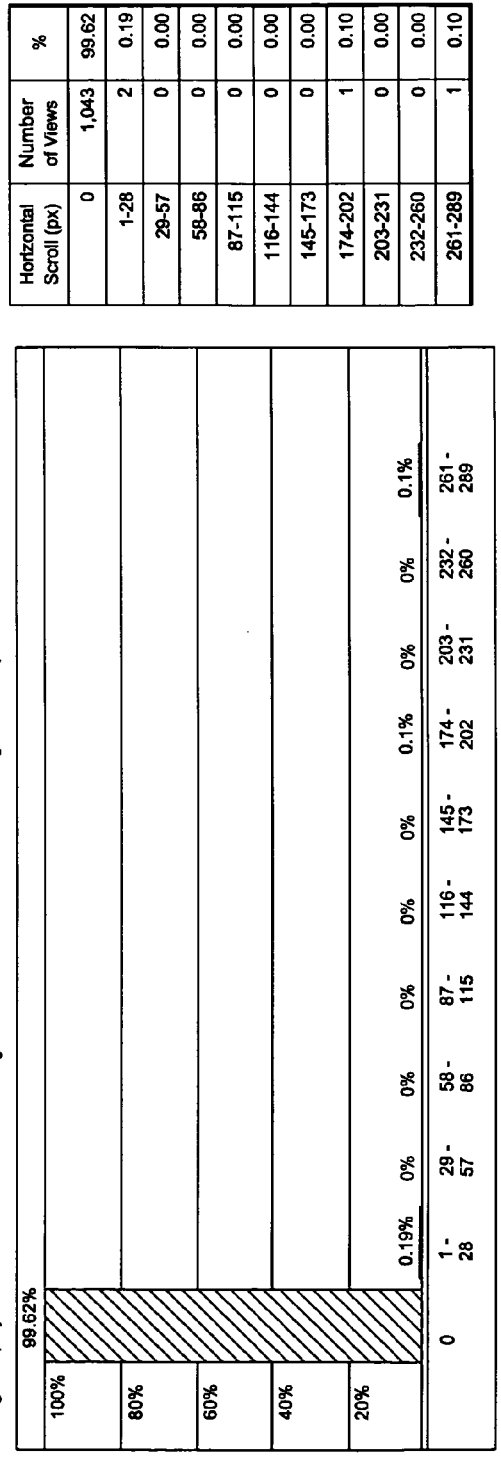
FIG. 41

Mountain Time (GMT-7.0) with daylight saving changes

Tracking Parameter: Views ▶  Filters: Show All Traffic ▶  Report Period: Month ▶ October, 2009 ▶

| Time | Placement ID | Billboard ID | Unique Identifier | IP | OS | Browser | Action | Screen W x H | View Area W x H | Scroll Left x Top |
|---|---|---|---|---|---|---|---|---|---|---|
| Oct 13 2009 4:31:57:533PM | 3231 | ZZ1 | B203F6B3-AE58-4A25-AC3F-D22CEF8B133B | 198.60.71.20 | WinXP | Firefox 3.5.2 | View 10 sec | 1280 x 1024 | 1280 x 832 | 0 x 741 |
| Oct 13 2009 4:30:34:763PM | 3231 | ZZ1 | 60315029-EADB-4097-9079-E560B5997DE3 | 67.182.217.58 | WinXP | Firefox 3.5.3 | View 5 sec | 1280 x 1024 | 1280 x 832 | 0 x 894 |
| Oct 13 2009 4:26:28:740PM | 3231 | ZZ1 | BC2633CB-440B-4836-9144-4666DA3890CA | 69.27.3.254 | WinNT | IE 8.0 | View 3 sec | 1600 x 900 | 1284 x 601 | 0 x 180 |
| Oct 13 2009 4:26:07:957PM | 3231 | ZZ1 | BC2633CB-440B-4836-9144-4666DA3890CA | 69.27.3.254 | WinNT | IE 8.0 | View 5 sec | 1600 x 900 | 1284 x 601 | 0 x 0 |
| Oct 13 2009 4:25:42:517PM | 3231 | ZZ1 | BC2633CB-440B-4836-9144-4666DA3890CA | 69.27.3.254 | WinNT | IE 8.0 | View 1 sec | 1600 x 900 | 1284 x 601 | 0 x 0 |
| Oct 13 2009 4:23:33:217PM | 3231 | ZZ1 | 6D525558-EC93-44BC-A0B2-3EEE7B8D54F3 | 99.160.248.237 | WinNT | Firefox 3.5.3 | View 1 sec | 1024 x 768 | 1024 x 585 | 0 x 1172 |
| Oct 13 2009 4:19:32:633PM | 3231 | ZZ1 | 60315029-EADB-4097-9079-E560B5997DE3 | 67.182.217.58 | WinXP | Firefox 3.5.3 | View 3 sec | 1280 x 1024 | 1280 x 832 | 0 x 684 |
| Oct 13 2009 4:06:59:337PM | 3231 | ZZ1 | 406696A2-39F1-44AB-B453-0E90D2F8ABFF | 205.208.222.224 | WinXP | IE 8.0 | View 1 sec | 1024 x 768 | 1003 x 567 | 0 x 0 |
| Oct 13 2009 4:02:58:860PM | 3231 | ZZ1 | 2948BBF0-8A53-42A7-92D1-31C143EC414F | 63.225.62.68 | WinXP | IE 8.0 | View 25 sec | 1680 x 1050 | 1659 x 840 | 0 x 0 |
| Oct 13 2009 3:51:05:290PM | 3231 | ZZ1 | DABAC3F3-D713-4535-B795-8ABEEF449775 | 125.255.47.55 | WinXP | IE 8.0 | View 15 sec | 1024 x 763 | 1003 x 537 | 0 x 242 |
| Oct 13 2009 3:38:04:673PM | 3231 | ZZ1 | 920EBE1D-3E48-4621-9B01-6681F7FE5261 | 67.159.240.226 | WinNT | IE 8.0 | View 1 sec | 1280 x 800 | 1259 x 548 | 0 x 0 |
| Oct 13 2009 3:36:51:680PM | 3231 | ZZ1 | B8DC292B-933E-41EE-8CC5-4DBA43232D40 | 67.182.218.114 | WinXP | Firefox 3.0.14 | View 1 sec | 1024 x 768 | 1016 x 625 | 0 x 847 |
| Oct 13 2009 3:35:38:600PM | 3231 | ZZ1 | B8DC292B-933E-41EE-8CC5-4DBA43232D40 | 67.182.218.114 | WinXP | Firefox 3.0.14 | View 20 sec | 1024 x 768 | 1016 x 625 | 0 x 1026 |

FIG. 42

CONTENT RENDERING CONTROL SYSTEM AND METHOD

CONTINUITY/PRIORITY INFORMATION

This application is a continuation in part of co-pending U.S. Nonprovisional patent application Ser. No. 12/316,781 filed on Dec. 16, 2008, the entirety of which is incorporated herein by reference. The benefit of the earlier filing date of U.S. Nonprovisional patent application Ser. No. 12/316,781 filed on Dec. 16, 2008 is claimed pursuant to 35 U.S.C. Section 120.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office Patent file or records, but otherwise reserves all copyright rights whatsoever.

BACKGROUND OF THE INVENTION

A. Technical Field

The present invention relates generally to methods and systems for content distribution via electronic communications networks. More specifically, the present invention is a system and method for controlling content rendering on a content page whereby content is rendered only when and to the extent that a predefined area of the content page, which can be the content page area where such content is to be rendered, is within (or within a predefined distance from) the viewer's browser screen dimensions and scrolling position.

B. Background

Internet web page content delivery typically involves a content viewer's use of a browser application that is installed in the viewer's computer which connects to the Internet, and through hypertext transfer protocol or "http" requests web pages from content servers. These web pages are generally written in Hyper Text Markup Language or "HTML." When a content page is requested, the viewer's browser will download and assemble the web page according to the HTML instructions for the page, including commands from other languages that may be set in the HTML code, such as JavaScript or Ajax, and any images or rich media content that may be requested and loaded from the same server or other content servers. JavaScript is a scripting language that relies on a run-time environment, such as a browser application and can be used to write functions that are embedded or included in HTML pages and interact with the document object model of the page and can detect user keystrokes and other user actions. AJAX (an acronym for "Asynchronous JavaScript and XML") is a web development technology that is used to implement web applications that communicate with a server in the background without interfering with the current state of the page.

This process has limitations due to the fact that the user's available browser window varies based on the display area and resolution settings of the user's personal computer or other communications device and that the browser may be expanded or reduced to any size or dimensions that the user dictates at any time. Web pages delivered to this varying environment generally have a set size and dimensions that are larger than the size and dimensions of the viewer's browser window displayed on a personal computer or other communications devices. As such, the browser window area often does not correspond in size with the web page area, and the user may have to scroll left or right or up or down to view all of the areas of the page. Also, the nature of HTTP protocol dictates that the code must be completely interpreted by the browser before it can display the page. Because of these limitations, when a web page is requested by a user, the entire web page, no matter how big, must be loaded and rendered by the browser, even if that web page extends far beyond the dimensions of the individual viewer's available browser dimensions and scrolling position. This is extremely inefficient in bandwidth and CPU utilization, and also affects the potential accuracy of the data pertaining to actual perception of delivered content used for various purposes, including, but not limited to, proper accounting of advertising content usage and placement charges and the measurement and reporting of meta data related to the content delivered.

Advertising and content delivery for traditional media to date has been made based on the fact that all of the content is available to the viewer at any given time. When a newspaper page is printed or a radio show or television show is broadcast, all of the content is delivered and available to the viewer. Even with traditional print media, although a viewer may fold a page and not see portions of it, the entire page is available to view. All broadcasting and reporting measurements are based on this given fact. With the advent of the Internet, for the first time a medium was created where significant portions of the content are actually not available to the viewer unless the viewer takes some sort of action to get to the content. This action in most cases is the scrolling of the page via the browser mechanism or expanding the browser area to make more of the web page available.

Pay Per View, or Cost Per Thousand Views (CPM) billing and broadcasting measurements related to the Internet follow the assumption that the content is always available to the viewer when the viewer is on the requested page. The loading of a web page does not guarantee all of its content will be in view or available to a viewer for interpretation or influence. Nevertheless, content usage and placement fees are usually charged even for content that a viewer may actually never have viewed based on the rationale that because the entire web page can be loaded and viewed if the user takes appropriate action that the entire page, all of its content is "available" to the viewer. This is not an accurate assessment of whether content was actually perceived by a viewer.

SUMMARY OF THE INVENTION

The present invention is a system and method for delivering and rendering content automatically and only when and/or to the extent that a pre-defined area of the content page is within the viewer's browser window dimensions and scrolling position, or within a pre-defined distance from the viewer's browser window dimensions and scrolling position. As used herein, the term "render" or "rendering" refers to the process of requesting and loading content so that it may be viewed, heard or otherwise perceived by a viewer communicating electronically using a browser. The pre-defined area, designated by the content page administrator to trigger rendering, is referred to below as the "content page triggering area." In a preferred embodiment, the pre-defined area of the content page referred to as the "content page triggering area" is the designated content page area where the content is to be rendered. In other embodiments the content page triggering area can be an area of the content page other than the area where the content will be rendered. The system can be configured to trigger rendering of content in a designated content page rendering area when the pre-defined content page triggering area is within the dimensions and scrolling position of a viewer's browser window, or alternatively, when the pre-defined content page triggering area is within a pre-defined distance outside of the viewer's browser screen dimensions and scrolling position. The system includes an interface for receiving content page address, content file information (which may be in the form of instructions to retrieve one or more content files stored in a content server or other storage device, which may be either part of the system-end components or remotely located components), content page rendering area and content page triggering area parameters and other content page data from content page administrators, and a system server with a database for storing one or more records containing such data, each record being given an identification code. The system software application generates a single tag based on said content page data, and the tag is placed on the content page. The tag includes the identification code for the corresponding record with content page data stored in the system database and a link to a system server-side application. When a viewer requests the designated content page, the tag is activated and links to the system server-side application. The system server-side application then collects data from the request, including, but not limited to, the address of the content page and the viewer's network address (for example, the Internet Protocol address associated with a viewer computer when the network is the Internet), and retrieves the corresponding record containing content page data stored in the system server database, and generates code, preferably JavaScript code, referred to herein as a "correlator code," which is written to or otherwise embedded on the content page and interacts with the viewer's browser. The correlator code can be positioned anywhere on the content page, not necessarily the location on the content page where the particular content will be rendered. A unique identification code is then assigned to the particular viewer/browser which can be created by the correlator code itself, or can be created by the system server-side software application and be retrieved from, cookies or from the system database. The correlator code collects additional information from the viewer's browser, including, without limitation, the viewer's operating system and browser type/version, and a list of other content that was already rendered on the page to prevent duplication of the same content on the content page, among other data and preferably also indexes the page for content. The correlator code dynamically generates HTML code on the content page for a layer to be used as a marker for the content page area where the content will be rendered. The system correlator code then generates a query string link including the data collected via the correlator code and server-side application and the query string link is stored as a variable on the content page. The correlator code periodically checks viewer browser screen coordinate data from the viewer's browser application with content page coordinates for the pre-defined content page triggering area (which may be the same area as the content rendering area). As a viewer scrolls through a content page (whether up and down or left and right) or the viewer's browser window dimensions change, the correlator code periodically checks data from the viewer's browser regarding the viewer's browser window scrolling position and dimensional coordinates and when there is correspondence between the browser window dimensional and scrolling position coordinates and the coordinates for the content page triggering area (which may be partial correspondence or full correspondence, or correspondence with coordinates that are a pre-defined distance outside the viewer's browser dimensional and scrolling position coordinates), the query string link is activated, the correlator code dynamically generates HTML code and tags inside the previously generated HTML marker where the content will be rendered and the content is rendered in the designated content page rendering area. The correlator code also records at the display page data retrieved from the viewer's browser regarding the rendering of the content. The correlator code is preferably JavaScript code, although the invention is not limited to use of JavaScript; other scripting or compiling languages can be used, such as, without limitation, JScript, ECMAScript or other scripting capable of generating code that determines whether or not the specified content page triggering area is within, or within a pre-defined distance outside of, the dimensions and scrolling position of a viewer's browser window. The correlator code contains all of the necessary variables and functions to execute the correlation process described above in conjunction with the viewer's browser. The correlator code is code delivered in the form of source code that interprets and executes the script accordingly by the browser application of the viewer although it resides on the content page itself. It is not an applet or other compiled file or self executing software application. Content is only rendered on a content page to a viewer when and/or to the extent that the pre-defined content page triggering area is within, or within a pre-defined distance outside of, the viewer's browser screen dimensions and scrolling position. In a preferred embodiment, the pre-defined content page triggering area is the area of the content page where the content is to be rendered, and content to be rendered in the pre-defined area of the content page is not rendered unless and until the particular area of the content page is within the viewer's browser screen dimensions and scrolling position, or within a pre-defined distance outside of the viewer's browser screen dimensions and scrolling position. With the present invention bandwidth and other communications resources are utilized more effectively and efficiently.

Reports regarding the delivery and rendering of content can be generated by the system for use by system users and third party content providers and content publishers (e.g., web pages) to better analyze the effectiveness of their content distribution. Unlike other systems, the present invention enables precise and accurate accounting of what content actually appears within in a viewer's browser window dimensions and scrolling position area and enables analysis of content rendering activity with respect to particular areas of a content page, i.e., which areas are most active with regard to content rendering to viewers, enabling effective content placement page organization schemes and content placement fee structures based on rendering activity for the particular content display area of a content page relative to other areas of the page and the viewer's browser window dimensions. In one embodiment, the invention gathers information to better deliver content loaded, including reach, frequency, viewer's geographic location, the demographics of the viewership, among other data, allowing websites to effectively provide content on their web pages on an as needed basis and then to utilize the information in myriad ways. With the present invention, content placed in any designated web page area, including but not limited to, below the fold areas of a web page, can be loaded as needed, and its usage/rendering can be reported and billed only if the viewer scrolls them into the available area of their browser window, and when response rates are calculated against the ads loaded and rendered.

The present invention gives content publishers, by adding a single JavaScript tag on their content pages and specifying a predefined area on the content page which, when its coordinates correspond in a pre-defined manner with coordinates of the viewer's browser dimensions and scrolling position, triggers content rendering at the content page, the ability to provide to viewers of their pages a variety of content including promotions, video promotions, advertising and third party network advertising on their web pages and deliver this content to the page when and/or only to the extent that the pre-defined content page triggering area of the content page is within, or within a pre-defined distance outside of, the then current dimensions and scrolling position of the viewer's browser window. The tag includes a link to a system server software application that triggers the rendering of content within the designated content rendering area of a content page and causes the content page to retrieve content rendering activity data from the viewer's browser. The present invention, in one embodiment, may then trigger several actions, including an indicator to show the viewer or system users that the content is rendered and available, and report with accuracy whether or to what extent the content page area where particular content is to be rendered is within the available area of viewer's browser window, for how long the content was available to trigger further action, how many unique viewers were presented the content (reach), the amount of times each unique viewer was presented the content (frequency) the general geographic location of the viewer, the browser version used by the viewer, what actions were taken on the advertisement in the form of clicks, the click rate in relation to the number of views, and other meta data in relation to the rendered content. The content can be successively rendered automatically to the viewer as the viewer scrolls through a content page, with the effects of instant rendering attracting the attention of the viewer.

The present invention also allows content publishers (e.g. content page administrators), by placing a single JavaScript tag on their content page where content is to be rendered to generate accurate reports to analyze their content according to different areas of their content pages and how they relate to the available areas of viewer's browser windows, enabling accurate accounting and reporting of content rendering and viewer content page viewing and scrolling characteristics, providing insights as to what display areas of a content display site are most effective for content display. The reports consist of accurate data of their pages, and how often they become available to a viewer within their browser window. Content pages are, in one embodiment, divided into four areas, top, above the fold, below the fold, and bottom, although further division is programmable as desired. The data for each area is based on the collected rendering activity data from the rendering of content in the specified area of the content page.

In a preferred embodiment, the computer and communications network is the Internet, the content display sites and pages websites and web pages, and content page administrators may be web page administrators, but the present invention is not limited to any particular communications network or content display site. The content can be stored at a network location other than the content display site server, such as, for example, one or more content file servers, which can be remotely located, with the instructions being stored in the system database to execute and render the content at the specified rendering area on a content page when requested.

The present invention, in a preferred embodiment, allows content page administrators to divide their content display site pages into one or more content rendering areas. Content page administrators interact with the system to designate such content rendering areas, specifying their position and size and designating content files to be rendered thereat. The system processes the specified information and provides a JavaScript tag that includes the identification code for the system server database record storing the content page information provided by the content page administrator and includes a link to a system server-side application at the system server. When the viewer requests the particular content page, the JavaScript tag links to the system server-side application and the system server-side application retrieves data from the viewer's request as well as the record with data for the particular content page and generates code, referred to as a "correlator code" which is preferably JavaScript code, that dynamically creates HTML code on the content page for an HTML layer to be used as a marker for the content page area and also correlates the pre-defined content page triggering area with viewer browser window scrolling position and dimensions, and the system server-side application generates a query string link which is stored as a variable on the content page, including data collected from the viewer's browser via the correlator code. As the viewer scrolls through the content page, the correlator code determines whether the browser scrolling position and dimensional coordinates correspond with content page coordinates for the pre-defined content page triggering area on the content page, (which may be the area on the content page where the content is to be rendered or any other pre-defined area of the content page) and when browser window and the pre-defined content page triggering area's coordinates correspond (the correspondence can be customized and pre-defined as well, and can be partial correspondence, full correspondence or correspondence with coordinates that are a pre-defined distance outside of the viewer's browser window dimensional and scrolling position coordinates), the query string link stored on the page is triggered and the content designated for rendering at or in relation to such content page area is retrieved, assembled and rendered in the designated content page rendering area. The specified content is rendered only if and when such pre-defined content rendering area is determined by the correlator code to be within, or within a pre-defined distance outside of, the dimensions and scrolling position of the viewer's browser window. When the pre-defined content page triggering area is the area where the content is to be rendered, the content is rendered only when and/or to the extent that the area of the content page where the content is to be rendered is within, or within a pre-defined distance outside of, the dimensions and scrolling position of the viewer's browser window.

The system database storing the records with content page data is preferably a relational database, housed preferably in a system-end server. Each such record has a unique identifier. The system server-side software application contains all code that is necessary to communicate with the system server database as well as with the content page and generate the correlator code which is written to or otherwise embedded on the content page and interacts with the viewer's browser to control the triggering of content requesting and rendering when the pre-defined content page area where the content is to be rendered is within, or within a pre-defined distance outside of, the dimensions and scrolling position of a viewer's browser window. The JavaScript tag placed on the content page for the particular content rendering area consists of a tag placed somewhere on the content page containing a link to the system server-side software application and an encrypted ID for the applicable content page record stored at the system database located preferably at the system server. When a viewer requests the particular content page, the request activates the link to the system server-side application, which retrieves the record with data corresponding to the encrypted id for such record included in the tag and retrieves viewer browser data from the page request itself. The system server-side application generates the custom correlator code to be written to or otherwise embedded on the content page. The correlator code then creates HTML code on the content page to serve as a marker for the content page area where the content will be rendered. The correlator code collects information from the viewer's browser additional information, which may include information regarding the viewer's computer system, browser type/version, and information regarding content that has previously been rendered on the content page to prevent duplication of content on the page, among other data, and also collects and indexes data pertaining to text on the content page. A unique identification code is then assigned to the particular viewer/browser which can be created by the correlator code itself, or can be created by the system server-side software application and be retrieved from cookies or from the system database. The unique identification code assigned to the particular viewer/browser can be created by the correlator code itself, or can be created by the system server and retrieved from cookies or from the system database. The correlator code creates a query string link with the information collected by the correlator code attached thereto and the query string link is stored as a variable on the content page. When the pre-defined content page triggering area is within, or within a pre-defined distance outside of, the dimensions and scrolling position of the viewer's browser screen, the correlator code triggers the query string link that is stored on the page and dynamically generates HTML code and tags inside the previously created HTML marker where the content will be rendered and the content is rendered in the designated content page rendering area. The JavaScript code on the content page contains the variables and commands to continuously determine what content page area(s) is/are within, or within a pre-defined distance outside of, the dimensions and scrolling position of the viewer's browser, causing the designated content to be rendered in such event and retrieving content rendering activity data from the viewer's browser.

The system can, via the correlator code in a preferred embodiment, provide accurate detection, measurement and reporting of viewable impressions of rich media ads or other content by not counting a viewable impression unless and until a page with the initial Javascript tag has been requested by the viewer via the viewer's browser, the correlator code has been initiated, the correlator code determines that the designated content rendering area is within the viewer's browser screen dimensions and scrolling position (i.e., the browser window viewable area), the content is rendered in the designated content rendering area, the page is the primary window open on the viewer's display screen and is unobstructed by another window or application, and a designated portion of the rendered content (for example, but without limitation 90%) is within the viewer's browser screen dimensions and scrolling position for a designated period of time. In a preferred embodiment, when these events have occurred, the correlator code can send the viewer's IP address, user Id, browser type, ad/other content ID, rendering area ID and event time data gathered from the viewer's browser and send same to the system servers. The period of time can be customized, and can be for example but without limitation, one second. For example, when an ad content rendering area or space is within or partially within the visible area of a viewer's browser window dimensions and scrolling position on an in focus web page, the correlator code detects the event and the ad content is requested. If and when the ad content is fully loaded and rendered the correlator code can report an "ad rendered" event and if and when the ad content is so rendered within the viewer's browser window dimensions and scrolling position on an in focus web page for a designated period of time such as, for example, but without limitation, one second, which means that the ad content is viewable by the viewer via the viewer's display device, the correlator code can report an "ad view" event, thereby enabling precise measurement of content requests, content renderings and content viewings, enabling more precise charging for each type of event. The present invention enables charging for advertisement and other content placements to be limited to actual ad view events, which makes advertisement more efficient by only charging for ads that are actually viewed, and allowing for separation or elimination of charges for ad impressions or requests for ad content that end up not actually ever being viewable or viewed by viewers. The view time, which is the length of time that the ad or other content is rendered and within the visible or otherwise perceivable area of the viewer's browser window on an in focus web page is also monitored, measured and recorded by the correlator code. As previously noted, the correlator code can monitor, measure and report numerous different data items such as, without limitation, ad or other content requests, viewer click action on ad or other content, content watched or otherwise perceived as confirmed by user click-action or other interaction with the ad or other content, click throughs to a target destination URL, viewer interaction with interactive button or other interactive features, volume or display device adjustments at the viewer end, and any other event that is measureable via a browser application can be monitored, measured and reported via the correlator code. The system can filter out non-human click action from human click action and verify that the ad or other content for which click action is detected was actually viewable or otherwise perceivable. The correlator code can also, as noted previously, monitor, measure and record unique viewers by browser cookie data or other means, view browser version, viewer operating system, geographic distribution of viewers based on Internet protocol address resolution or phone numbers, area code or other viewer identification that provides geographic location information, viewer display screen dimensions, viewer browser screen dimensions and scrolling position at a particular event or time. Activity logs for each ad or other content view and click can be generated via the correlator code data monitoring, measurement, recordal and transmission to the system. Each viewable impression is associated with a specific identifier which is used for identifying and associating related measurements. The viewer's browser initiates the events that are monitored, measured, recorded and sent to the correlator code, such events being used as data measurement requests subsequent to initial page requests. Such measurements are made by the correlator code when content is to be rendered, rather than earlier in the process. Measurements can be adjusted or excluded based on events subsequent to actual rendering, such as the viewer minimizing the page or content not being viewable for a predefined period of time. The correlator code sends measurement records to the system for each event in a real time manner or periodically, as programmed.

The system allows publishers and advertisers to enter ad insertion orders, manage ad campaigns and control where ad spaces are located and what triggers ad rendering, and they can use system data reporting to create their own reports and bill for content or publishing space usage, placement, rendering and viewing. The correlator code can also filter ad and other content requests, rendering, viewing, click action or other measured data as noted above to provide accurate data regarding content rendering for accurate charging for ad space usage, content usage, click actions and other chargeable events. Filtering accomplished by the present invention can prevent content requests from non-human action, such as robots, agents or other automated processes from resulting in rendered content in the first place, thereby preventing invalid viewable impression data measurements. Server log files are not used in reporting. In order for a view or click to be reported, all events described above must occur. The correlator code performs a number of actions and demands a number of parameters and variables related to: a) viewer's display monitor screen dimensions; b) browser position and the viewable area browser window relative to the screen dimensions; c) whether the browser is in focus; and d) where is the ad space is located on the rendered web page relative to the browser window and scrolling position. Additionally, erroneous or corrupted measurements, measurements attributable to system internal traffic and other measurement data that is collected but is considered to be invalid or questionable can be detected and can be reported but segregated or excluded from other data based on the system's customizable filtering functions and features. Viewer IP addresses and/or user agents can be used to detect and distinguish between human and non-human interaction and detect and distinguish between system internal and external traffic. The viewer's browser ID can be used to identify the viewer for the period of time involved in each instance of content rendering to monitor the viewer's interactions with the content and/or the page where the content is rendered. When cookies are enabled the period is the time period in which the cookie is maintained by the browser. Users may reject cookies or periodically remove cookies, resulting in new user ID values being recorded. All ads or other content that is rendered on the same instance of a web page can be associated with the same user ID value. The user ID value can also be used to monitor non-human and other invalid traffic. The present invention can also prevent inaccurate counting of ad impressions and viewable ad impressions caused by abandonment of an ad call, because an abandoned call is detected and tracked. Undercounting due to caching is eliminated via the system because in the present system the content is never cached even if page tags or content rendering modules on a page may be cached. Each rendering of content via the system is accomplished via a request for the content through the system. Popup blockers and other blocking software or tools will not result in false counting of ad rendering with the present system because the correlator code in such situations will not render an ad in a blocked space. The system can also prevent rendering of ad content and counting of renderings if and when a viewer disables image rendering on the viewer's browser.

The system also allows for updating or changing of instructions and parameters for content selection, placement, charging or other terms to be accomplished with respect to the content rendering at a content rendering area without having to create an entirely new content placement record in the system.

BRIEF DESCRIPTION OF THE DRAWINGS

All of the figures depict preferred embodiments although other embodiments are contemplated and the present invention is not limited to the embodiments shown.

FIG. 4-A is a process flow diagram showing the process flow of the present invention.

FIG. 4-B is a continuation of a process flow diagram showing the process flow of the present invention.

FIG. 4-C is a continuation of a process flow diagram showing the process flow of the present invention relating to an embodiment utilizing a content rendering module.

FIG. 6 depicts a sample system content site administrator user registration screen.

FIG. 9 depicts a sample user registration screen whereby content page administrators enter their content page's primary audience geographic location.

FIG. 10 depicts a sample user registration screen whereby content page administrators enter their content page's content type.

FIG. 13 depicts a sample content page rendering area creation screen.

FIG. 17 depicts a sample content page with the content rendering area of the content page located below the viewer's browser window dimensions and scrolling position, noted by an oval indicator.

FIG. 22 depicts a sample system content page data report screen.

FIG. 23 depicts a sample system content rendering area data report screen.

FIG. 39 depicts a sample system graphical report showing system users the display resolution, browser window dimensions and scrolling positions of viewers that received viewable impressions of rendered content via the system, also showing average viewable area, total views, percentage of views as compared to requests or renderings, average vertical scroll in pixels or other units and average horizontal scroll in pixels or other units.

FIG. 41 depicts a sample system graphical report showing viewer vertical and horizontal scrolling positions at the time that a view event is reported, also showing vertical scroll distribution and horizontal scroll distribution of data, average display resolution, average viewable area and average scroll.

FIG. 42 depicts a sample system graphical report showing a client-side activity log, tabulating times of particular events, content placement ID, content rendering module ID, the unique identifier assigned to a content page/rendering area/content and other parameter system stored data file, viewer Internet Protocol address, operating system, browser type, the particular action (e.g., rendered event, view event, or other as designated), browser and/or viewer display device screen dimensions by width and height and scrolling position (horizontal and vertical) as well as applicable time.

DESCRIPTION OF A PREFERRED EMBODIMENT OF THE INVENTION

Figure 1:
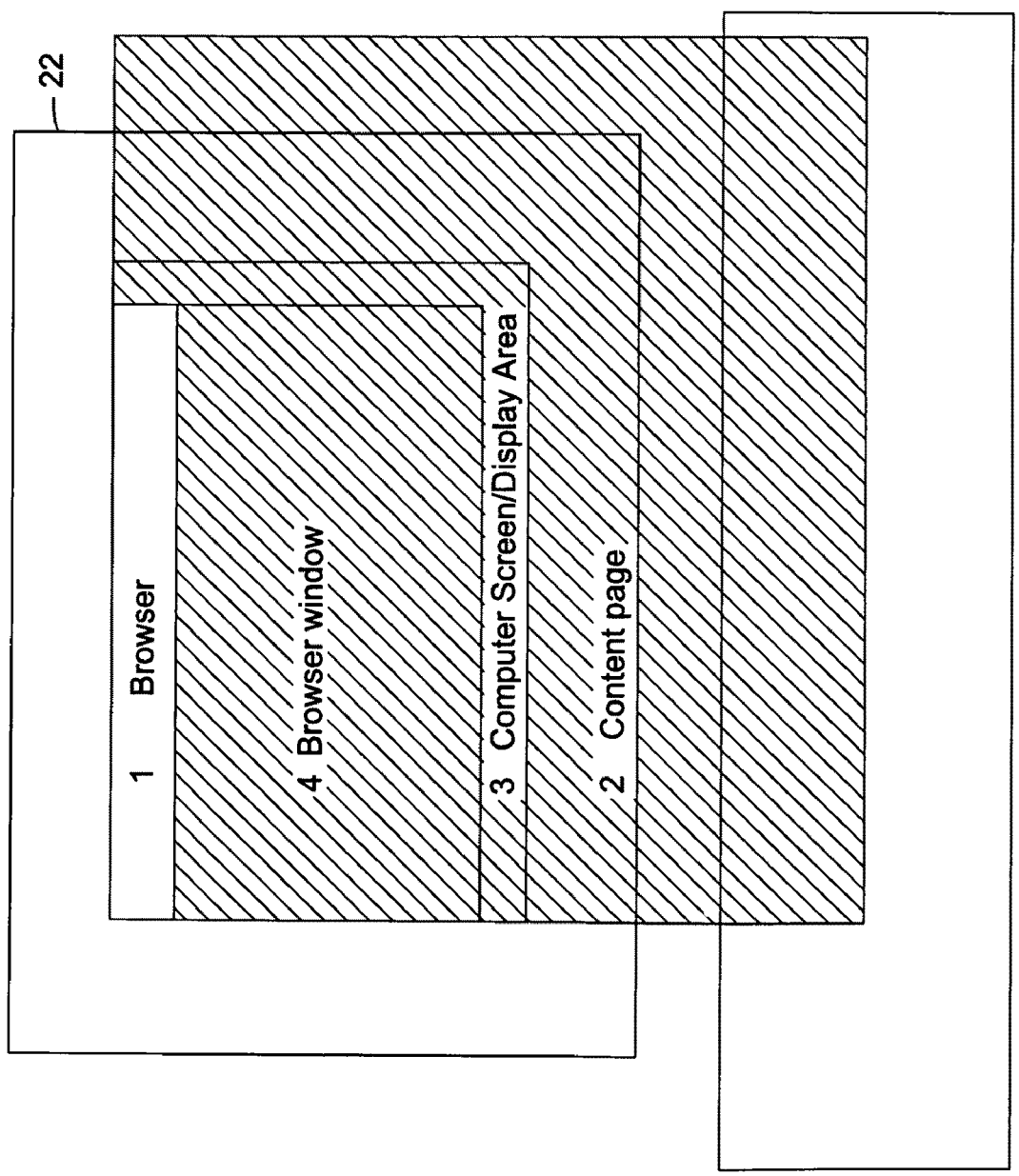
FIG. 1 is a diagrammatical overview of the interplay and overlap of a viewer's screen display area, browser application, browser window and content page.

According to a preferred embodiment hereof, the present invention is a system and method for controlling the rendering of content on content pages via electronic communications networks, whereby content is rendered only if and/or to the extent that a designated portion of the content page area (the "content page triggering area") is within, or within a pre-defined distance outside of, the viewer's browser window dimensions and scrolling position. The pre-defined content page triggering area can, in a preferred embodiment, be the area of the content page where the content is to be rendered. Content is requested, delivered and rendered automatically and sequentially for pre-defined areas of the content page that come within the dimensions and scrolling position of the viewer's browser window as the viewer scrolls across or down the content display site page without further viewer click action or other action being required. Furthermore, content can be controlled to rendered only when and to the extent that the viewer's browser window area corresponds with content page area where particular content is to be rendered rather than rendering an entire content page when only a portion is within the viewer's browser window dimensions and scrolling position, resulting in greater efficiency in bandwidth and other communications resource utilization. In a preferred embodiment, the computer and communications network is the Internet and the content display sites are websites, but the present invention is not limited to any particular communications network or content display site.

The system of the present invention in a preferred embodiment is a system for controlling the rendering of content via an electronic communications network at a designated content rendering area of a content page to one or more viewers having a network communications device with a browser software application with adjustable window dimensions and scrolling position, for viewing content pages within said browser's window dimensions and scrolling position, comprising: a system-end computer equipped and configured for communications via said electronic communications network, including one or more computer processing units and means for communicating with one or more content pages that have one or more of said content rendering areas and one or more content page triggering areas on said pages, and a system server including a database that stores one or more records containing data pertaining to said one or more content pages, said one or more content page triggering areas, said one or more content page rendering areas and said one or more content files, one or more content file servers which house one or more content files, one or more network communications interface software applications for receiving from system users data designating one or more content pages, one or more content page rendering areas within said one or more content pages, one or more content page triggering areas that, when determined to be within, or within a pre-defined distance outside of, a content page viewer's browser window dimensions and scrolling position, will result in content being rendered in said content page rendering area, and one or more content files for rendering at said one or more designated content rendering areas of said one or more content pages; and for creating a file, for storage in said system server database, that contains said data, assigning an identification code to said data record and generating a tag/link to be placed on said one or more content pages, said tag/link including a reference to said data record identification code and a link to a system custom software application; and one or more system custom software applications for generating and writing to or otherwise embedding on said designated content page a correlator code to determine when said designated content page triggering area is within, or within a pre-defined distance outside of, a content viewer's browser window dimensions and scrolling position, for dynamically generating HTML code to be used as a marker for said designated content page rendering area, and for communicating with said correlator code to cause said one or more content files to be rendered in said one or more content page rendering areas when said correlator code detects that said designated content page triggering area is within, or within a pre-defined distance outside of, said content viewer's browser window dimensions and scrolling position.

The system includes computer processing means such as one or more conventional computer processing units and microprocessors and one or more Internet or other network communications interface software applications for interfacing with system users (which are typically content page administrators) providing a graphical user interface for system users to enter data regarding their content page(s), and designation of the content page triggering area(s) that will trigger content rendering when such content page areas are within, or within a pre-defined distance outside of, the viewer's browser window dimensions and scrolling position, and content files to be rendered. Content display sites can access the system and enter registration information and provide instructions to cause content to be rendered at specified areas of their content pages, and/or when specified areas of their content pages are within, or within a pre-defined distance outside of, the viewer's browser window dimensions and scrolling position, and obtain a JavaScript tag and link for placement on the content page where the content will be rendered, which tag establishes communications with the system side server when a viewer initially requests the particular content page. The system server-side application receives the JavaScript tag request, retrieves from the system database the data record corresponding to the requested page and retrieves viewer and browser address and other data from the viewers' browser request itself, and generates the custom correlator code to control content rendering to render content when and/or only to the extent that the pre-defined area of the content page is within, or within a pre-defined distance outside of, the viewer's browser screen dimensions and scrolling position. The correlator code is generated for each viewer's request of the particular content page and is customized for each viewer in that its functioning is tied to each specific viewer's browser window dimensions and scrolling position. The correlator code is written to or otherwise embedded on the content page. The correlator code determines whether the page coordinates of the pre-defined area of the content page correspond with the coordinates of the viewer's browser window dimensions and scrolling position. The correspondence may be partial or full or can be correspondence with coordinates that are a pre-defined distance outside of the viewer's browser window dimensional and scrolling position coordinates. The correlator code then generates HTML code on the content page for an HTML layer to be used as a marker for the content page area where the content will be rendered. When the pre-defined content triggering page area is also the area of the page where content is to be rendered, the content can be rendered at the specified content page area only when the correlator code determines that the designated pre-defined area of the content page is within, or within a pre-defined distance outside of, the viewer's browser screen dimensions and scrolling position. The correlator code periodically determines whether there is any correspondence between content page area coordinates and browser screen dimension and scrolling position coordinates and when the required correspondence is detected (which may be partial or full correspondence, or correspondence with coordinates that are a pre-defined distance outside of the viewer's browser window dimensions and scrolling position, as desired and as designated by system users or as programmed into the system), the correlator code prints HTML code and tags inside the previously created HTML marker and activates the query string link to cause the content to be retrieved and rendered, or other action to be triggered. Viewers can access content sites and content pages by existing or future means, such as via a viewer-end computer configured and equipped for Internet and communicating with said content display site. The electronic communications network used can be one or more of multiple network types, such as, without limitation, networks of computers communicating via common protocols such as the Internet, as well as cellular, wireless, cable, satellite, power line or other networks or combinations of such networks. Viewer-end communication devices can be a typical microprocessor-based desktop or laptop computer, or a personal digital assistant wireless phone or other electronics network communication device, typically having a microprocessor supported by a read only memory, a random access memory and input and output devices such as display screens and keyboards/keypads, capable of running a browser application. Viewers access the particular network typically via a telecommunications service provider (e.g. an Internet service provider) and use a browser application to access websites.

The content files are not limited to any particular form, and may be static HTML images or rich media files such as .swf. The content files are preferably stored at a content server. The interface means, processor means and computer communications means can have various embodiments, including, without limitation, use of traditional Internet browser applications.

The method of the present invention in a preferred embodiment comprises the steps of: designating one or more content pages, one or more content page triggering areas, one or more content page rendering areas and content files previously stored in electronic file format in a mass storage device of a computer system for rendering at said designated content page rendering area of said content page or other network location; storing as a record within a system-side database data pertaining to said content page, content page triggering area, content page rendering area and content file (the content page and the content file(s) can reside on servers other than the system server); generating and writing to or otherwise embedding on the designated content page a tag/link that when activated by a content page viewer request of the designated content page, links to a system server-side application and retrieves, via said server-side application, data from said record stored in said system server-side database and data pertaining to said viewer and viewer browser from said content page request, and generating and placing a correlator code on the designated content page which determines whether said content page triggering areas of the content page is within, or within a pre-defined distance outside of, the viewer's browser window dimensions and scrolling position; said correlator code then generating an HTML layer to serve as a marker for the designated content page rendering area where the designated content is to be rendered, generating a query string and link for placement at the content page, which when activated by the correlator code based on detection that the designated content page triggering area is within, or within a pre-defined distance outside of, the dimensions and scrolling position of the viewer's browser window, dynamically generates HTML codes and tags to render the designated content in the designated content page rendering area of the content page. FIGS. 4-A, 4-B and 4-C, discussed further below, depict the process flow of the method in a preferred embodiment.

Referring to FIG. 1, which depicts a diagrammatical overview of the interplay and overlap of a viewer's screen display area, browser application, browser window and content page, there is a content display page 2 with space on its pages for content to be rendered, which appears within a browser window 4, a portion of which is within the viewer's display screen area 3. As can be seen, the content page is larger than the browser window, so not all of the content page area is within the browser window dimensions and scrolling position shown on the viewer's display screen. The present invention can control rendering of content so that only the content that is designated to render when a pre-defined area within the content page area is within, or within a pre-defined distance outside of, the viewer's browser window dimensions and scrolling position is rendered, and so that rendering occurs only when such pre-defined content page triggering area is within, or within a pre-defined distance outside of, the viewer's browser window dimensions and scrolling position.

Figure 2:
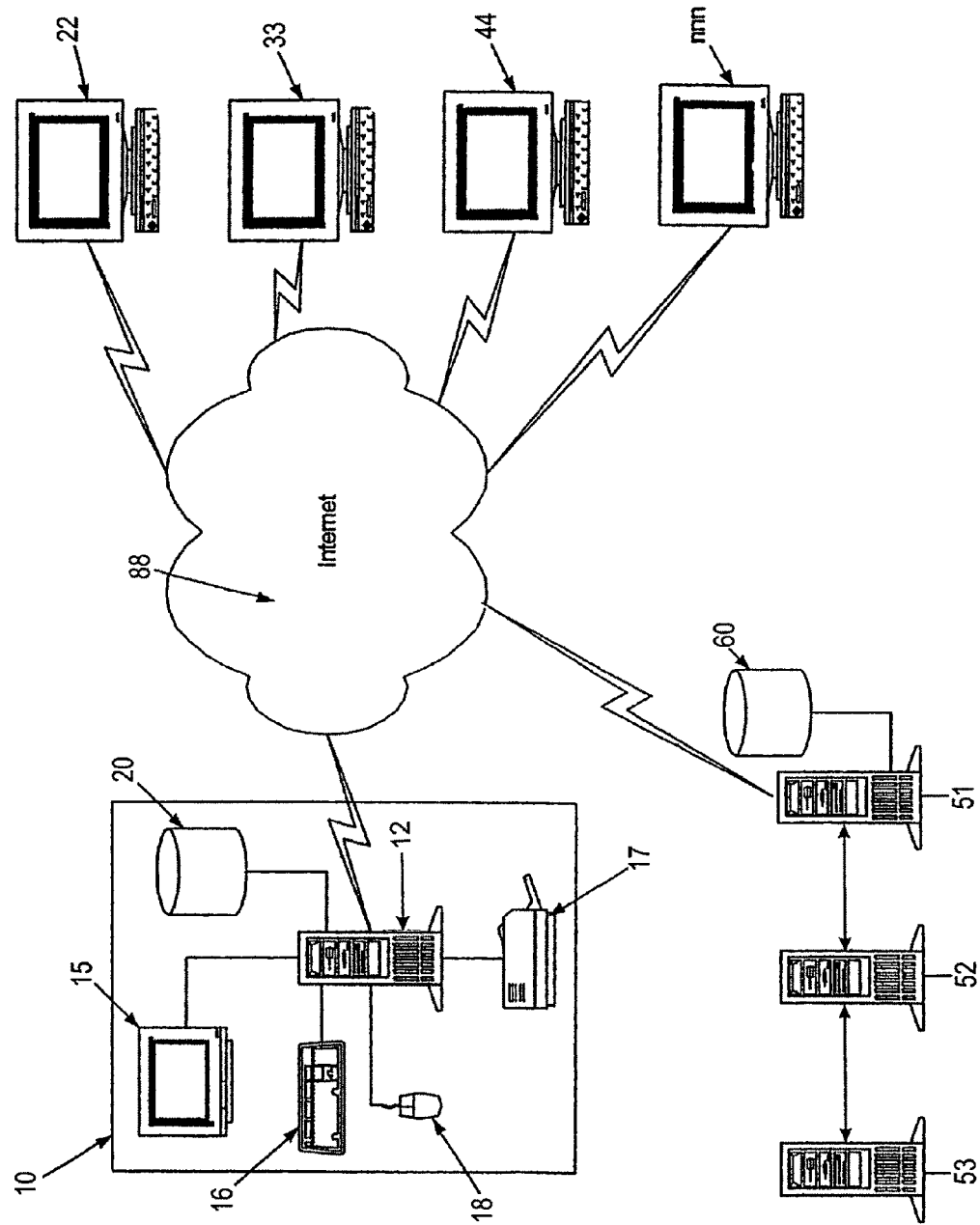
FIG. 2 is a diagrammatical representation of system components and their interrelationship with content page administrators, viewers and communications network(s).

Referring now to FIG. 2, an overview of a preferred embodiment of the present invention is shown. The present invention interacts with one or more content page viewer computer systems or other communications devices having a browser application 22, 33, 44 and nnn, and communicating via the Internet 88 with the content page computer system 10. The content page computer system 10 comprises a content page server 12 and file storage device 20 as with the typical Internet client-server model utilizing HTTP. HTTP is a known application protocol that provides users access to content in different formats such as text, graphics, images, sound, video, as well as programs. HTML is a standard page description language which provides basic document formatting and allows the programmer to specify links to other servers and files. Links are specified via a Uniform Resource Locator or URL. Upon specification of a link, the client makes a TCP/IP request to the server and receives information that was specified in that URL (for example another Web page that was formatted according to HTML) in return. The information returned may be generated in whole or in part by a program that executes on the server. Such programs are typically known as Common-Gateway-Interface scripts and can be written using known programming languages or methods that the server supports. A typical Web page is an HTML document with text, "links" that a user may activate (e.g. "click on"), as well as embedded URLs pointing to resources (such as images, video or sound) that the client must fetch to fully render the Web Page in a browser. These resources may not be located on the same server that the HTML document was sent from. Furthermore, HTTP allows for the transmission of certain information from the client to a server. This information can be embedded within the URL, can be contained in the HTTP header fields, or can be posted directly to the server using known HTTP methods. Both the viewer and the content page administrator can communicate with the system via various input and output devices, as is well-known in the art. For example, the computer system 10 preferably comprises a display screen or monitor 15, a keyboard 16, a printer 17, a mouse 18, among other devices. The computer system 10 is preferably connected to the Internet 88 that serves as one preferred communications medium. The Internet 88, as previously discussed, comprises a global network of networks and computers, public and private communicating using common protocols. The Internet 88 is the preferable connection method by content page viewers 22, 33, 44 and nnn and content page system 10 in preferred embodiments of the present invention. System end, content page end and viewer end systems can have similar hardware components.

Referring to FIG. 2, the system-end computer 50 is shown. The computer system 50, in a preferred embodiment, comprises a system-side server 51 having one or more databases, including without limitation, a content page/content page rendering area database 60, and can optionally include a tracking server 52 and one or more content file servers 53. The system-side server 51, one or more content file servers 53 and tracking server 52 preferably run in a variety of operating system environments, including MS Windows NT/2000/2003, Unix/Linux and others, and preferably utilize a variety of database management systems, including MS SQL Server, Oracle, MySQL, PostgreSQL and others. The system end computer's server 51 or other operating system has the system custom software application installed thereon.

Connectivity between the system user-end, content publisher site end, the system-end and content viewer-end may be effected in various forms without violating the scope and spirit of the present invention. In particular, network connectivity may be made by a telephone line/modem combination as is well known in the art, a dedicated ISDN line or a cable modem-type set-top-box which provides for Internet connectivity through certain forms of cable television services. Wireless or satellite-based communication can also be utilized. In each of the aforementioned cases, the computer of the website user-end portion will need to be provided with a suitable I/O card, such as a modem, ISDN card, and the like, in order to effect an appropriate interface with the network connection.

The system includes a graphical user interface for system users, typically content page administrators, to create a system account, register the content page and the area of the content page where content is to be rendered and the area of the content page that will cause rendering to be triggered when such area is within the viewer's browser window dimensions and scrolling position, and provide demographic and other pertinent information regarding the content page and information pertaining to the content file(s) to be rendered in the designated page area. The content page triggering area and the content page rendering area can be the same or different areas of the content page. The information is stored as a record in the system server-side database, and the system generates a single tag and link, preferably a JavaScript tag, with the link linking to the system server-side software application, to be placed by the content administrator at the content page where the specified content is to be rendered (although the positioning of the tag/link can be anywhere on the content page, not necessarily in the location of the page where the content is to be rendered). When the content page where the JavaScript tag and link is written/embedded is requested by a viewer via the viewer's browser, the link to the system server-side application is activated and the system server-side application retrieves the corresponding record stored in the system database for the content page and retrieves viewer and browser data from the page request itself. The system server-side software application then generates the custom correlator code. This correlator code assigns a unique ID to the particular viewer/browser and generates HTML code to be used as a marker for the content page area where the designated content will be rendered. The correlator code also generates a query string link that includes the data collected via the correlator code and stores the query string link as a variable on the content page. The correlator code includes the variables and functions to execute the browser window/content page area correlating, based on the positional coordinates of said content page triggering area and the positional coordinates of said viewer's browser window dimensions and scrolling position. When the correlator code determines that the designated content page triggering area is within (or within a pre-defined distance outside of) the dimensions and scrolling position of the viewer's browser window, the query string link stored as a variable on the content page is activated and a JavaScript tag is created that can execute any number of actions, including, but not limited to, generating JavaScript functions to initiate actions and HTML tags to request content such as a link to a content server to retrieve the data and content files for the content page and retrieve and render the designated content in the designated content page rendering area.

In a preferred embodiment, during the registration process the content page administrator enters information related to the content page such as name of page, content data, the specific area of the content page that will trigger content rendering when it is partially or completely within, or within a pre-defined distance outside of, the viewer's browser window dimensions and scrolling position, the specific area of the content page where the content will be rendered (which can be the same as or different from the content page triggering area), and demographic and other information pertaining to the content page. The system then saves this data as a record in the system server relational database, and assigns the record an id, which may be encrypted. The system then generates JavaScript code comprising a single tag with the encrypted ID, with a link to the system server-side application, and the content page administrator places this single tag/link on the content page.

When the webpage containing the JavaScript tag is requested by a viewer, the JavaScript tag link that contains an encrypted ID of the stored data record at the system database in its query string triggers the server-side software application. This custom server side software application is preferably housed in the system server and can be written in C#, PHP or any other appropriate programming language. When the tag/link is a JavaScript tag/link, the server-side application disguises itself as JavaScript in order to respond to the JavaScript tag's request, and collects a variety of information from the request such as domain/address of the content page, the IP address associated with the viewer, and other information from the stored data for the content page, such as information regarding the content file(s) to be rendered, rendering area size, previously entered content page demographics and other information retrieved from the system's relational database.

According to this initial information, as a response, the server side application generates and prints on the content page additional JavaScript code that dynamically creates HTML code on the content page for an HTML layer to be used as a placeholder or marker for the area of the content page where the content is to be rendered and contains all the necessary variables and functions to execute the rendering control and data gathering process described herein from the viewer's browser and the content page, correlating content page rendering area with viewer browser window dimension and scrolling position data. This code also collects additional information available from the viewer's browser such as the viewer's operating system, browser version, as well as a unique browser/user computer id that is assigned to the particular viewer/browser, which can be created by the correlator code itself, or can be created by the system server-side software application and retrieved from cookies or from the system database. The correlator code also gathers the most frequently occurring words in the content page text (for content page indexing), and a list of other content that was already rendered on the page to prevent duplication of the same content on the page and other specific filtering and management—for instance while rendering an image in one content rendering it may be preferred to stop loading video in another content rendering—and/or custom information previously stored in cookies, and information collected from the content page. A query string link is then created and all collected information is attached. Then this query string which is stored as a variable on the web page. A webpage or other content page may be divided into or otherwise contain any number of pre-defined designated content rendering areas and the system can monitor if any of those pre-defined content rendering areas of the content page are within the dimensions and scrolling position of the viewer's browser window. If any of the pre-defined content rendering areas come within, or within a pre-defined distance outside of, the viewer's browser window dimensions and scrolling position, the query string link that is stored as a variable on the page is activated and the system dynamically prints HTML code and tags inside the HTML marker that was previously created at the pre-defined content page area where the content will be rendered to render the content in the designated area. The content page area/browser dimension and scrolling position correlator code communicates with the system side-server as well as the content page and the browser.

The system in one embodiment can provide for the rendering of content and communication with a remote server or servers to render content and send content activity information in the form of a self-contained file. Preferably, such file is a flash file identified by the .SWF suffix or any comparable code such as, without limitation .net, .asp or AJAX. The use of the Macromedia/Adobe Flash file is preferred because of the ability to provide, with Action script, instructional code within the .swf file and communicate with the javascript correlator code and because nearly all customer computer systems have been enabled with the Flash player as a result of normal Internet browser configuration. Also, .swf files have become more universal, and able to execute in a variety of devices, including cell phones, PDA's, television and other devices. It is to be understood that under the teachings of the present invention, any type of file that is capable of operation without the initiation of an additional application could be used in place of Flash and the .swf file and use of a .swf file is not a limitation of the present invention. The content rendering module does not perform the function of the correlator code; instead, the correlator code exists and functions as described above and when it detects the correspondence between the pre-defined content page triggering area and the viewer's browser window dimensions and scrolling position, it triggers the loading of the content rendering module, which renders the content instead of triggering content rendering directly. Enhanced viewer activity tracking can be enabled by use of a .swf or other self-contained application described herein that is referred to as a "content rendering module" and is embedded in the content page, when the correlator code determines that the content rendering area is within (or is within a pre-defined distance outside of) the viewer's browser window dimensions and scrolling position, which includes all necessary code to communicate with the correlator code, a content server and the system server or tracking server. The content rendering module then renders content within itself and gathers additional data regarding viewer actions, such as, for example, clicks, videos watched, length of time video is watched, among other data and communicates that data back to the system database at the system server or tracking server. When the correlator code determines that the content rendering area is within (or is within a pre-defined distance outside of) the viewer's browser window dimensions and scrolling position, the correlator code dynamically prints HTML code and tags inside the layer-placeholder that embeds the content rendering module at the rendering area on the content display page. The request for this module contains the previously stored query string with unique id of the module (described above) and the information collected from the system server, viewer's browser and website page (described above) so all of this information is effectively passed to the module. The content rendering module, according to the information in the query string, then renders content from one or more content servers within itself. The correlator code described above communicates with the browser and web page to correlate the coordinates for the pre-defined content page triggering area of the web page within the viewer's browser window dimensions and scrolling position and communicates the information to the content rendering module. The messages can be sent to the content rendering module continually in pre-defined increments, such as every second, or fraction of a second, essentially communicating to the content rendering module how many seconds the area of the webpage is available in a viewer's browser window. In addition, the content rendering module itself collects information related to the content rendered, including, but not limited to, clicks, videos watched, and other data. The content rendering module then sends the information it is collecting to the system server or tracking server at pre-defined intervals (information can be sent immediately, or collected and sent). All of this information can be sent from the content rendering module to the system server or tracking server(s) and can be stored in the system (or other) database(s) using file server direct communication or FSDC technology. Tracking information can be sent to a tracking server for storage and retrieval by system users. FSDC is a method to establish a direct connection between a self-contained self-executing file and a custom network server-based application. FSDC preferably uses a .swf file or alternately an HTML or AJAX file which sends a query string directly to a specific URL or a desired network server without loading a variable from the file or requests to the history object of a viewer's network browser, as more fully described in U.S. Pat. No. 7,313,590, which is incorporated by reference herein. The files include instructional coding that allows the file to establish a direct connection with one or more servers, including servers storing content files that can then be run, and servers that when contacted track the access and use of the content files. A one-way non-conversational message is sent from a file to a system server in the form of a query string and URL corresponding to a custom server-based application on a system server without having to use a browser for such message. In one embodiment, content rendered via such a content rendering module can communicate, via the content rendering module, with the web page area/browser window dimensions and scrolling position correlator code with useful effect; for example, a video may be part of the advertisement rendered at the designated content page area via the content rendering module and upon viewer's click on an optional video preview button the same correlator code creates another dynamic layer above all the existing layers on the web page that covers a certain portion of the viewable area of the browser window to show content/video above the content of the page. The same content page area/browser dimension and scrolling position correlator code tracks how many times content was rendered at a particular rendering area and how many other rendering areas are designated on a content page but are not in view because the area on the content page where such rendering area is located was not within, or not within a pre-defined distance outside of, the dimensions and scrolling position of the viewer's browser window or did not completely render for a certain period of time. The same web page area/browser window dimensions and scrolling position correlator code can also keep track of content rendering module Id's to prevent duplication of content on the same page. The same correlator code also may store the collected and or custom information in cookies using the website domain for the page where the content rendering area is located and may request it later and send this information, when needed, to the domain of the system server for tracking and reporting. This feature is optional and designed to optimize the process, for if information previously gathered in cookies can be saved and retrieved when a viewer returns to the web page there is no processing unnecessarily repeated by the system. It is important to note here that if optional cookies are utilized by the system, they are saved by the content page/website itself, and consequently attributed to the content page/website's domain, not the content rendering module system server domain, so the cookies are not considered "third party" or data mining cookies that are typically flagged or blocked by web security applications. When a viewer leaves or closes the content page the correlator code indicates to all the content rendering modules that are then loaded how much time, if any, that their content has been rendered and sends this information to the system server or tracking server using FSDC and the data can be stored in a system or other database. The record that is already stored is updated.

The correlator code described above periodically checks the location of the content rendering area location (the HTML layer marker on the content page). The portion of the designated content triggering area that needs to fall within the browser window dimensions and scrolling position in order to initiate content rendering can be varied, and may be customized by the system administrator. For example, the system may send a message that the content is available when 90% of the designated content page triggering area is within the viewer's browser window dimensions and scrolling position, or is within a specified distance from the viewer's browser window dimensions and scrolling position. The area/browser dimension and scrolling position correlator code at the content page can send these messages to a content rendering module or server side application continually in pre-defined increments, such as, for example, every second, or fraction of a second, communicating to the dimensions and scrolling position of the viewer's browser. The content rendering module then sends the information it is collecting from the content rendering area/browser dimension and scrolling position correlator code to the content rendering module database, which is preferably housed in the server for tracking at pre-defined intervals (information can be sent immediately, or it can be collected and sent periodically.)

Figure 7:
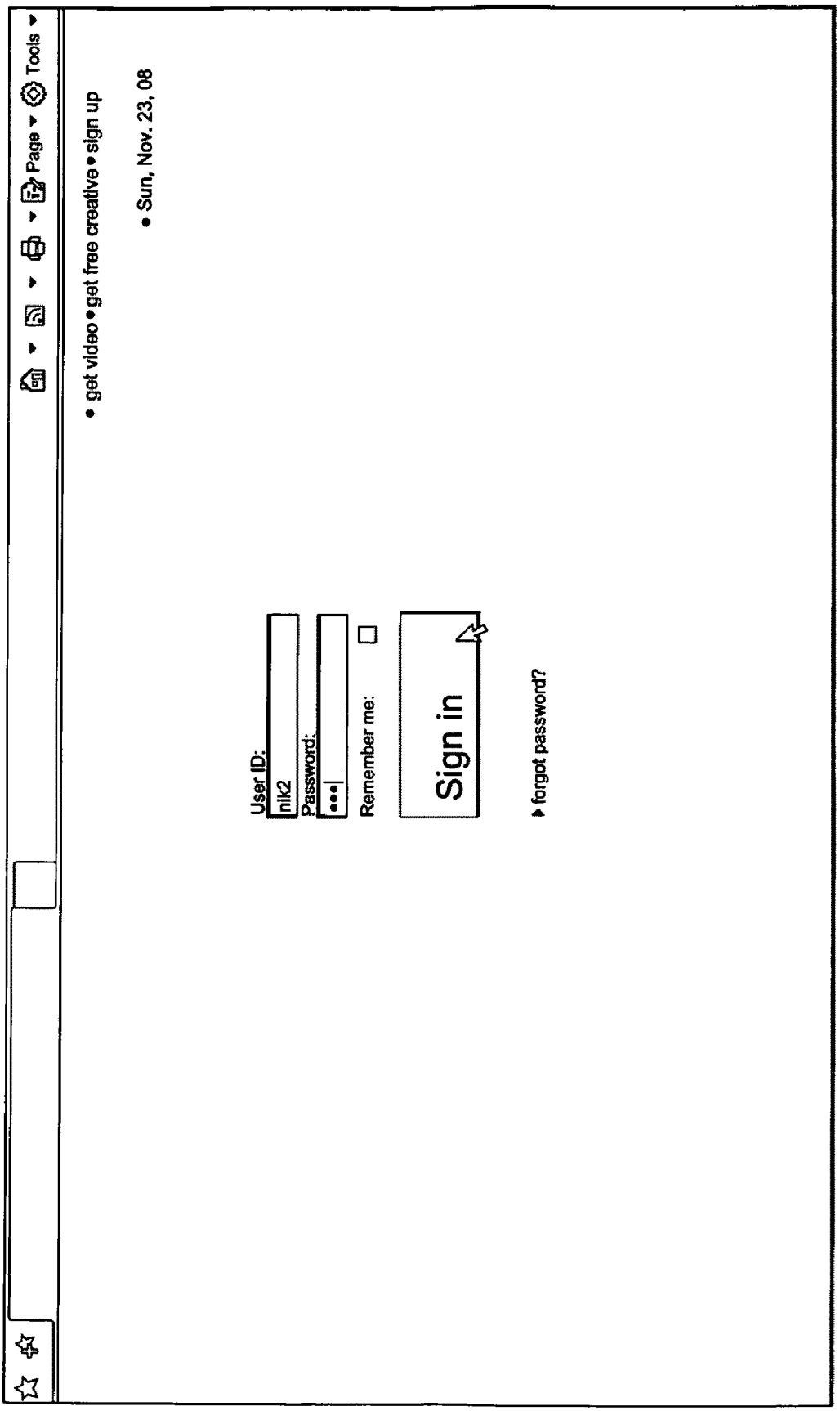
FIG. 7 depicts a sample system content site administrator user login screen.
Figure 8:
FIG. 8 depicts a sample system user site registration screen showing data entry relating to content page title, uniform resource locator address and optional logo image.
Figure 11:
FIG. 11 depicts a sample user registration screen whereby content page administrators enter their content page audience demographic data.
Figure 12:
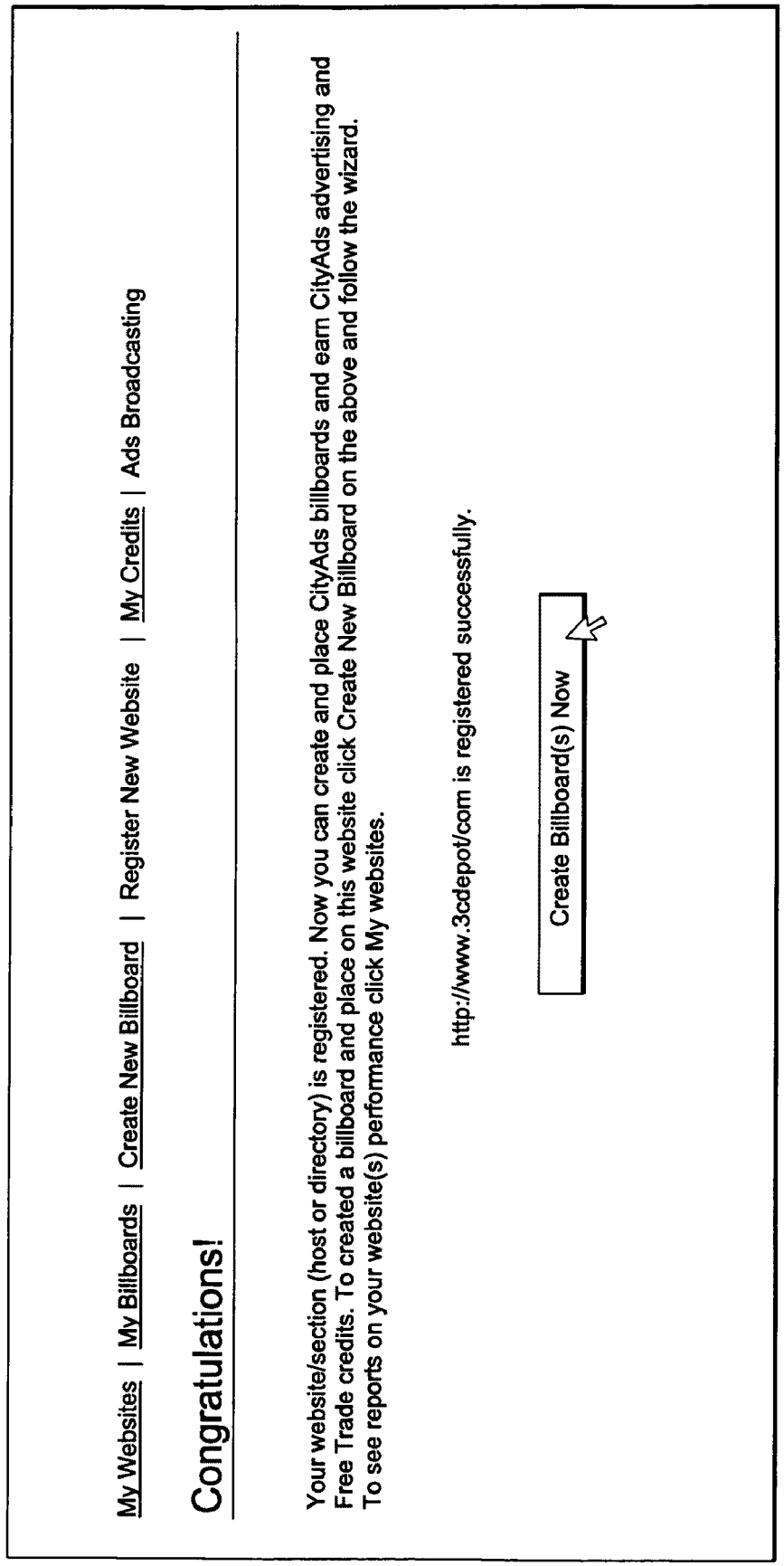
FIG. 12 depicts a sample content page registration confirmation screen.
Figure 14:
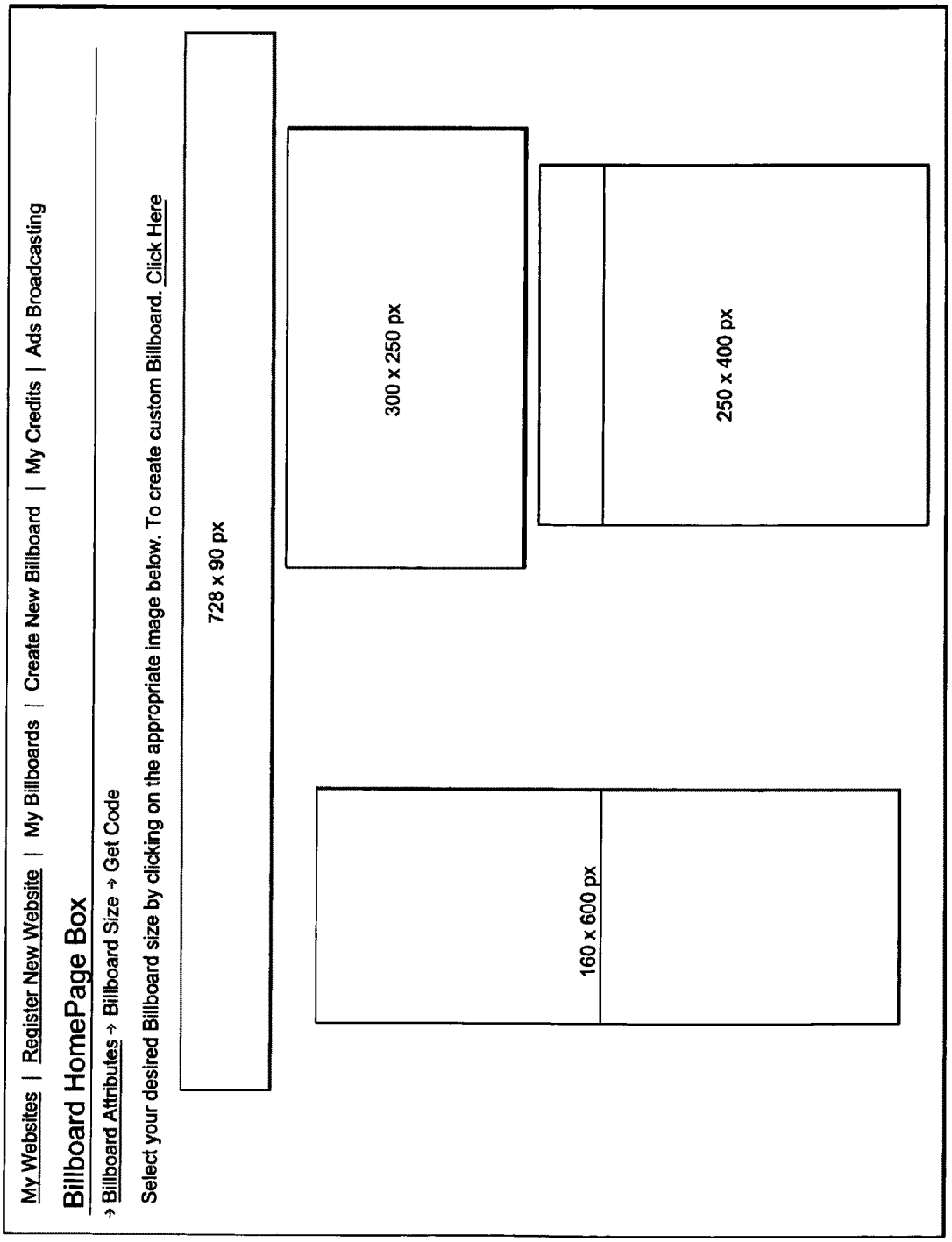
FIG. 14 depicts a sample content page rendering area dimension selection screen.
Figure 15:
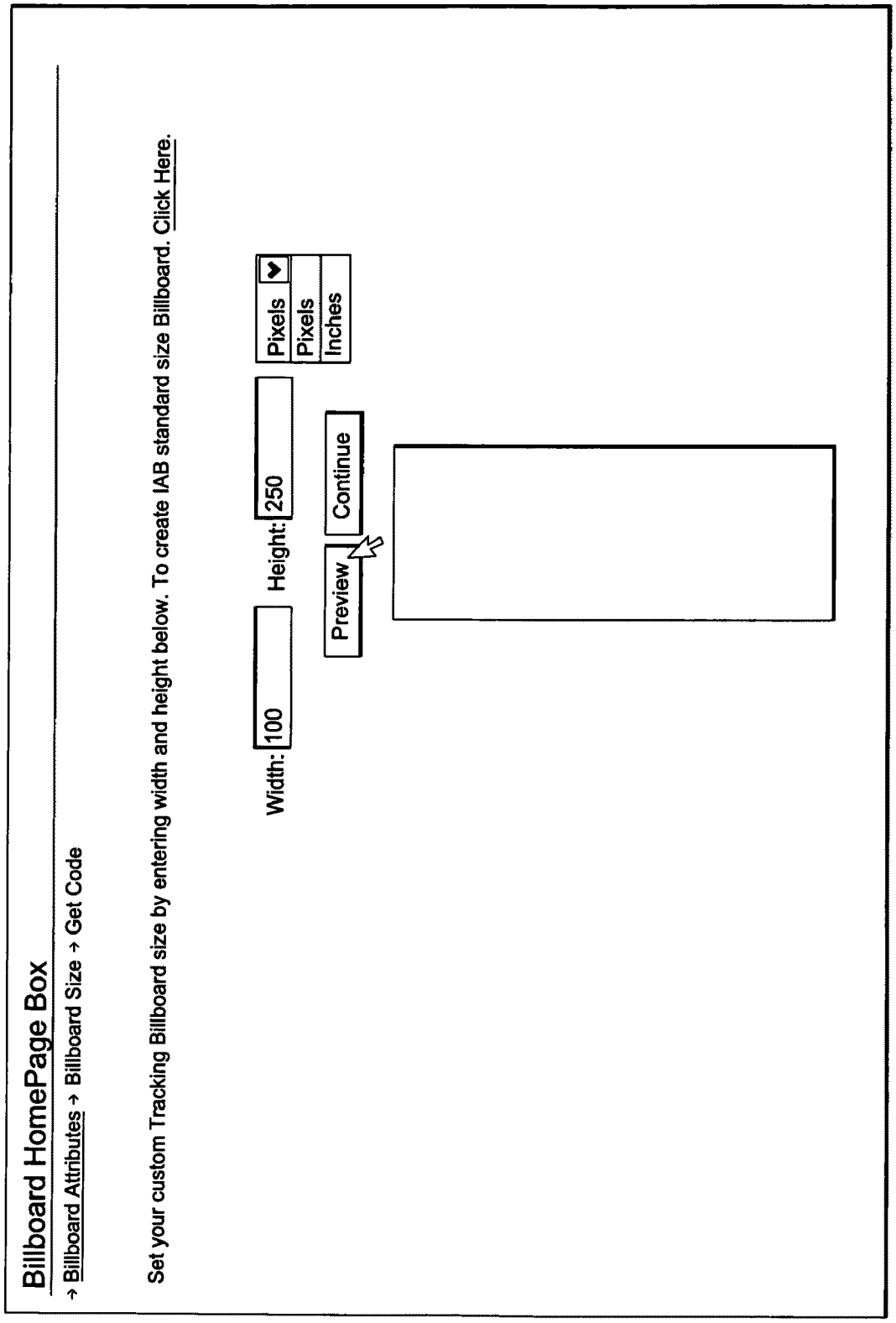
FIG. 15 depicts a sample content page rendering area dimension specification screen.

The system is preferably made available to website operators via a system website for use by them after registering as a website content administrator. Referring to FIGS. 4-A, 4-B and 4-C, which shows the process flow of the method implemented with the system of the present invention, as shown in FIG. 4-A, a content page administrator accesses the system, which is preferably accessible via the Internet as a website, and is presented with the system graphical user interface screens, beginning with a registration screen. FIG. 6 depicts a sample system content site administrator user registration screen whereby a content page administrator can register with the system. FIG. 7 depicts a sample system login screen. As shown in FIG. 4-A, content page administrators first register with the system 100 as a content display site administrator and enter data pertaining to the content page, the content page triggering area that will trigger content rendering when it is within, or within a pre-defined distance outside of, the viewer's browser window dimensions and scrolling position, the area of the content page where the designated content will be rendered (which may be the same area as the area of the content page that will trigger rendering of such content when such area is within, or within a pre-defined distance outside of, the viewer's browser window dimensions and scrolling position), as well as designating the content to be rendered in a particular area of the content page, content page demographics and other pertinent information 200. The system user interface screens provide means for receiving from content page administrators the content page address, content file information (which may be in the form of instructions to retrieve one or more content files stored in a content server or storage device), content display area parameters and other content page data from content page administrators and system server with a database for storing one or more records containing such data, each record being given an identification code. FIG. 8 depicts a sample system user registration screen showing data entry relating to content page title, uniform resource locator address and optional logo image. FIG. 9 depicts a sample user registration screen whereby content page administrators enter their content page's primary audience geographic location. Content page administrators can select the geographic region that represents the location of the content page's primary audience, if any. FIG. 10 depicts a sample user registration screen whereby content page administrators enter their content page's content type. FIG. 11 depicts a sample user registration screen whereby content page administrators enter their content page audience demographic data. FIG. 12 depicts a sample content page registration confirmation screen. FIG. 13 depicts a sample content page rendering area creation screen. Content page administrators can designate a content page rendering area for a content page by entering a name for the content page rendering area, selecting a previously registered content page, and designating content distribution parameters. FIG. 14 depicts a sample content page rendering area dimension selection screen, whereby content page administrators can select one or more pre-set content page rendering area dimensions. FIG. 15 depicts a sample content page rendering area dimension specification screen where content page administrators can enter customized content page rendering area dimensions and position parameters.

Figure 16:
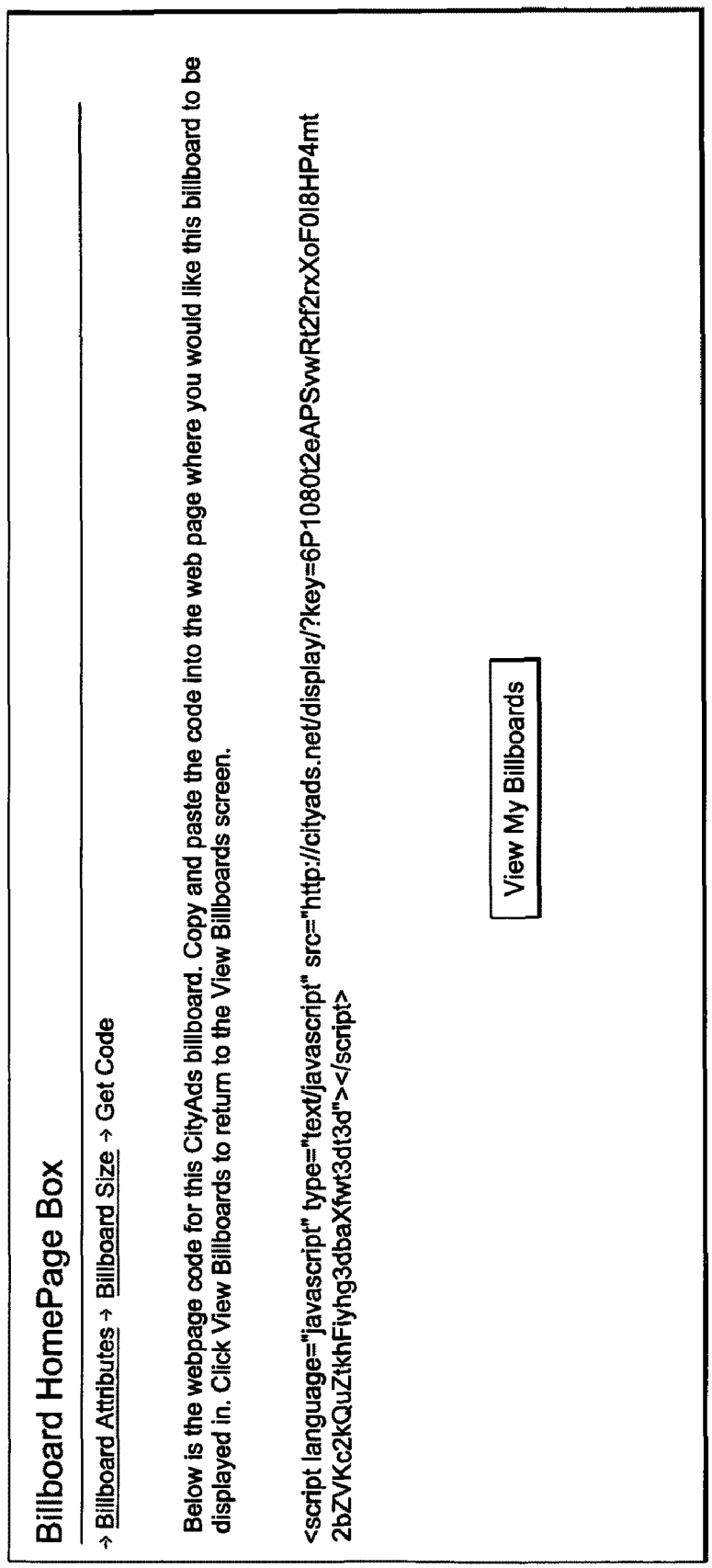
FIG. 16 depicts a sample screen wherein a JavaScript tag with link to the system server-side application is generated for content page administrators to copy and paste into the page code of the content page in which the designated content page rendering area resides.

Referring to FIG. 4-A, the above-referenced data is then saved by the system as a data record in the system database and an identification code is assigned to the data record 300, as shown in FIG. 15. The system software applications then generate a JavaScript tag with the link to the system server-side application including the TD of the record stored in the system database pertaining to the particular content page, content rendering area and content 400, and the content page administrator places the JavaScript tag and link on the content page 500. The tag includes the identification code for the corresponding record stored in the system database and a link to a system server-side application. FIG. 16 depicts a sample screen wherein a JavaScript tag with link to the system server-side application is generated for content page administrators to copy and paste into the page code of the content page in which the designated content page rendering area resides.

Figure 3:
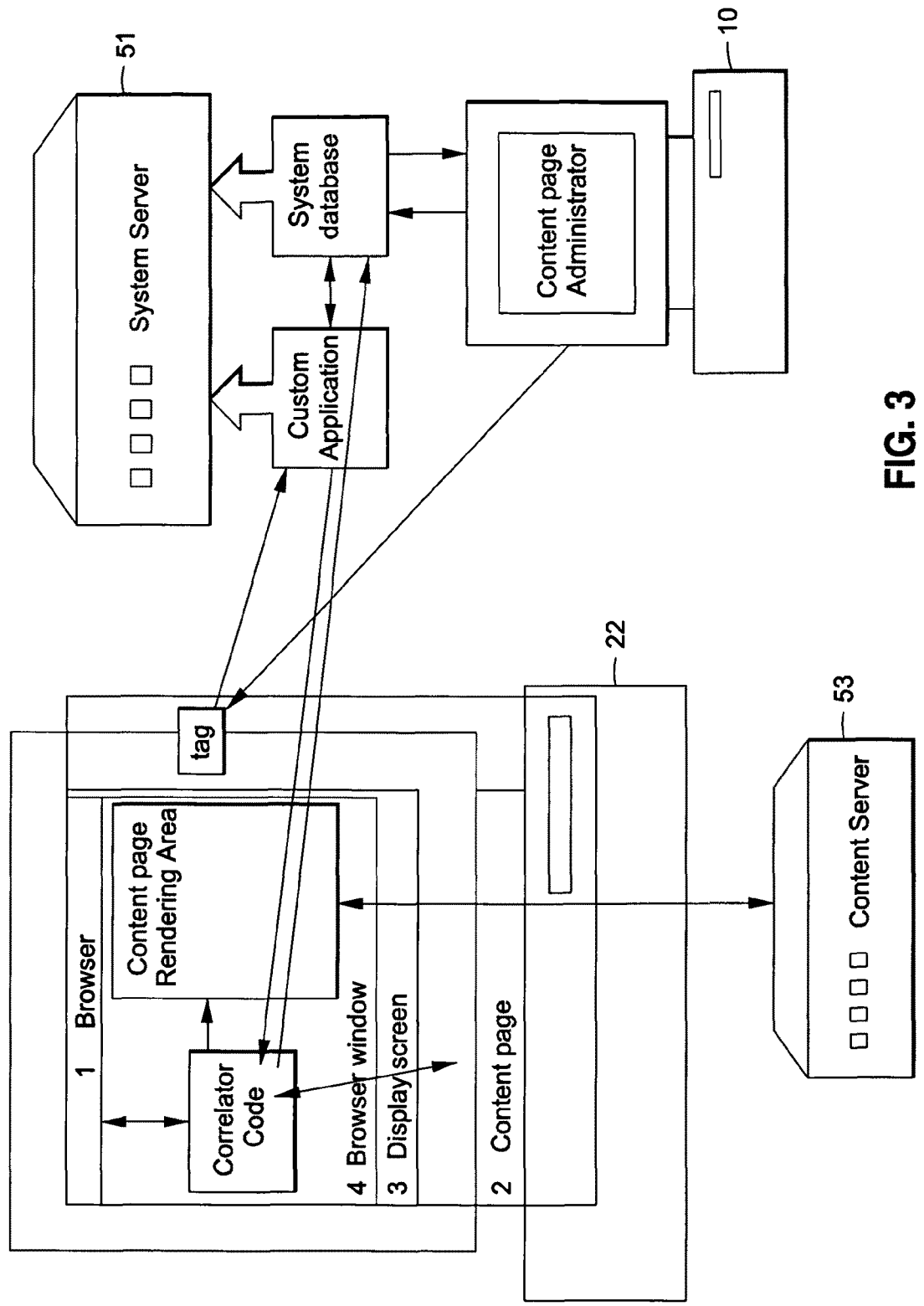
FIG. 3 is a diagrammatical overview of the communication flow among system components, content page administrators and website viewers.
Figure 5:
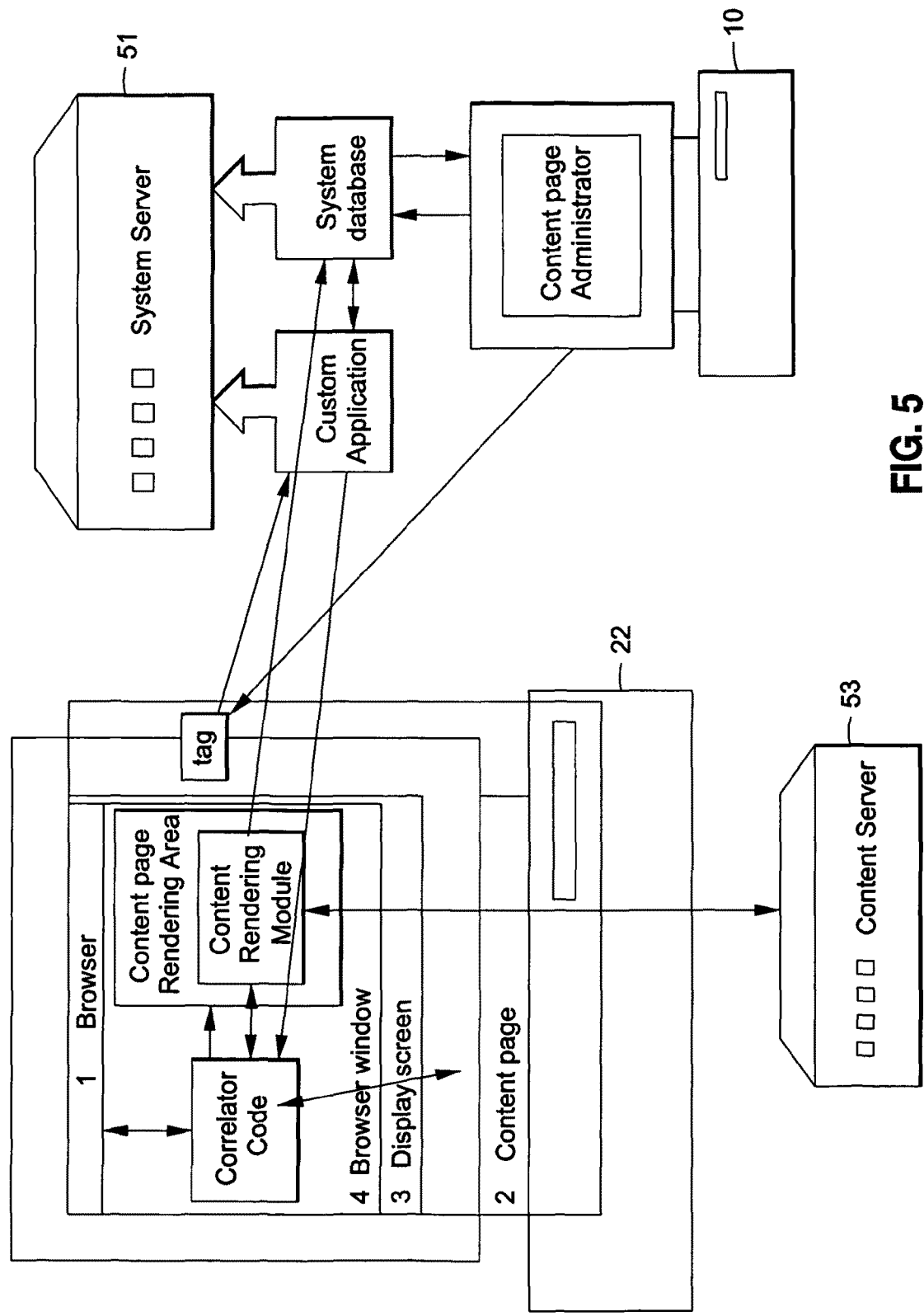
FIG. 5 is a diagrammatical representation of the communication between system components in an embodiment using a content rendering module.

As shown in FIG. 4-B, when a content page viewer requests the content page that has such JavaScript tag and link 600, the request activates the link to the system server-side application and the system application collects a variety of information from the viewer's HTTP request, including, but not limited to, the address of the content page and the viewer's network address (for example, the Internet Protocol address associated with the viewer when the network is the Internet) 700, and retrieves the corresponding data record stored in the system server database, and generates code, preferably JavaScript code, referred to as a "correlator code," which is written to or otherwise embedded on the content page. This correlator code then dynamically generates HTML code on the content page for a layer to be used as a marker for the content page area where the content will be rendered 800. The correlator code can be positioned anywhere on the content page, not necessarily the location on the content page where the particular content will be rendered. A unique identification code is then assigned to the particular viewer/browser which can be created by the correlator code itself, or can be created by the system server-side software application and be retrieved from cookies or from the system database. The correlator code collects additional information from the viewer's browser, including, without limitation, the viewer's operating system and browser type/version, the most frequently occurring words in the web page text, and a list of other content that was already rendered on the page to prevent duplication of the same content on the content page, among other data 900. The correlator code application then generates a query string link including the data collected via the correlator code and the query string link is stored as a variable on the content page 1000. The correlator code periodically checks viewer browser screen coordinate data from the viewer's browser application with content page coordinates for the content page triggering area. FIG. 3 provides a diagrammatical representation of the communication flow between system components, content page administrators and content page viewers, and FIG. 5 provides a diagrammatical representation of the communication flow between system components, content page administrators and content page viewers in an embodiment that includes a content rendering module. The various arrows indicate the flow of communication between system components as the system operates, as explained below. As a viewer scrolls through a content page (whether up and down or left and right) or the viewer's browser window dimensions change, the correlator code periodically checks the viewer's browser window scrolling position and dimensional coordinates and when there is correspondence (either partial or full, as has been designated or programmed into the system) between the browser window coordinates and the coordinates for the pre-defined content page triggering area (or between coordinates that are a pre-defined distance outside of the viewer's browser window dimensional and scrolling position coordinates) 1100, the query string link is activated, the correlator code dynamically generates HTML code and tags inside the previously generated HTML marker where the content will be rendered 1200 and the content is rendered in the designated content page rendering area 1300. The correlator code also records at the content page data retrieved from the viewer's browser regarding the rendering of the content, including, but not limited to the IP address associated with the viewer, browser and operating system version, unique identifier assigned by the server side application and information related to the text on the web page. The communication flow between system components is indicated in FIG. 3 by the arrows: Content page administrator 10 registers content page data with the system server 51 and the information is stored as a data record in the system database which resides in the system server, with a tag/link sent back from the system to the content page administrator 10 (as indicated by the arrows between content page administrator 10 and system database), who then places such tag/link on the content page (as indicated by the arrow from content page administrator 10 to the content page 2 at "tag"). When a viewer requests the content page 2, the tag links to the custom application (as indicated by the arrow from tag to custom application), the custom application retrieves data from the database (as indicated by the arrows between custom application and system database). The custom application then generates the correlator code and it is written to or otherwise embedded on the content page (as indicated by the arrow from the custom application to the correlator code box in the content page 2). The correlator code communicates with the content page 2 and with browser 1 as indicated by the arrows between said elements and also dynamically generates the HTML layer that serves as a marker for the content page rendering area (as indicated by the arrow between the correlator code and the content page rendering area boxes). When the correlator code determines that the content page triggering area, which, in the case of FIG. 3, is the content page rendering area, the query string link that is stored as a variable on the content page is activated and the correlator code dynamically generates HTML code and tags inside the HTML marker and the content is retrieved from content server 53 and the content is rendered in the content page rendering area (as indicated by the arrows between the content page rendering area and the content server). The correlator code communicates directly back to the system database with data retrieved from the browser and content page (as indicated by the arrow from the correlator code back to the system database).

FIG. 4-C is a process flow diagram showing steps of the method of the present invention in a preferred embodiment that utilizes a "content rendering module." When the designated content page triggering area (which may be the same as the content page rendering area) is determined to be within the viewer's browser window dimensions and scrolling position, the content rendering module is requested. The correlator code in this embodiment dynamically prints HTML code and tags inside the layer/marker that retrieves from a remote server, system server or the content server, and embeds a .swf file referred to as a "content rendering module" The "content rendering module" is preferably a .swf file or any comparable code such as .net .asp, AJAX or other form that contains all the necessary code to communicate with the correlator code on the webpage, retrieve and render content from a remote content server and send and retrieve data and variables from a remote server or servers. The request contains the previously stored query string with unique ID of the content rendering area stored in a remote server and the information previously collected by the system database and correlator code 1200 (all of which is passed to the module). When the content rendering module set inside the content page rendering area is loaded and initiated it establishes communication with the correlator code on the content page where it is embedded as well as the system server or any remote server with the appropriate network protocol. 1300. The content rendering module then sends a request to the content server where the designated content files are located or to a database where a command and parameter file is stored with commands and parameters to retrieve, assemble and load the designated content files, and the content is rendered within the module area 1400. The content rendering module then checks if all of the elements of the content are loaded and rendered and communicates that this is so to the correlator code 1500. The correlator code continues to monitor the location of the content page rendering area and once it receives a signal from the content rendering module that the content is loaded and rendered it communicates back to the content rendering module whether it is within the viewer's browser window dimensions and scrolling position or not 1600. The content rendering module then sends information it is collecting via the correlator code to a system database, residing in the system server for reporting, preferably using FSDC 1700. The communication flow between system components is indicated in FIG. 5 by the arrows: Content page administrator 10 registers content page data with the system server 51 and the information is stored as a data record in the system database which resides in the system server, with a tag/link sent back from the system to the content page administrator 10 (as indicated by the arrows between content page administrator 10 and system database), who then places such tag/link on the content page (as indicated by the arrow from content page administrator 10 to the content page 2 at "tag"). When a viewer requests the content page 2, the tag links to the custom application (as indicated by the arrow from tag to custom application), the custom application retrieves data from the database (as indicated by the arrows between custom application and system database). The custom application then generates the correlator code and it is written to or otherwise embedded on the content page (as indicated by the arrow from the custom application to the correlator code box in the content page 2). The correlator code communicates with the content page 2 and with browser 1 as indicated by the arrows between said elements and also dynamically generates the HTML layer that serves as a marker for the content page rendering area (as indicated by the arrow between the correlator code and the content page rendering area and content rendering module boxes). When the correlator code determines that the content page triggering area, which, in the case of FIG. 5, is the content page rendering area, the query string link that is stored as a variable on the content page is activated and the correlator code dynamically generates HTML code and tags inside the HTML marker and the "content rendering module" is retrieved from a remote server 53. The content rendering module when initiated establishes communication with the correlator code on the webpage and the system database residing on the system server then requests, loads and renders content from a remote content server and the content is rendered in the content page rendering area (as indicated by the arrows between the content page rendering area and the content server). The correlator code communicates in this embodiment directly back to the content rendering module rather than directly to the system database, with the content rendering module then communicating back to the system database, with data forwarded by the correlator code which was retrieved from the browser and content page (as indicated by the arrows from the correlator code to the content rendering module and from the content rendering module back to the system file).

Figure 17:
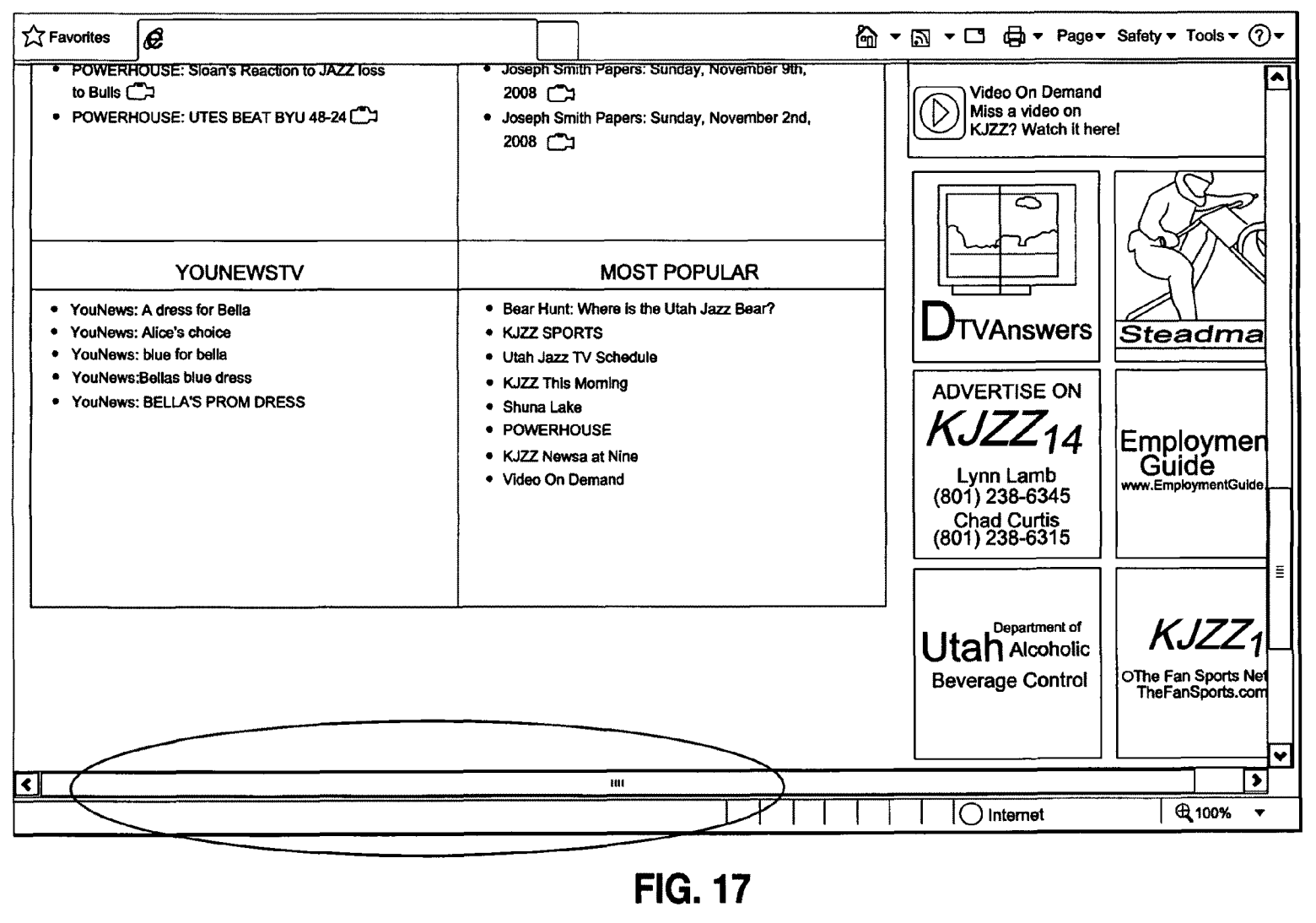
Figure 18:
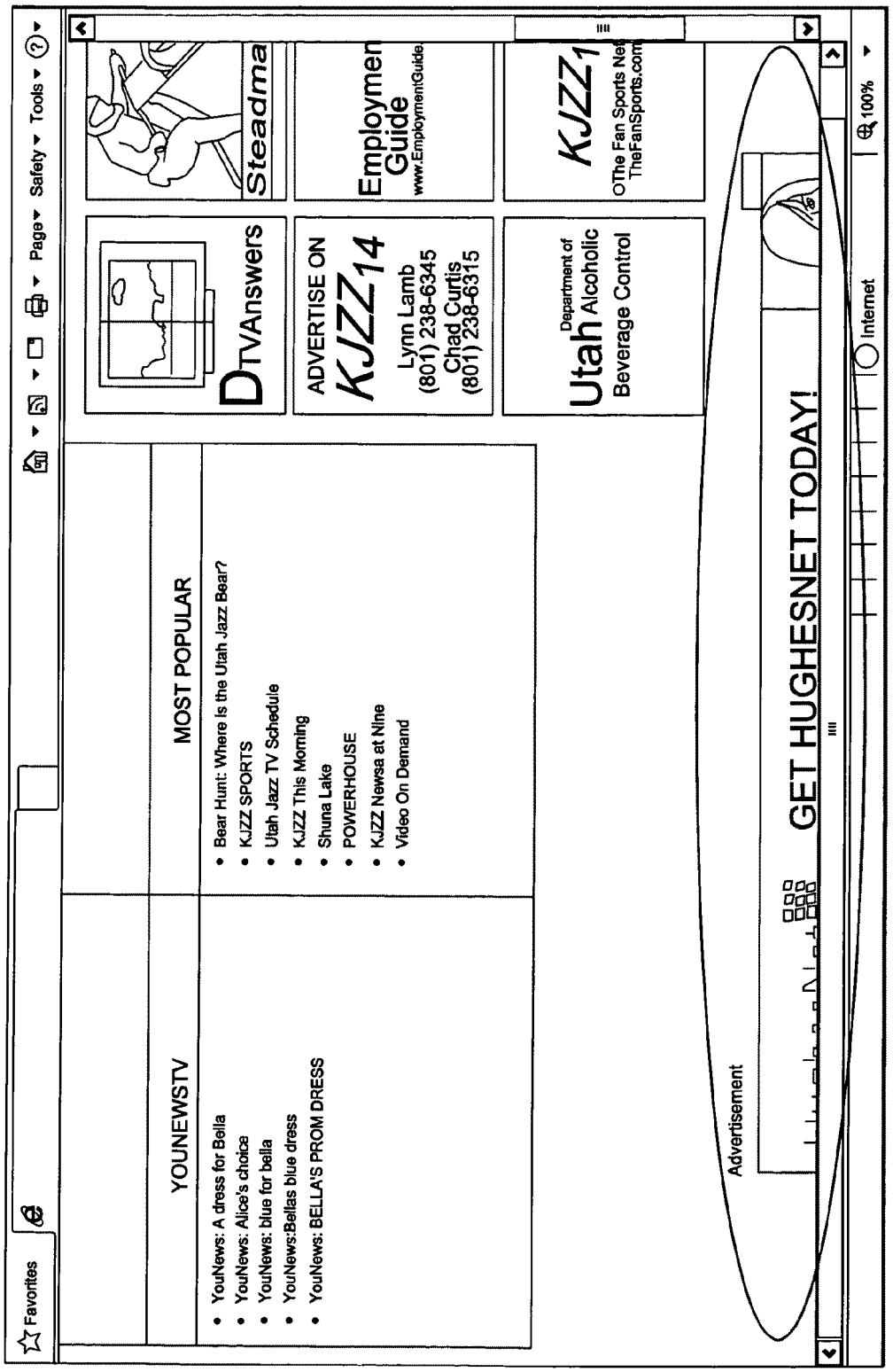
FIG. 18 depicts a sample content page with the content rendering area entering the viewer's browser window dimensions and scrolling position, noted by an oval indicator.
Figure 19:
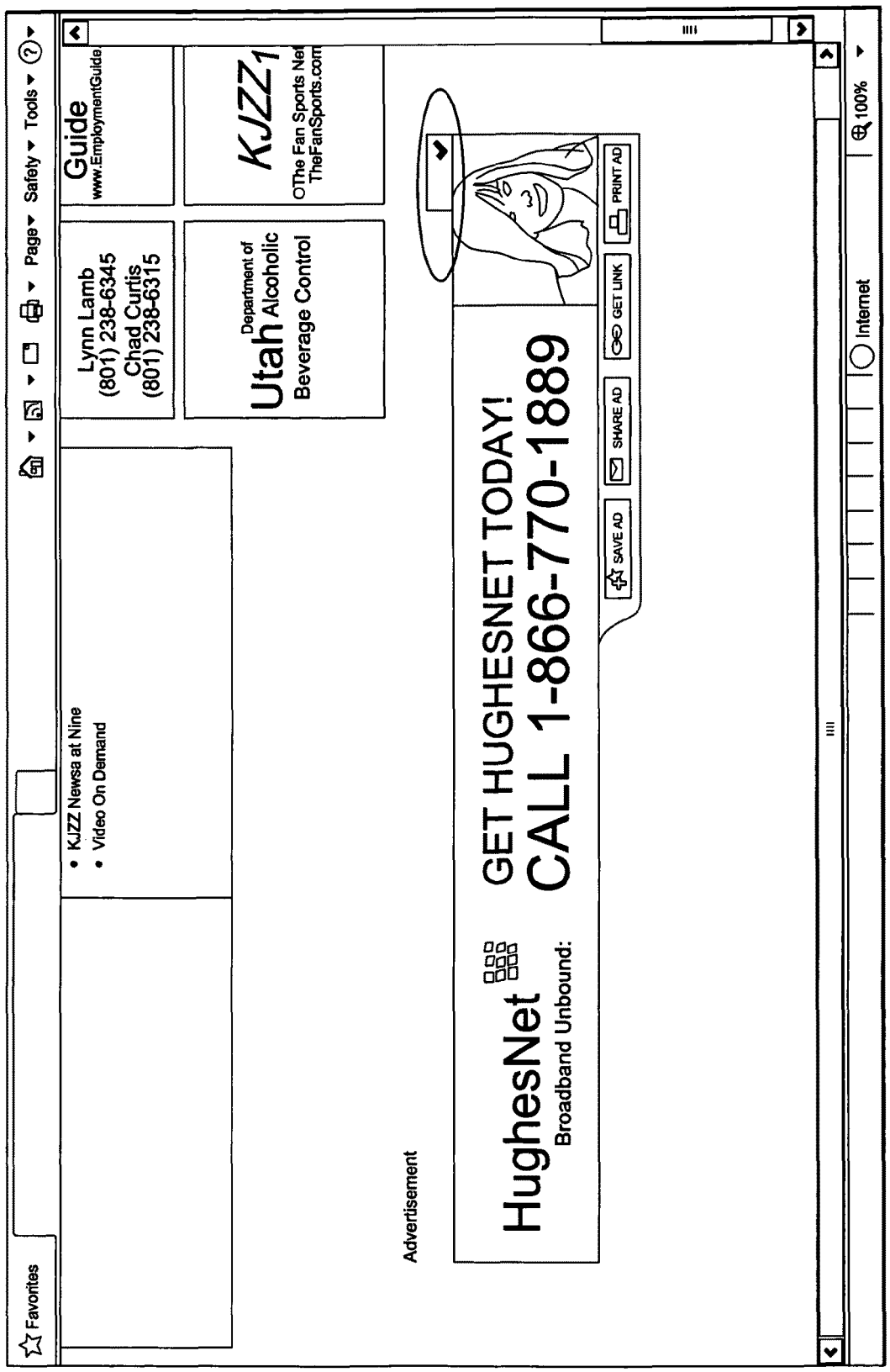
FIG. 19 depicts a sample content page with the content rendering area fully within the viewer's browser window dimensions and scrolling position.
Figure 20:
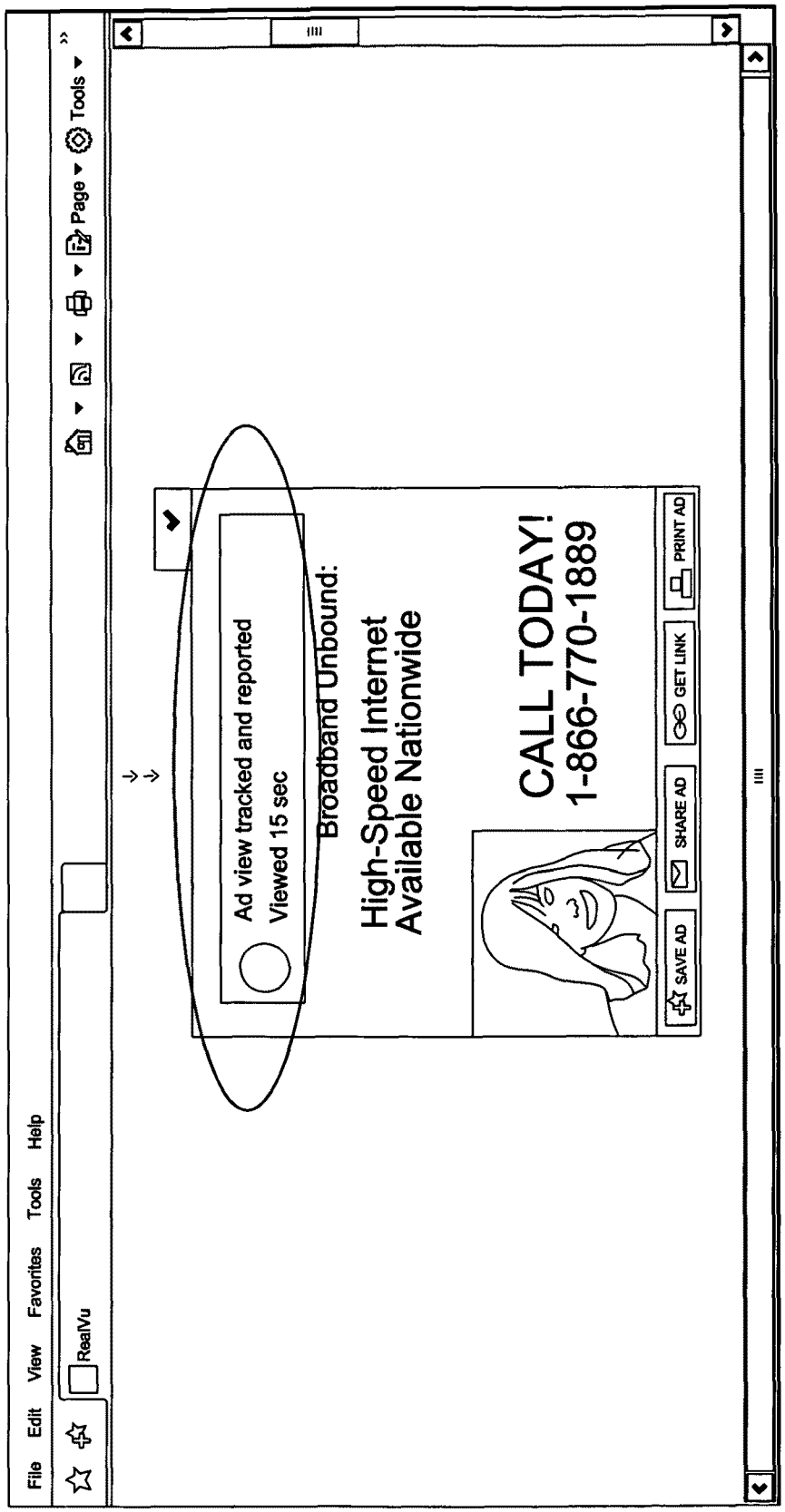
FIG. 20 depicts a sample content page with the content rendered and an indicator showing the time that the content has been rendered.
Figure 21:
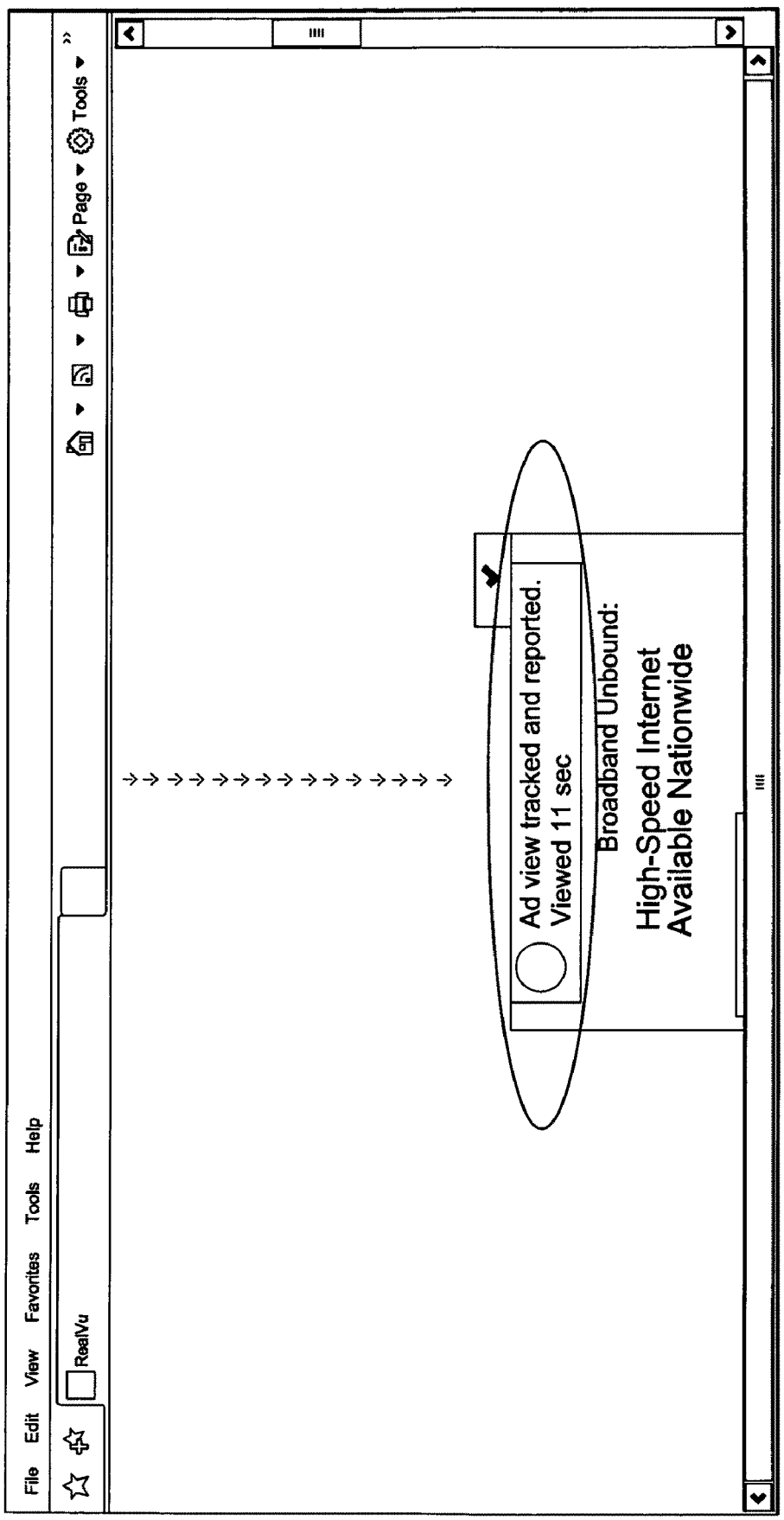
FIG. 21 depicts a sample content page with the content rendering area partially outside of the viewer's browser window dimensions and scrolling position.

FIG. 17 depicts a sample content page as presented to a content page viewer, with the content rendering area of the content page located below the viewer's browser window dimensions and scrolling position, noted by an oval indicator. Content rendering is not yet triggered because the designated area of the content page that must be within the viewer's browser window dimensions and scrolling position is not yet within such dimensions and scrolling position. FIG. 18 depicts a sample content page with the content rendering area entering the viewer's browser window dimensions and scrolling position. At this point, if content rendering is set to trigger when the designated area of the content page is partially within the viewer's browser window dimensions and scrolling position, the correlator code would proceed to activate content rendering. FIG. 19 depicts a sample content page with the content rendering area fully within the viewer's browser window dimensions and scrolling position. As this point, if content rendering is set to trigger when the designated area of the content page is wholly within the viewer's browser window dimensions and scrolling position, the correlator code would proceed to activate content rendering. FIG. 20 depicts a sample content page with the content rendered and an indicator showing the time that the content has been rendered. FIG. 21 depicts a sample content page with the content rendering area partially outside of the viewer's browser window dimensions and scrolling position. As the designated content page area that has to be either partially or wholly within the viewer's browser window dimensions and scrolling position is no longer within such dimensions and scrolling position, the previously rendered content can be removed from the page and/or be replaced with new content and content related to the content page area that is then within the viewer's browser screen dimensions and scrolling position would be triggered for rendering. The system rendering counter stops counting when the predefined page area is no longer within the viewer's browser window dimensions and scrolling position, and can resume counting if the area returns within the viewer's browser window dimensions and scrolling position.

Figure 24:
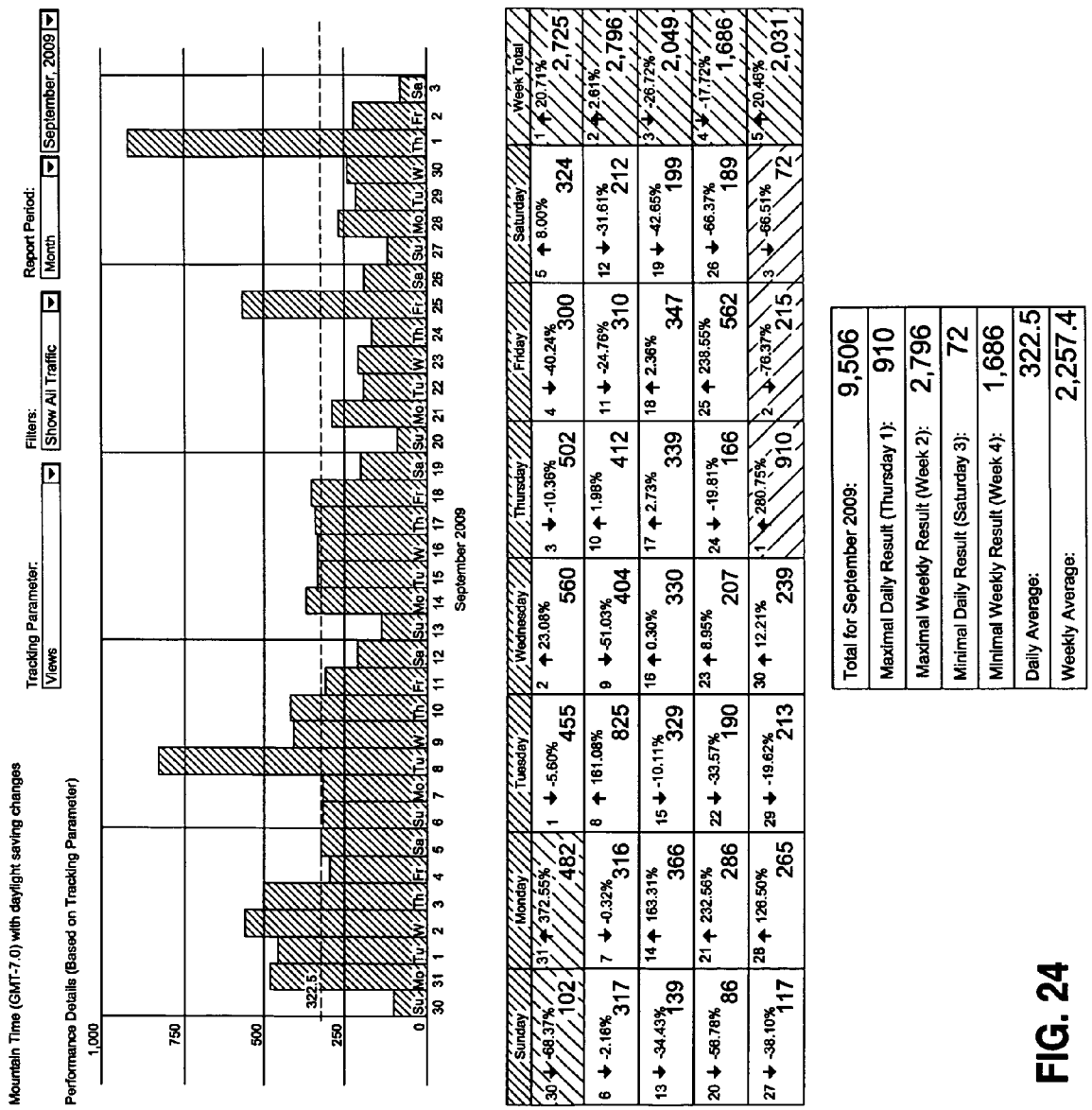
FIG. 24 depicts a sample system content rendering area activity report screen.
Figure 25:
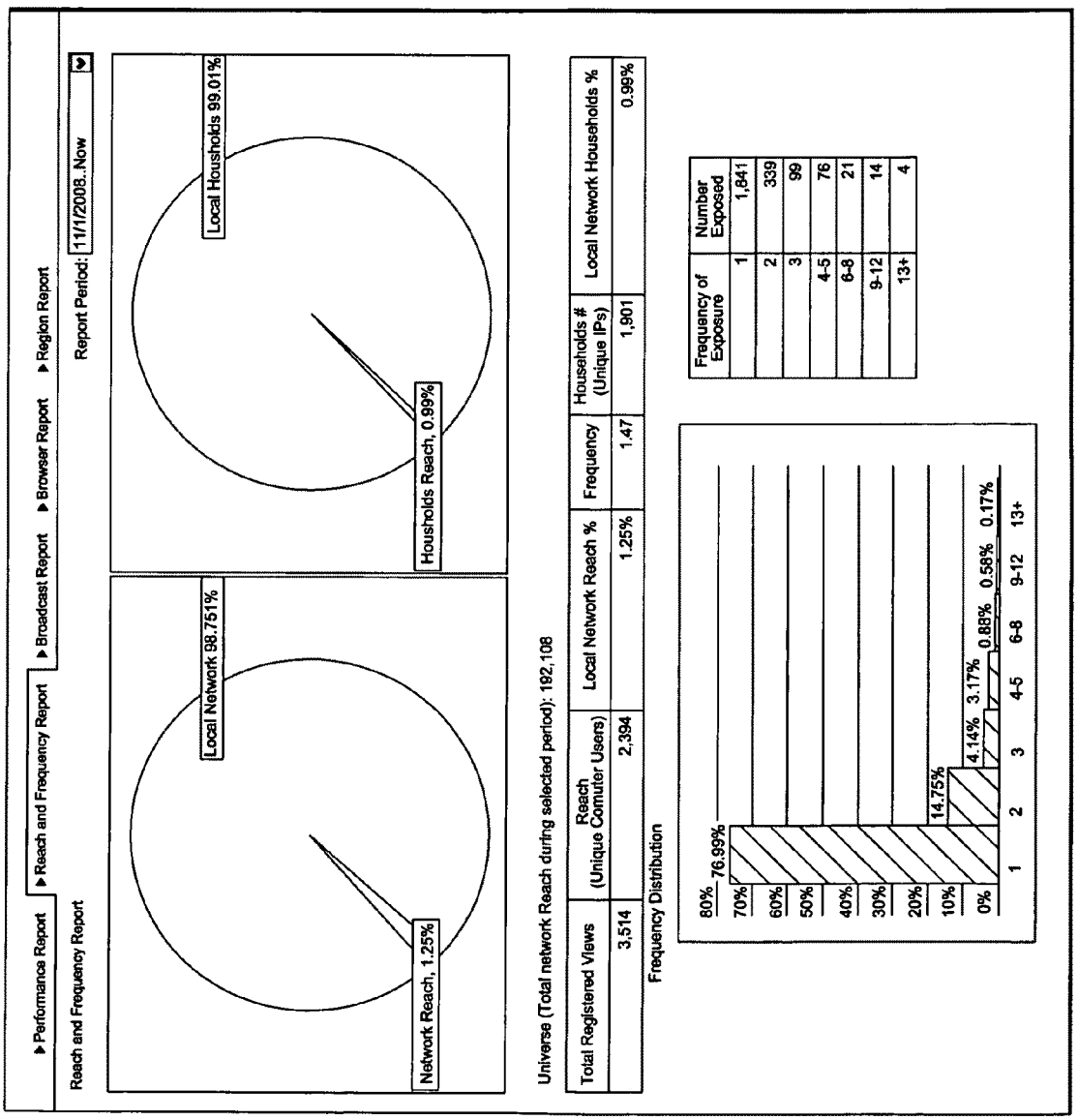
FIG. 25 depicts a sample system content rendering area data report screen.
Figure 26:
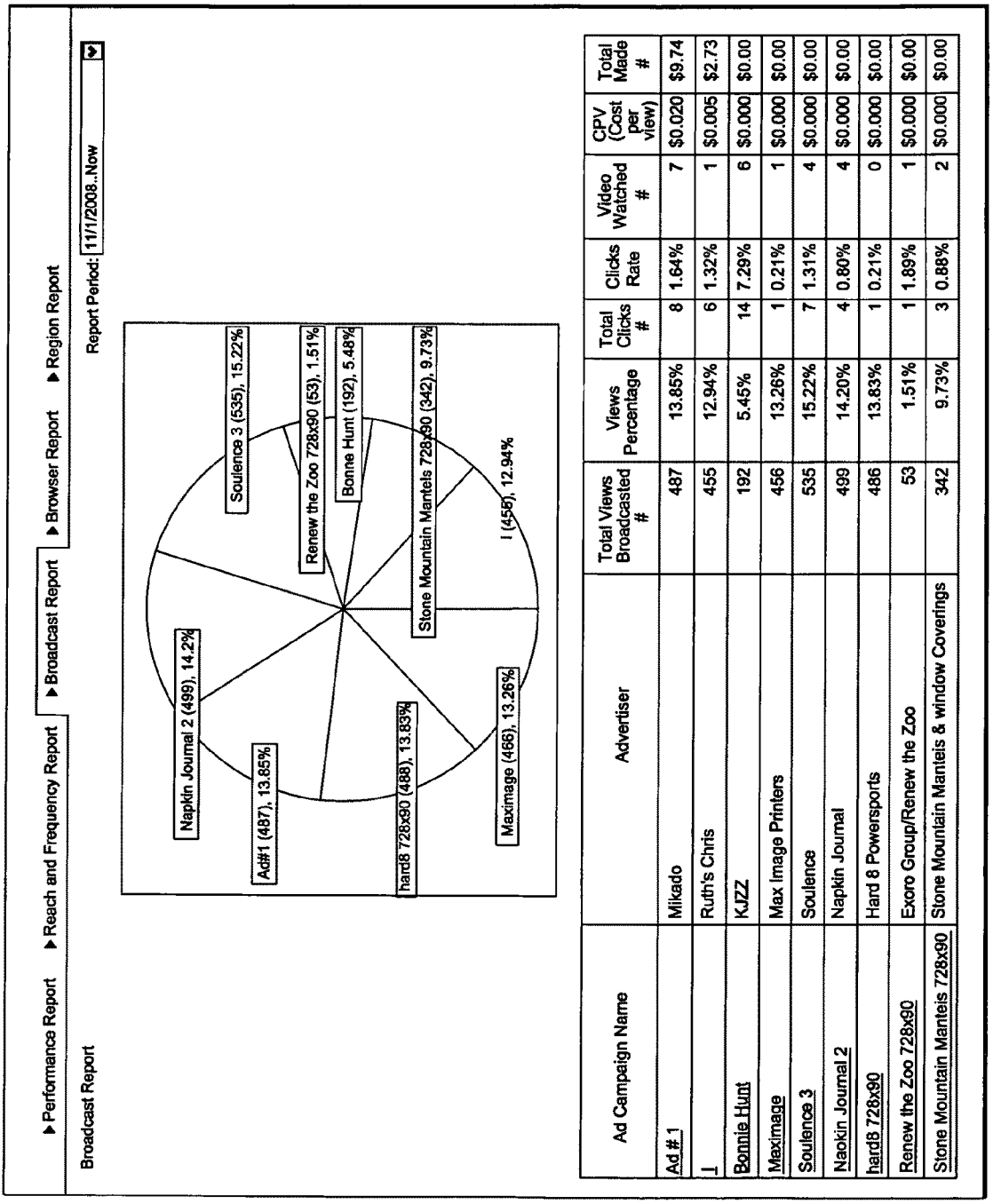
FIG. 26 depicts a sample system content rendering activity report screen.
Figure 27:
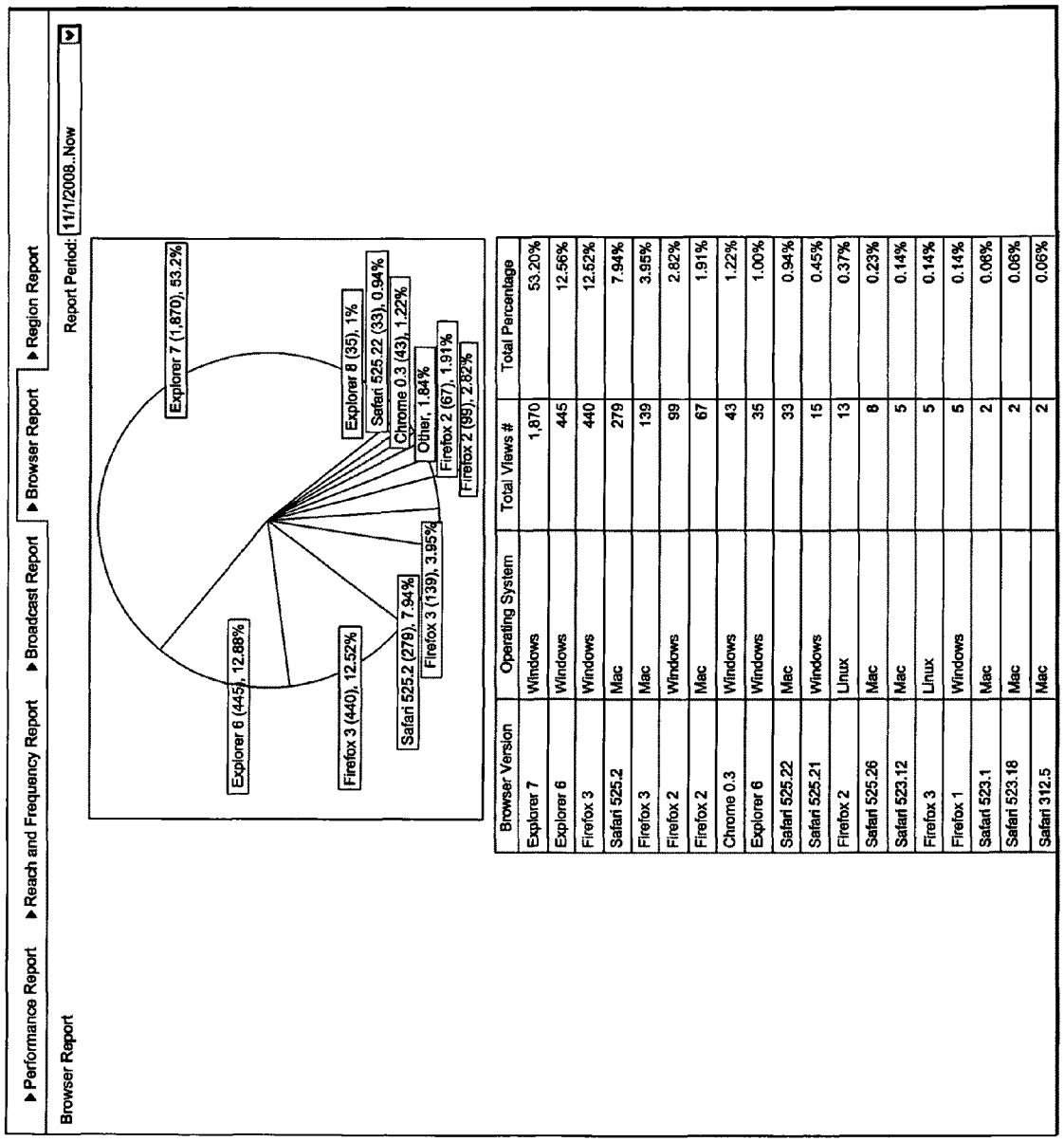
FIG. 27 depicts a sample system viewer browser type data report screen.
Figure 28:
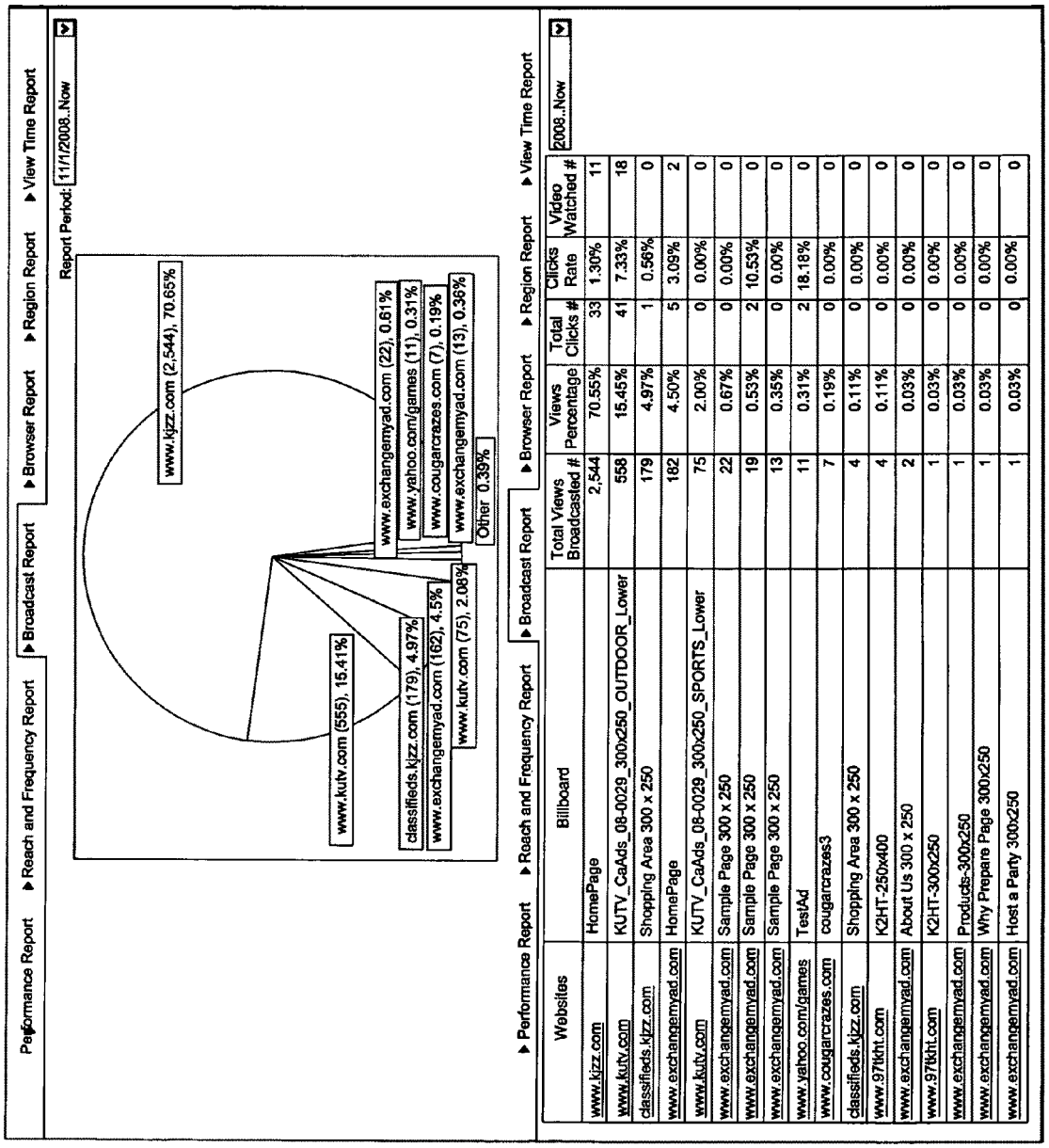
FIG. 28 depicts a sample system viewer geographic location report screen.
Figure 29:
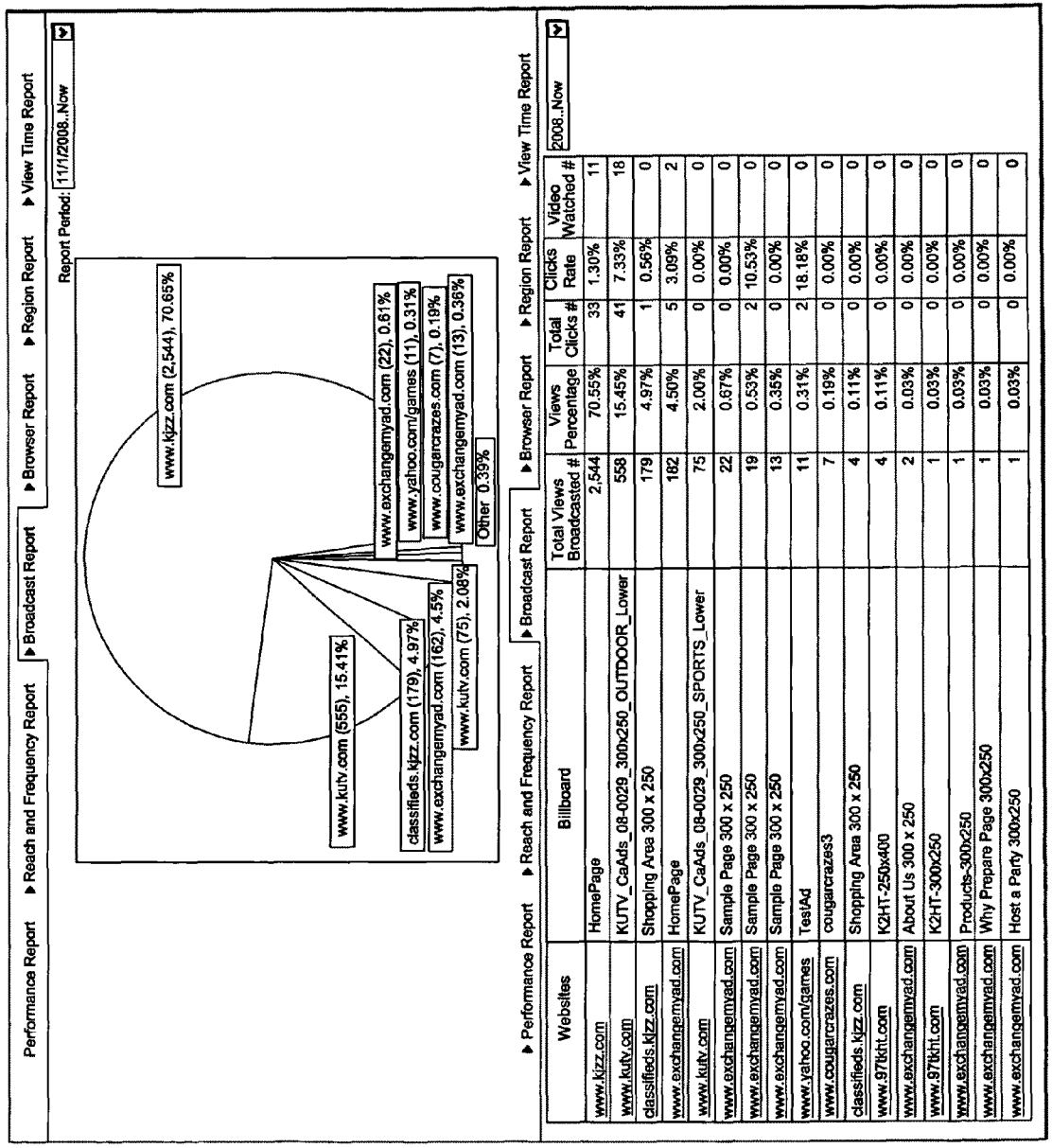
FIG. 29 depicts a sample content rendering area activity report screen.
Figure 30:
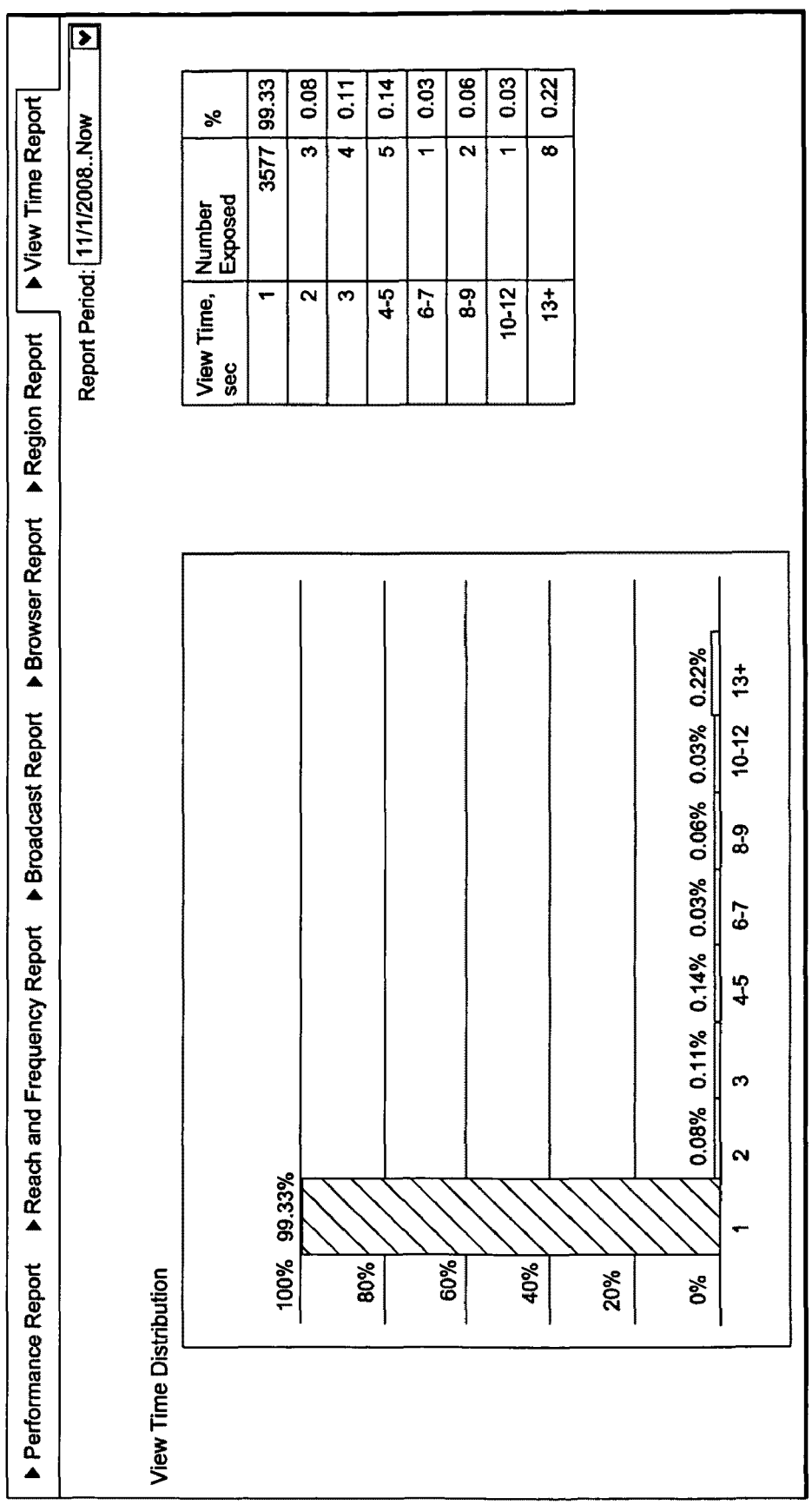
FIG. 30 depicts a sample content rendering time data report screen.

The system users can log onto a password protected system, preferably web-based interface and view detailed reports related to content rendered via the system. Reports may be customized to reflect different time periods and different meta-data. Reporting features for website and other content publishers include, but are not limited to, information for rendering activity in particular website page sections that shows, for example, the number of times content was rendered, the number of times content was within the dimensions and scrolling position of the viewer's browser window, the duration of time that content was within the dimensions and scrolling position of the viewer's browser window, as well as data such as video viewed, video view duration, click to http destination, custom button clicks (such as print coupon, email), number of unique computer browser users each content rendering was available to (reach) and how many times each content rendering was available to each unique computer browser user (frequency), the browser type of each viewer for which the content was rendered, and the general geographic location of each user the content was available to (by ISP) and the percentage of the network users reached by content rendering module content in a region or nationally. Other custom parameters not mentioned here may be reported. Reports may be parsed by all web site sections or one website section/page or otherwise. FIG. 22 depicts a sample system content page data report screen showing the content pages registered, date created, with the content page triggering areas and content page rendering areas that have been designated indicated (see the column titled "billboards#"), and data retrieved such as number of times that the content related to a designated content page rendering area has been requested, number of times that the content related to a designated content page rendering area has been rendered, the percentage of content rendering vs. content request, click-through rate and total number of clicks, and other content rendering activity data. FIG. 23 depicts a sample system content rendering area data report screen showing content rendering activity for specific content page rendering areas of a content page, including the content rendering area dimensions, date created, number of times content page area was requested, number of times the content designated for the particular content page rendering area has been rendered, and other content page rendering area activity data. FIG. 24 depicts a sample system content rendering area activity report screen showing a report and bar graph of data pertaining to content rendered within viewer browser screen dimensions and scrolling position in a given period (a monthly period is indicated in the exemplary report shown in FIG. 24). FIG. 25 depicts a sample system content rendering area data report screen indicating data pertaining to the viewers of rendered content, such as their Internet protocol address, as well as the number of unique viewers and the content's reach and frequency of rendering. FIG. 26 depicts a sample system content rendering activity report screen showing a graph and table of the content rendered, organized by content name, including rendering data for each, which content page administrators can use to assess which content is more often rendered than others. FIG. 27 depicts a sample system viewer browser type data report screen providing information as to the types of browsers being used by viewers to view rendered content. FIG. 28 depicts a sample system viewer geographic location report screen providing information regarding the location of the viewership of the rendered content. FIG. 29 depicts a sample general content rendering area activity report screen providing information regarding the content pages and content page rendering areas within said content pages and their rendering activity. FIG. 30 depicts a sample content rendered time data report screen providing information regarding how long content was rendered within a viewer's browser window dimensions and scrolling position.

Figure 31:
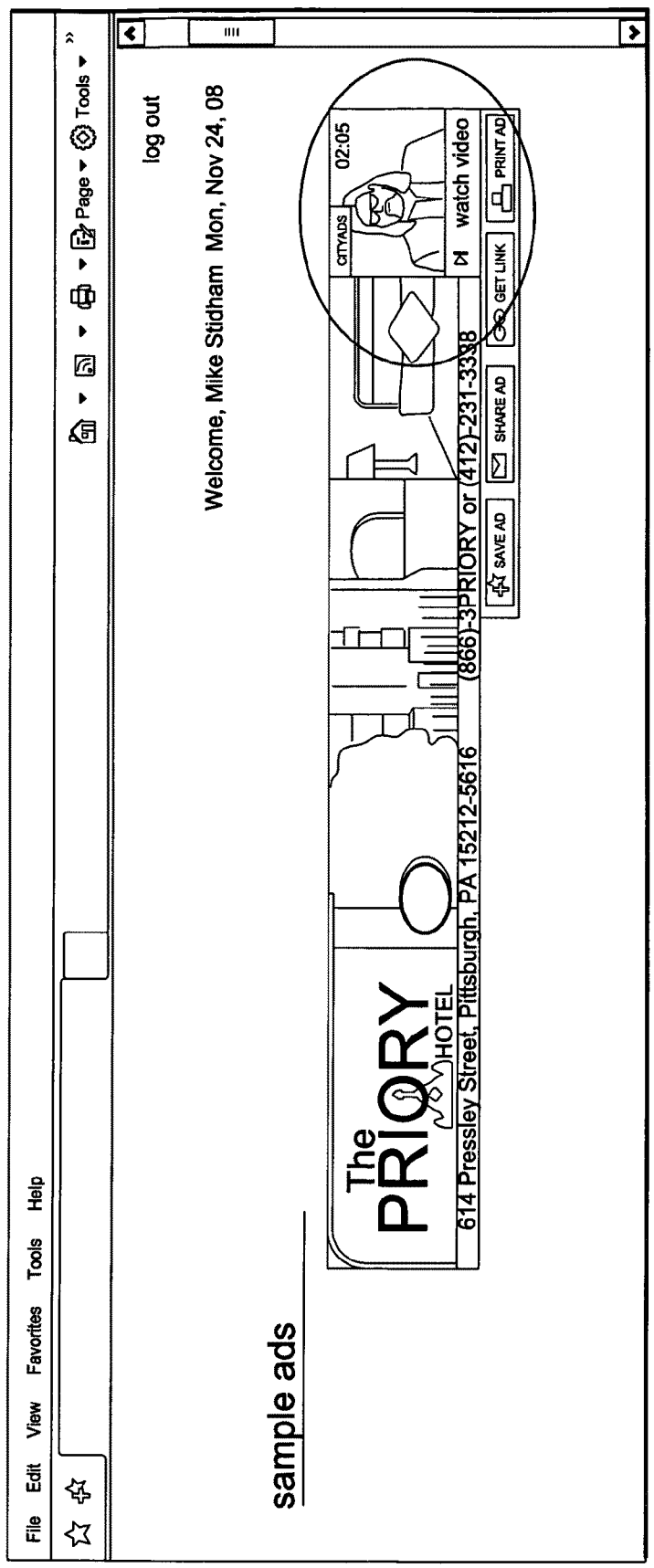
FIG. 31 depicts a sample content page using the system to determine viewer browser screen dimensions and scrolling position to provide scaled rendering of content.
Figure 32:
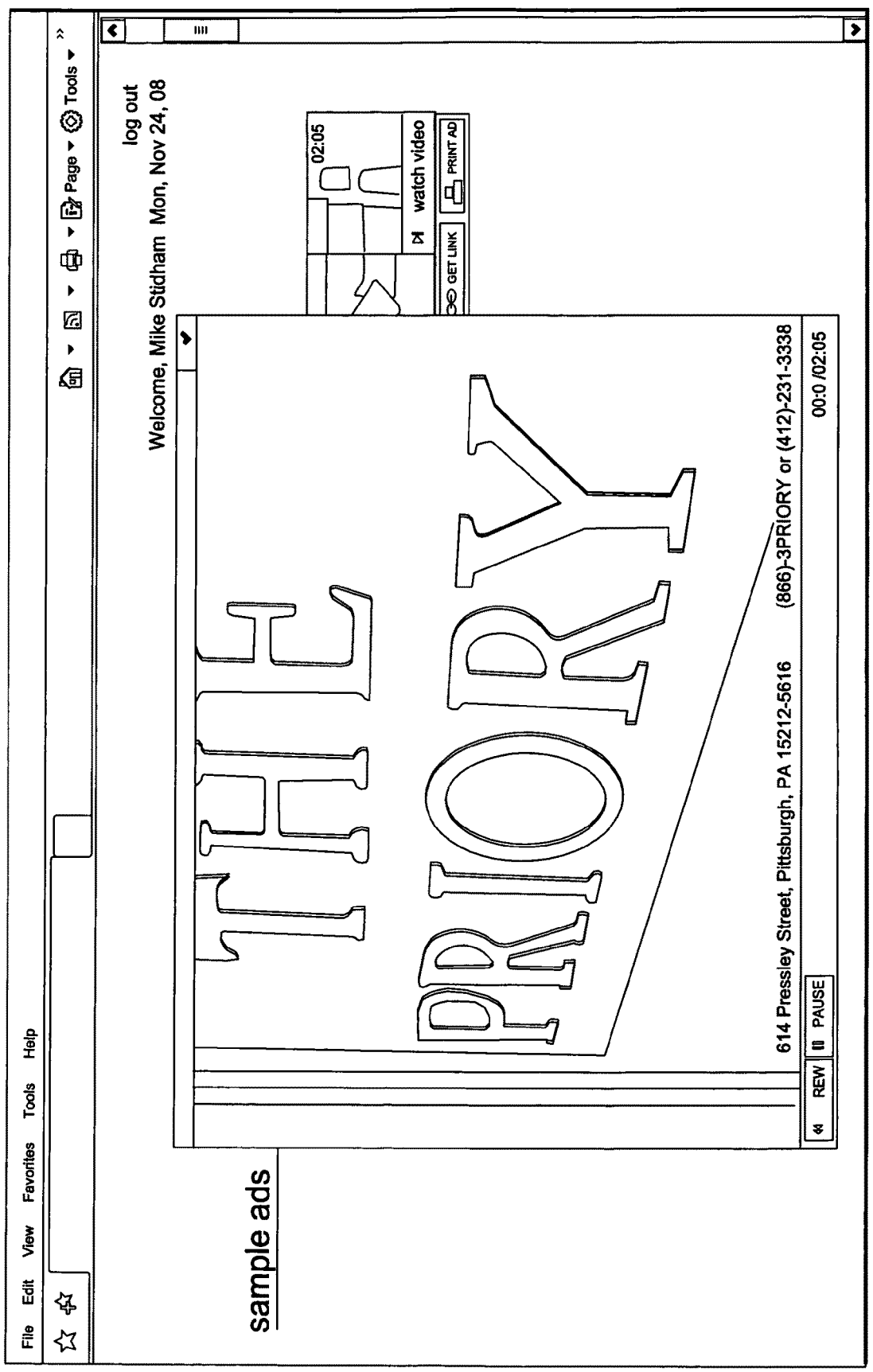
FIG. 32 depicts a sample content page showing content rendered scaled to a predefined size in relation to the viewer's browser window dimensions and scrolling position.
Figure 33:
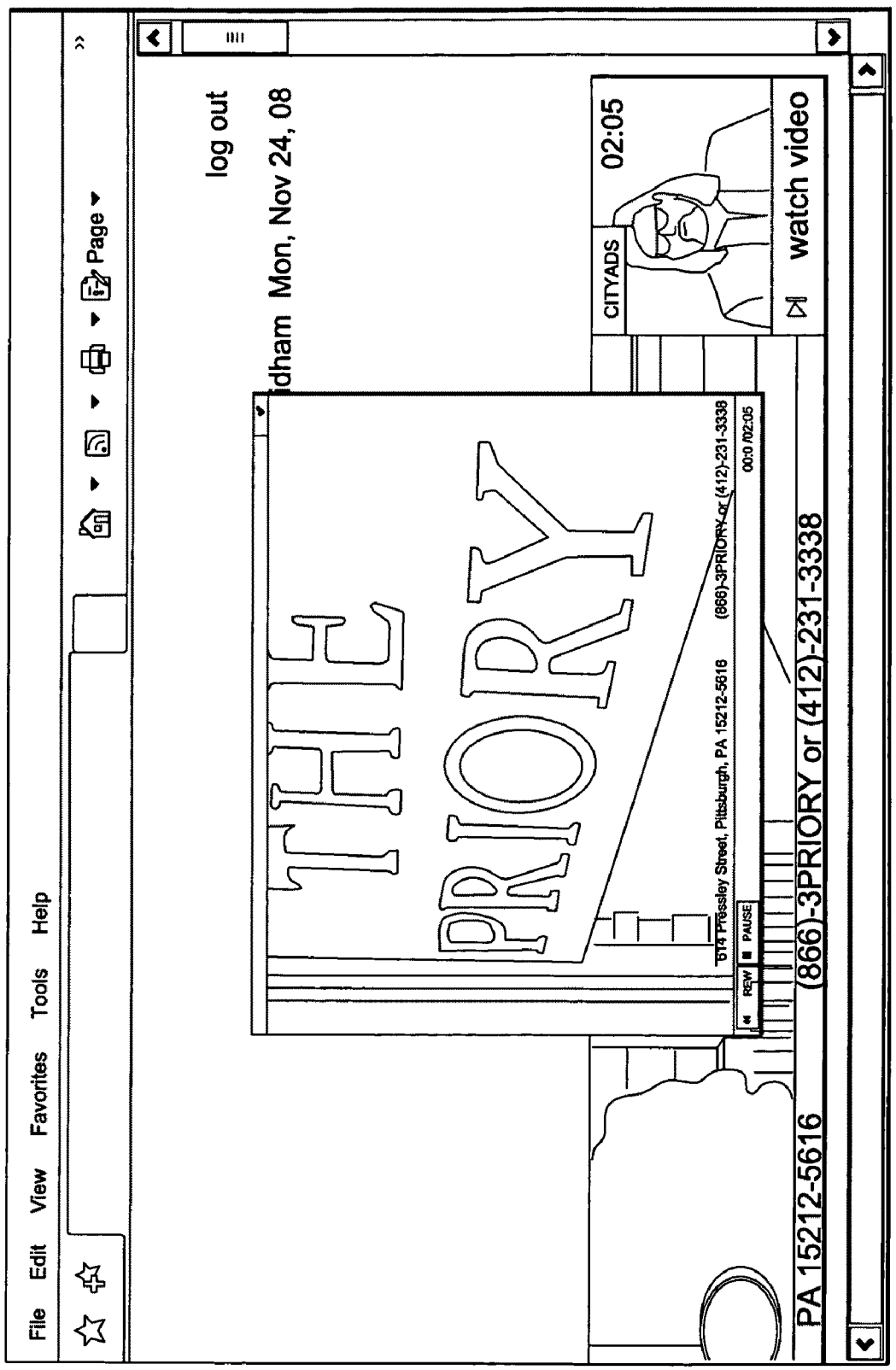
FIG. 33 depicts a sample content page showing content re-rendered and re-scaled to a predefined size in relation to modified viewer browser window dimensions and/or scrolling position.

The system can be utilized to determine a viewer's browser window dimensions and scrolling position to provide content scaled to size to better fit the viewer's browser window by including scaling factor reduction or enlargement based on the system server side application's comparison of the designated content page rendering area for the content and the viewer's browser window dimensions and scrolling position as determined by the correlator code. FIG. 31 depicts a sample content page using the system to determine viewer browser screen dimensions and scrolling position to provide scaled rendering of content. FIG. 32 depicts a sample content page showing content rendered scaled to a predefined size in relation to the viewer's browser window dimensions and scrolling position. FIG. 33 depicts a sample content page showing content re-rendered and re-scaled to a predefined size in relation to modified viewer browser window dimensions and/or scrolling position.

Also, the system in a preferred embodiment may estimate or forecast content page/content page area inventory availability for future specified periods helping content publisher optimally sell and fill their content space inventory. Based on tracking data retrieved for a specific time period regarding content page/page area usage, the system can estimate activity for future time periods.

A sample of the JavaScript tag/link that is placed on the content page that links to the system server-side software application when a viewer first requests a content page is provided below: <script language="javascript" type="text/javascript" src="http://cityads.net/display/?key=waCcZO4I1GInZjIdFQdSELCe4PcWdeXgGXkMuaWqUPs%3d"></script>

A sample of a correlator code dynamically written to, or otherwise, embedded on the content page which functions to control the rendering of content based on whether the content page triggering area is within, or within a pre-defined distance outside of, the viewer's browser window dimensions and scrolling position, is provided below:

```
var __viz_check = {
xs1:0,
ys1:0,
xs2:1000,
ys2:800,
curtop:0,
curleft:0,
navigate:function( )
{
  if( this.location[0]=="top" ) this.location[0]="bottom";
  else this.location[0]="top";
},
update:function( )
{
  this.xs1 = this.getScrollLeft( );
  this.ys1 = this.getScrollTop( );
  this.xs2 = Number(this.xs1)+Number(this.getClientWidth( ));
  this.ys2 = Number(this.ys1) +Number(this.getClientHeight( ));
  var i=0;
  while ( i < __i )
  {
    var adi = __adi[i];
    if( adi != null)
    {
      adi.findPos( );
      var x1 = adi.x;
      var y1 = adi.y;
      var x2 = Number(x1)+Number(adi.width);
      var y2 = Number(y1)+Number(adi.height);
      var vm = 20 ;
      //       if (Number(adi.height) > 500) vm = 220 ;
      if ( adi.done==0 ) {
        if ((x2>=this.xs1)&&(y2>=this.ys1)&&(x1<=this.xs2)&&(y1<=this.ys2) ) {
          if ( ( __popul==0) || (typeof [u__popul] != 'undefined') ) {
            __popul++ ;
            adi.markwords = __marksfinder.get__words( );
            adi.ea = __ea__list ;
            adi.populate( );
          }
        }
      } else {
        if (adi.rend==1) {
          if ( (x1>=(this.xs1-20))&&(y1>=(this.ys1-vm))&&(x2<=(this.xs2+20))&&(y2<=(this.ys2+vm)) ) {
            if (adi.vid==0) {
              if (adi.viz==0) {
                if (adi.t >=1) {
                  adi.sec = 1;
                  __av(i,1) ;
                }
              }
              else {
                if ((adi.sec +1.1) <= adi.t) {
                  adi.sec ++ ;
                  if (adi.sec < 61) __av(i, adi.sec) ;
                }
                if (adi.paused==1) {
                  adi.paused=0 ;
                  __pv(i) ;
                }
              }
              adi.t += 0.1 ;
            }
          }
          else {
            if (adi.paused==0) {
              adi.paused=1 ;
              __sv(i) ;
            }
          }
        }
      }
    }
    i++;
  }
},
findPos:function(p)
{
  curleft = curtop = 0;
  var obj = document.getElementById(p) ;
  if (obj.offsetParent) {
    curleft = obj.offsetLeft
    curtop = obj.offsetTop
    while (obj = obj.offsetParent) {
      curleft += obj.offsetLeft
      curtop += obj.offsetTop
    }
  }
},
//---
getClientWidth:function( ) {
  var w1=0;
  if( window.innerWidth ) w1=window.innerWidth;
  var w2=0;
  if(document.documentElement)
  w2 = document.documentElement.clientWidth;
  if(w1<w2) w1=w2;
  return w1;
},
getClientHeight:function( ) {
```

```
    var h1 = 0;
    if( window.innerHeight ) h1 = window.innerHeight;
    var h2=0;
    if( document.documentElement )
    h2=document.documentElement.clientHeight;
    if(h1<h2) h1=h2;
    return h1;
},
getScrollLeft:function( ) {
    var sL1=0;
    if( window.pageXOffset ) sL1 = window.pageXOffset;
    var sL2=0;
    if(document.documentElement)
    sL2=document.documentElement.scrollLeft;
    if(sL1<sL2) sL1=sL2;
    return sL1;
},
getScrollTop:function( ) {
    var sT1=0;
    if(window.pageYOffset) sT1=window.pageYOffset;
    var sT2=0;
    if(document.documentElement)
    sT2=document.documentElement.scrollTop;
    if(sT1<sT2) sT1=sT2;
    return sT1;
},
}
```

A sample of the code dynamically written to the content page that indexes the web page text for the most frequently occurring words is as follows:

```
var __index = {
    exc:[ "and", "com", "can", "from", "for", "the", "them", "that", "gift",
          "similar", "page", "www", "with", "which", "hi",
          "you", "your", "did", "does" ],
    top_max:5,
    top:["","","","",""],
    get_words:function( )
    {
        var s = "";
        for( var i=0 i<this.top_max; i++)
        {
            if( this.top[i]=="" ) break;
            if(s.length>0) s += ",";
            s += this.top[i];
        }
        return encodeURI(s);
    },
    find_words:function( )
    {
        try{
            try{
                a=var__words;
            }
            catch(e1)
            {
                var txt = document.body.innerHTML.toLowerCase( );
                var sn = txt.split(/\<\s*script/);
                for(var i=0; i<sn.length;i++)
                {
                    var n = sn[i].search( /\<\s*\/scripts*\>/ );
                    if(n==-1) n=0;
                    var m = sn[i].indexOf(">",n)+1;
                    sn[i] = sn[i].substring(m);
                }
                txt = sn.join(" ");
                var tst_msg = document.getElementById('tst_msg');
                txt = txt.replace(/(\[ \>]*\>)/g, " ");
                txt = txt.replace(/(&.*\;)/g, " ");
                txt = txt.replace(/[\W\d]/g, " ");
                txt = txt.replace(/\s{1,}/g, " ");
                txt = txt.replace(/\s\w\w\w\s/g, " ");
                txt = txt.replace(/\s\w\w\s/g, " ");
                txt = txt.replace(/\s\w\s/g, " ");
                txt = txt.replace(/ies\s/g, "y ");
                txt = txt.replace(/ives\s/g, "fe ");
                txt = txt.replace(/ves\s/g, "f ");
                txt = txt.replace(/([ ^s])s\s/g, "$1 ");
                for(j=0;j<this.exc.length;j++)
                {
                    var ex = new RegExp( "\\s"+this.exc[j]+"\\s", "g");
                    txt = txt.replace( ex," ");
                }
                var w = txt.split(/\s+/);
                w = w.sort( );
                var t="", to="";
                var k=1;
                w = w.sort( );
                var ktop=[0,0,0,0,0];
                while(w.length>0)
                {
                    t = w.shift( );
                    if( t==to ) k++;
                    if(t!=to || w.length==0 )
                    {
                        for(j=0;j<5;j++)
                        {
                            if(k>ktop[j]){ this.top[j]=to;
                            ktop[j]=k;break;}
                        }
                        k=1;
                        to = t;
                    }
                }
            }
        }
        catch( e )
        {
            document.write(
            "Exception" +e.description+"<br>" );
        }
    }
}
```

The system and method of the present invention in a preferred embodiment can measure advertisement and other content rendering events utilizing a log created in the correlator code which operates client-side communicating directly and between the web page and a system server-side database rather than requiring website server log file analysis. This allows for the system and method of the present invention to track and report views of content that actually loaded in a content rendering area that is within the viewable area of a viewer's browser window on an in focus web page (i.e., on a page that is the primary window open on a user's display screen and is unobstructed by any other application window). Several browser or application windows may be opened and resized to be unobstructed, but only one of them can be in focus at any given time. Web page focus can be affected by minimizing the browser, opening or switching to another browser window or application, opening or switching to another browser window tab, or placing cursor on the browser address bar or other browser button. As previously discussed, the system generates a header tag for system publisher/advertiser users to place preferably in the <head> portion of the web page where content will be rendered which the correlator code detects to signal that the particular page is in focus.

Unlike the system and method of the present invention, with typical website server log file tracking methodologies, a request is logged and reported as an impression prior to the ad or other content being delivered, loaded and rendered, making many events that occur on the client side not detectable, resulting in measurement inaccuracies. The following causes, among others, can result in inaccurate counting of content "impressions" and charges for impressions, such as in the context of online advertising, wherein an ad, after being requested and reported as an "impression" in systems based on log file analysis might not actually appear to the viewer:

1) The viewer clicks to another web page before the ad loads and renders;

2) The ad loads, but in an area of the web page that is not within the viewer's browser window dimensions and scrolling position;

3) The viewer has an ad blocker installed;

4) The viewer has a browser set to block image rendering and/or JavaScript or other types of scripting or compiling languages;

5) The viewer does not have the proper plug-in installed to render rich media content;

6) The viewer opens a page in a mobile device that is not configured to show the ad content;

7) The viewer minimizes the browser;

8) The viewer opens another browser window or another application;

9) The viewer opens another browser tab;

10) The viewer switches focus to another browser or application;

11) The request was made by a spider or crawler (or other robot application);

12) The viewer moves the browser window to the ad is outside the display screen;

13) The request was made by a web page re-direct (invisible to the viewer);

14) In the case of pre-roll video and video advertising, if the viewer minimizes the browser, tabs away from, or opens another application over the video while the advertisement is playing;

15) The viewer has multiple home pages set so when the browser is opened, two pages open in two tabs and an ad resides On the tab that is not in focus;

16) The web publisher places multiple ad displays in layers over each other. The viewer then sees one ad but impressions are reported for all layered ads; or 17) The web publisher places an image or shape on a layer overlapping an ad.

The present invention provides a novel architecture and measurement methodology that overcomes a variety of measurement limitations faced by server log file-based technologies, while providing more accurate, diverse and useful metrics without reporting latency.

Figure 34:
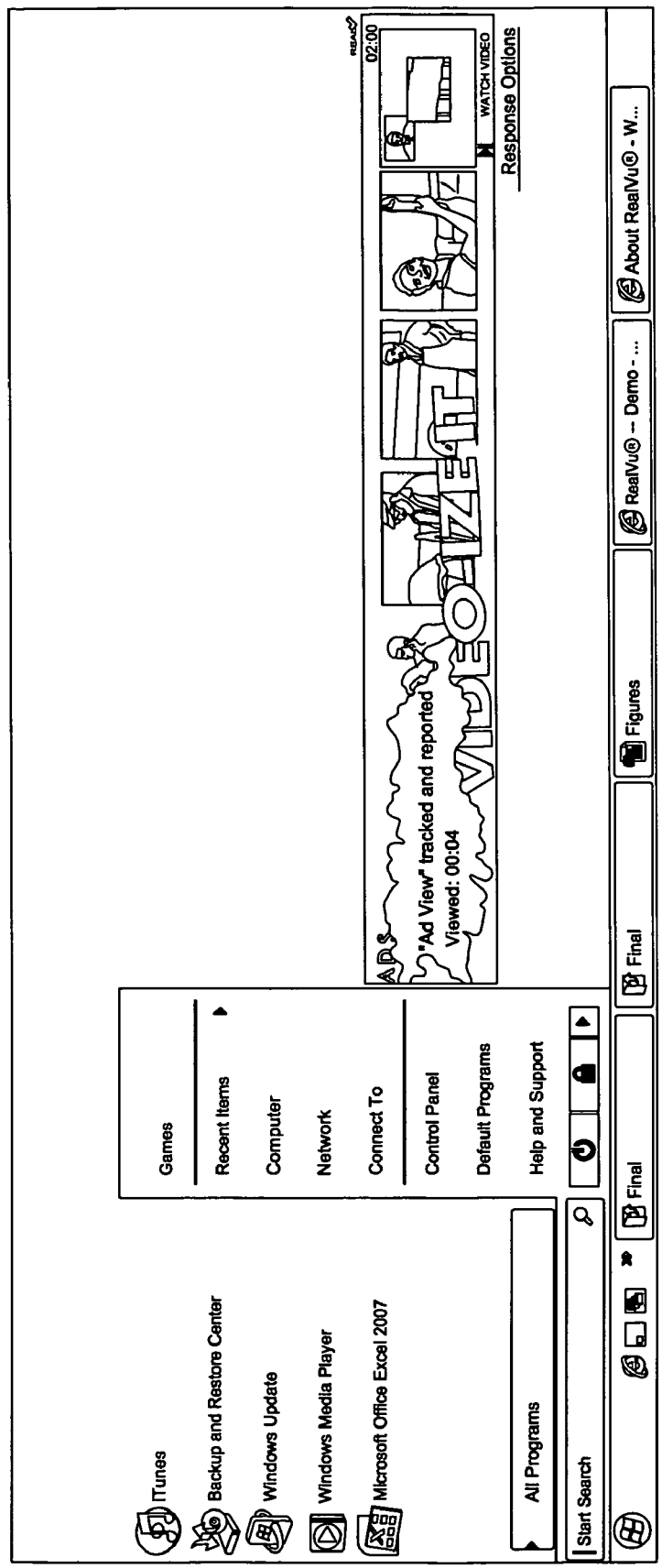
FIG. 34 depicts a sample content page with content rendered and an indicator showing the time period for which the rendered content has been rendered in the designated content rendering area of an electronic content page and the designated content rendering area has been within the viewer's browser screen dimensions and scrolling position, and the content page has been the primary window open on the viewer's display screen and has been unobstructed by another window or application, with the indicator counting stopped due to the content page being obstructed by another application window.
Figure 36:
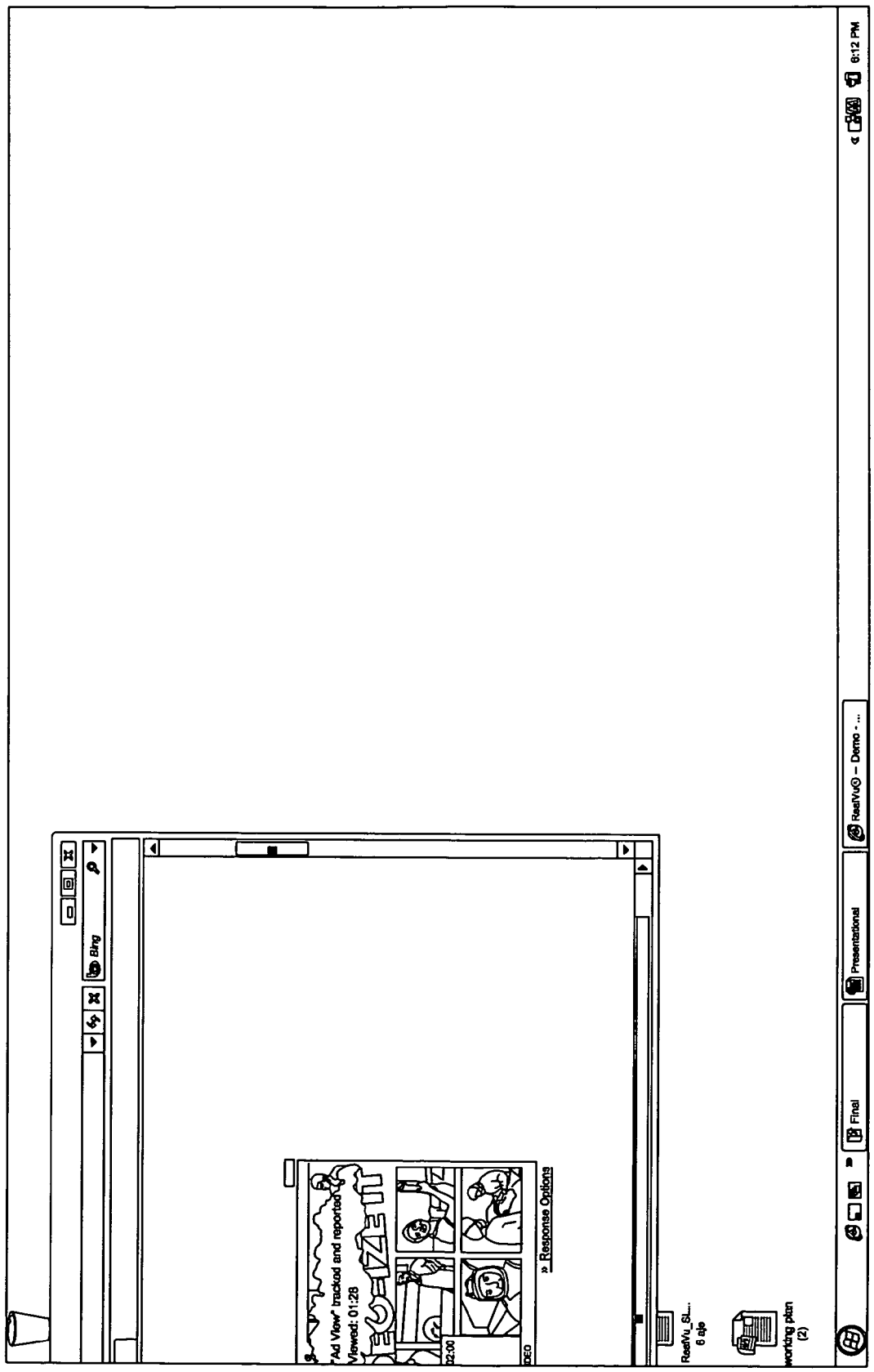
FIG. 36 depicts a sample content page with content rendered and an indicator showing the time period for which the rendered content has been rendered in the designated content rendering area of an electronic content page and the designated content rendering area has been within the viewer's browser screen dimensions and scrolling position, and the content page has been the primary window open on the viewer's display screen and has been unobstructed by another window or application, with the indicator counting stopped due to the viewer having moved the browser screen such that part of the browser screen including the content page with the content rendered in the designated content rendering area (and consequently a portion of the content page as well as a portion of the content rendering area) is not within the viewer's display device screen content page being obstructed by another application window.

The system and method of the present invention, in a preferred embodiment, can be used in its entirety or in parts, or combinations of parts, for delivery, tracking and reporting of rich media advertising content (references to "ads" or "advertisements" are not limitations as to the type or purpose of the content deliverable or trackable via the present invention; they are only one form of content in an exemplary embodiment of the invention). The system uses the direct communication between a content rendering module on the web page and a server-side database for the delivery of content and reporting of metadata which is collected by the correlator code, which as noted previously is a client-side application. Because of this architecture, server log files are not involved in the tracking and reporting process eliminating reporting latency and many measurement limitations that can compromise the accuracy of ad view and click reporting, while delivering more ad measurement parameters such as "ads rendered," "time viewed," "scrolling position" and also statistical data on monitor screen resolutions and browser window dimensions. In a preferred embodiment, a unique identifier for each viewer/browser is created and stored as a cookie for a first time viewer, or retrieved from a cookie. Once any portion of the content rendering module, on a viewer's in focus web page, comes within the browser screen dimensions and scrolling position and is thus within the visible area of the browser window (or in some embodiments, within a predefined distance from same) a message is sent to an ad content server to deliver an advertisement. Once the ad content is loaded and rendered the content rendering module sends a message directly to the server's database and an "ad rendered" event is reported. The correlator code continues to monitor the content rendering module for each individual ad on the web page and its relation to the browser window dimensions, scrolling position and web page focus, considering if the viewer has scrolled the content rendering module in or out of the visible area of the browser window, minimized, tabbed away, or opened another browser or application window bringing the web page monitored out of focus. FIG. 34 depicts a sample content page with content rendered and an indicator showing the time period for which the rendered content has been rendered in the designated content rendering area of an electronic content page and the designated content rendering area has been within the viewer's browser screen dimensions and scrolling position, and the content page has been the primary window open on the viewer's display screen and has been unobstructed by another window or application, with the indicator counting stopped due to the content page being obstructed by another application window. When a predefined portion, such as for example but without limitation, 90%, of the ad content on a web page is within the visible area of the viewer's browser window for predefined time period, such as, without limitation, one second, a message is sent from the correlator code via the content rendering module to the server-side relational database and a "View" is reported. The correlator code continues to monitor the web page focus, location of content rendering modules(s) and the visible area of the browser window, and periodically communicates to the content rendering module(s) which send(s) messages to the server-side relational database logging the "Time in View" for the ads being delivered on the webpage. If the viewer engages in any click action with respect to the rendered content, the desired action is initiated and an independent message is sent to the system server-side relational database reporting the click. FIG. 36 depicts a sample content page with content rendered and an indicator showing the time period for which the rendered content has been rendered in the designated content rendering area of an electronic content page and the designated content rendering area has been within the viewer's browser screen dimensions and scrolling position, and the content page has been the primary window open on the viewer's display screen and has been unobstructed by another window or application, with the indicator counting stopped due to the viewer having moved the browser screen such that part of the browser screen including the content page with the content rendered in the designated content rendering area (and consequently a portion of the content page as well as a portion of the content rendering area) is not within the viewer's display device screen content page being obstructed by another application window.

In a preferred embodiment, the user interface provides a wizard for users to register website sections and create ad placements, receiving the javascript tag to place on a webpage and monitor network broadcast reports. Users can organize content in sections based on specific channels and demographics, create ad placements of different sizes and activate different types of broadcasting programs. Users view and analyze reports related to all broadcasting activity on both website and ad placement levels which include the number of ad views, time in view, reach and frequency, geographic distribution of viewers, viewer's browser types and operating systems. Once the ad placement is created, a javascript tag is made available to copy and paste onto the appropriate web page. Users can change any attributes of the ad placement at any time without the necessity of editing the code on their web page.

In a preferred embodiment, the user interface provides a wizard through which users can upload media into libraries for use in creating creative displays. Creative displays can be dynamically assembled online from a variety of elements that users upload into libraries. Pre-designed Flash and image displays may also be uploaded for distribution. Users can utilize the online creative display builder to assemble a professional quality display ad using elements they get from creative libraries. Users can utilize free professional Flash and stock footage libraries provided in their creative displays. Video can also be uploaded which is automatically encoded and appears on the ad display as a preview button. When the preview button is clicked by a viewer, the video can expand to a larger portion (such as, for example but without limitation, %) of the browser window dimensions or full screen with another click by the viewer. After assigning a creative display to a campaign, users may open and modify the display ad there without pausing their campaign.

In a preferred embodiment, the user interface provides a wizard for users to set up broadcast schedules and parameters for their media and advertising distribution and view campaign broadcast reports. Users may create a campaign to broadcast any number of media/ads on one or more website sections or rendering modules, setting targeting parameters such as day and time, geographic location, content channels and keywords. Users can easily change parameters, schedules and media/ad creative displays without pausing the campaign.

As noted previously, the system in a preferred embodiment generates a header tag that is placed once in the header of any web page where one or more content rendering module tags are to be placed. This tag is the same for all websites and web pages and can be placed automatically by a common server-side include. This tag when placed at the head of the web page insures that the monitoring and rendering process starts immediately so it can catch the firing the initial focus event, which happens at different times with different browser types and browsers that support a "multi homepage" feature. Sample coding for such tag is: <script language="javascript" type="text/javascript" src="http://ad.system.net/display/head/"></script>

A content rendering area tag is generated by the system and is placed on a web page where the user wants a content rendering area to appear or where a third party ad is allocated to be tracked. Sample code for a content rendering area tag is: <script language="javascript" type="text/javascript" src="http://ad.system.net/display/?key=DeWue4q69ZZmeKNqNYChlo2y7zfX9huuMvXu3cq00VIoRcYFiJEfww%3d%3d"></script>

DOCTYPEs and Quirks Mode

Quirks mode refers to a technique used by some web browsers for the sake of maintaining backward compatibility with web pages designed for older browsers, instead of strictly complying with W3C and IETF standards in standards mode. To maintain compatibility with the greatest possible number of web pages, modern web browsers are generally developed with multiple rendering modes: in "standards mode" pages are rendered according to the HTML and CSS specifications, while in "quirks mode" attempts are made to emulate the behavior of older browsers. Some browsers (those based on Mozilla's Gecko rendering engine, or Internet Explorer 8 in strict mode, for example) also use an "almost standards" mode which attempts to compromise between the two, implementing one quirk for table cell sizing while otherwise conforming to the specifications. Most often, browsers determine which rendering mode to use based on the presence of a Document Type Declaration in the page; if a full DOCTYPE is present the browser will use standards mode, and if it is absent the browser will use quirks mode. For example, a web page which began with the following DOCTYPE would trigger standards mode:<!DOCTYPE html PUBLIC "-//W3C//DTD XHTML 1.0 Transitional//EN" "http://www.w3.org/TR/xhtml1/DTD/xhtml1-transitional.dtd"> System tags work with full functionality with pages that contain no DOCTYPE or any DOCTYPE declaration established by W3C and IETF in browsers. The system provides a page for users to view and test system features with web pages that contain different DOCTYPEs.

Tag Placement Controls

The present invention, in a preferred embodiment, contains a number of controls that insure the correct placement of the tags on the publisher's web pages. These controls ensure the prevention of web publisher fraud and help in web page design and layout as well as effective utilization of ad space inventory.

1) Tag placement within <table>. System tags may be placed within tables on a web page. If a system tag is placed within a table, the table border width is considered when viewable area is correlated.

2) Layer placed overlapping a system content rendering area. If a layer with a color shape or image is positioned to overlap (partially or entirely) a system content rendering area, the page with the content rendering area will automatically come to the top (i.e., in focus above the layer) at the moment the content is requested for rendering.

3) Tag placed within <div> layer. Tags may be placed within a <div> layer. A <div> element is block or layer that can be positioned anywhere on a page by using absolute pixel positioning and a <div> tag. In the case of multiple layers, the system content ad will automatically come to the top (i.e., in focus above the layer) at the moment the content is requested for rendering.

4) Tags placed within a <div> layer overlapping other system content rendering areas. If tags are placed within a <div> layer and overlap other content rendering areas (partially or entirely), only the content for the first content rendering area that was marked up will be requested, loaded, rendered and counted as a view. Content will not be requested for the other obstructed ad spaces.

5) Tag placed within a <table> within a <div> layer. If a tag is placed within a <table> within a <div> layer, the content, in the case of multiple layers, both the table and the content rendering area (display) will move to the top layer. The system will consider the table border width when correlating viewable area.

Cookies. In computing, a cookie (also browser cookie, computer cookie, tracking cookie, web cookie, internet cookie, and HTTP cookie) is a small string of text stored on a user's computer by a web browser. Cookies have some important implications on the privacy and anonymity of Web users. While cookies are only sent to the server setting them or one in the same Internet domain, a Web page may contain images or other components stored on servers in other domains. Cookies that are set during retrieval of these components are called third-party cookies. Advertising companies use third-party cookies to track a user across multiple sites. In particular, an advertising company can track a user across all pages where it has placed advertising images or web bugs. Knowledge of the pages visited by a user allows the advertisement company to target advertisement to the user's presumed preferences. In a preferred embodiment, the system and method of the present invention does not use third party cookies and instead only uses cookies placed from the same domain as the content page where content is to be rendered. In a preferred embodiment such cookies can be used for data gathering to report unique browser views (reach) and how many times a viewer viewed a particular content file rendering (frequency).

Measurements of Data

Impressions vs. Viewable Impressions or View Events. Because the term "impression" is widely used in the online advertising industry with regard to advertising measurement, it is important to clarify that a "view" is not the same as an "impression." An "impression" is formally made when a server log file registers a request for an ad or ad beacon. Also some assume that ad content is so quick to load after the request that an "impression" equals a "viewable impression." However, a "viewable impression" or "view event" is defined as when the ad content is actually loaded, rendered and within the visible area of a viewer's browser window on an in focus web page. The system enables measurement of content rendering events accurately and without over reporting of viewable impressions or view events and clicks. Viewable impressions a/k/a view events can be counted and limited to when content is in fact available to a human viewer on an in focus web page within the visible area of a viewer's browser window. The system can verify whether click actions are initiated by human viewers exposed to a viewable impression.

In one embodiment, the system can monitor, measure and report the following events:

Ads requested: When an ad space is marked up on the web page. Ads requested are reported to web publishers for reference since this is the closest point in the process where a traditional impression is reported.

Ads rendered: When an ad space is within or partially within the visible area of a viewer's browser window dimensions on an in focus web page the ad content is requested. When the content is fully loaded and rendered an "ad rendered" is reported.

Ad Views: When an ad is rendered and a predefined portion (such as for example, but without limitation, 90%) appears within the visible area of a viewer's browser window dimensions on an in focus web page for a predefined time period, such as for example, at least one second, an "ad view" is reported.

View Time: The length of time that an ad is rendered and within visible area of a browser window on an in focus web page. In the case of video and video pre-roll view time is measured as time played in an in focus web page within the visible area of a browser window.

Clicks: When a viewer takes a click action on an ad unit. A variety of click actions can be recorded, including, without limitation, videos watched, click throughs to a target destination URL, interactive buttons, etc. The system prevents non-human clicks while making sure that ads that are clicked where actually available for view.

Unique viewers (monitored by browser cookie).

Viewer's browser version.

Viewer's operating system.

Geographic distribution of viewers based on viewer Internet protocol address resolution.

Viewer's display screen dimensions.

Viewer's browser window dimensions at time of view reported.

Scrolling position at time of view reported.

Activity logs for each ad view.

In a preferred embodiment, when a user activates the page with a system addition to the URL (e.g., http://www.yourdomain.com/your_page/?[system]), a window appears in the top right corner containing a dynamic log of information related to each step in the process that has been executed. As the user scrolls, minimizes the browser or takes any other related action, they will see new information written in the window. Activity logs for views are also available to users in their back office interface. Below is a sample of the information represented in the demo window with explanations on the right:

| | |
|---|---|
| http://www.system.net/demo1/?system | URL or the page where system ad is resides. |
| UserAgent: Mozilla/4.0 compatible; MSIE 8.0; Windows NT 6.0; WOW64; Trident/4.0; GTB6; SLCC1; .NET CLR 2.0.50727; .NET CLR 3.0.04506; Media Center PC 5.0; .NET CLR 1.1.4322)v | User agent information including browser type and version. |
| 1 11:06:49.787 System Start | System tag is activated. |
| 2 11:06:49.788 Warning! For better results, add the following code to the <head> section of your page:<br><script language="javascript" type="text/javascript" src="http://system.net/display5.2/head.aspx"></script> | Warning tells that the system control header tag has not been placed on the page.<br>System control header tag for reference. |
| 3 11:06:49.826 Ad#1 space marked up impression view reported | First ad space is marked up and message is sent to tracking server to report an impression of the ad space, reported to the Web publisher for reference - The system ad is not requested at this point, so there is nothing to report to advertiser. |
| 4 11:06:49.857 Ad#2 space marked up impression reported | Second ad space is marked up and message is sent to the tracking server to report an impression. |
| 5 11:06:56.512 Page Loaded in 6.725 sec system correlator code run | The Web page loaded, with time to load. In order not to interfere with web page content loading process system correlator code becomes active only after the page "load" event is fired. |
| 6 11:06:56.533 Page in focus | Some browsers fire this event before the load event and some browsers do not fire |

| | |
|---|---|
| 7 11:07:05.862 Ad#1 content request sent | it initially assuming that the page is in focus when loaded.<br>Ad space #1 is in focus and has hit the visible area of the browser window. Request for ad content is sent to the ad server database. |
| 8 11:07:07.283 Ad#1 content loaded and rendered in 1.406 sec Ad Rendered Reported | Ad #1 has loaded and rendered, message is sent to the system server for "ad rendered" to be reported. Content loading and rendering time can be affected by numerous factors, including the file size of the content, graphic and programming elements of a webpage that can affect CPU utilization, number of ads on the page etc. Until content rendering module reports that the content is rendered, a view is not reported. A rendered ad passes its ID to correlator code then passes it to the next ad selection request to avoid ad duplication. Even if two or more ads are in viewable area, each one will wait for an ID from the previous one before an ad is rendered. |
| 9 11:07:08.960 Ad#1 300x250, in viewable area 1419x695 at From Left 559,From Top 740 Scroll Position Horizontal 0,Vertical 428 viewable impression/view event reported, View Time Start | Ad #1 Rendered ad is available in the viewable area for at least one second. Browser window dimensions and scroll position indicated. Message sent to tracking server and "viewable impression" or "view event" is reported. View time counter started. |
| 10 11:07:14.275 Ad#1 300x250, in viewable area 1419x695 at From Left 559, From Top 740 Scroll Position Horizontal 0,Vertical 870 is not available, View Time Paused | Ad #1 is scrolled out of the viewable area. View time counter is paused. |
| 11 11:07:25.789 Ad#2 728x90, at From Left 345, From Top 1341 is not available in viewable area 1419x695 scrolling position Horizontal 0, Vertical 731 | Ad #2 is not in viewable area and has not yet been requested for rendering. |
| 12 11:07:46.650 Video 695x556, at From Left 362,From Top 243 is available in viewable area 1419x695 scrolling position Horizontal 0, Vertical 174 Video View Reported. Video View Time Start | Video is opened and in the visible area of the browser window. Video plays. Video view is reported. Video view time counter starts. |
| 13 11:07:48.770 Video 695x556, at From Left 362, From Top 243 is out of viewable area 1419x695 scrolling position Horizontal 0, Vertical 420 Video Paused. Video View Time Paused. | Video is not in the visible area of the browser window. Video paused. Video view time counter paused. |
| 14 11:07:36.980 Page out of focus View Time Paused. Videos Paused. | Page is out of focus and all view time counters are paused for all system ads on the page. Video is paused and video view time counter paused. |
| 15:07:42.990 Video 785x573, at From Left 319, Video From Top 72 is available in viewable area 1423x717 scrolling position Horizontal 0,Verticle 85 | Video is scrolled back into viewable area. play and view time counter resumes. |
| 16 11:07:56.280 Ad#1 300x250, at 562,253 is obstructed by enlarged Video time | Ad#1 is obstructed by video or within the visible area while video is playing. View for the obstructed ad is paused. |

In a preferred embodiment, the following steps can be programmed to be required to occur in order to count a viewable impression:

1) (ref step 3) Ad#1 space marked up impression reported. The ad space must be marked up. Since web pages typically are larger than viewer browser window dimensions, and a browser window's dimensions are a variable that is defined by the viewer's screen resolution, the ad space's location on the web page must be marked up by HTML code, so it can be identified by the correlator code when the page will be rendered by browser.

2) (ref step 5) Page Loaded in 6.725 sec system correlator code run. In order not to slow down the loading of the page content, the correlator code runs only after the browser fires the "page loaded" event. The rendering of the web page is an essential precursor in identifying the ad space location in relation to the viewable area of a browser window dimensions, which are defined by an individual's screen resolution. This is a critical element that differentiates such a process from a request of a page by a robot (spider or crawler), which does not render the page.

3) (ref step 6) Page in focus. The system correlator code assumes a web page is out of focus by default except for browsers identified as not having a multi-homepage feature- for those the system assumes that the page is in focus when loaded by default. This way the correlator code prevents the request of ads or the reporting of views until the focus event has been fired by the browser. For browsers that do not fire a focus event when loaded, the system assumes that the web page is in focus when loaded. This does not affect measurement since these browsers do not have the "multi-homepage" feature that require a focus event to be fired for each individual tab for accurate measurement of views in tabs that are not in view.

4) (ref step 7) Ad content request sent. In order to operate efficiently, the system correlator code triggers ad delivery when the ad space touches the visible area of the browser window. If this content rendering module is not the first on the page (all content rendering modules are aware of each other after the "space marked up" event has occurred) then the request will include the ID(s) of all previous ads already selected for this page (and this content rendering module will wait for that list of ID(s) if needed to prevent duplication of ads on the web page.)

5) (ref step 9) Ad content loaded and rendered. "Ad Rendered" reported. When advertising content has loaded and rendered an independent message is sent from the content rendering module to a relational database. At the same time, the content rendering module reports that the content rendered to the correlator code to start tracking if the ad is within the visible area of the browser window. This way, an "ad view" will not be counted until "ad rendered" is reported.

6) (ref step 9) Viewable impression/view event reported, View Time Start. When a predefined portion (e.g., 90%) of the ad content is in the visible area of a viewer's browser window dimensions on an in focus web page for a predefined period (e.g., at least one second), a "viewable impression" or "view event" is reported. View time counting (in seconds) starts. View time counting is paused if the viewer scrolls the ad space out of viewable area, or brings the web page out of focus and resumes counting if viewer scrolls it back into the visible area and/or brings the web page back into focus.

Browser Window Position and Viewer Display Screen Area. A browser window, when reduced in size from a "maximized" state, may be moved by the viewer in three directions: left, right and down. In the event that a portion of the browser window area is moved outside of the viewer's display screen area, an ad residing on the web page in that browser window may no longer be visible to the viewer. With the present invention, when and ad or other content has rendered and reported as a view, if the browser window is moved so that less than a predefined portion (for example, but without limitation, 90%) of the content is within the viewer's screen display area, view time counting is paused. When at least the predefined portion (e.g., 90%) of the ad is moved back within the viewer's display screen area, view time counting resumes. If a web page is requested while a portion of the browser window is positioned outside the viewer's display screen area, and system content rendering area is on the web page requested, if less than the predefined portion (e.g., 90%) of the content rendering area is within the viewer's display screen area, the ad will be requested, and request will be reported, the ad will render, an ad rendered will be reported, but an ad view will not be reported and the view time counter will not start until at least the predefined portion (e.g., 90%) of the ad space is moved within the viewer's display screen window area.

Multi-Home Page or Multi-Tab Session Feature

Figure 35:
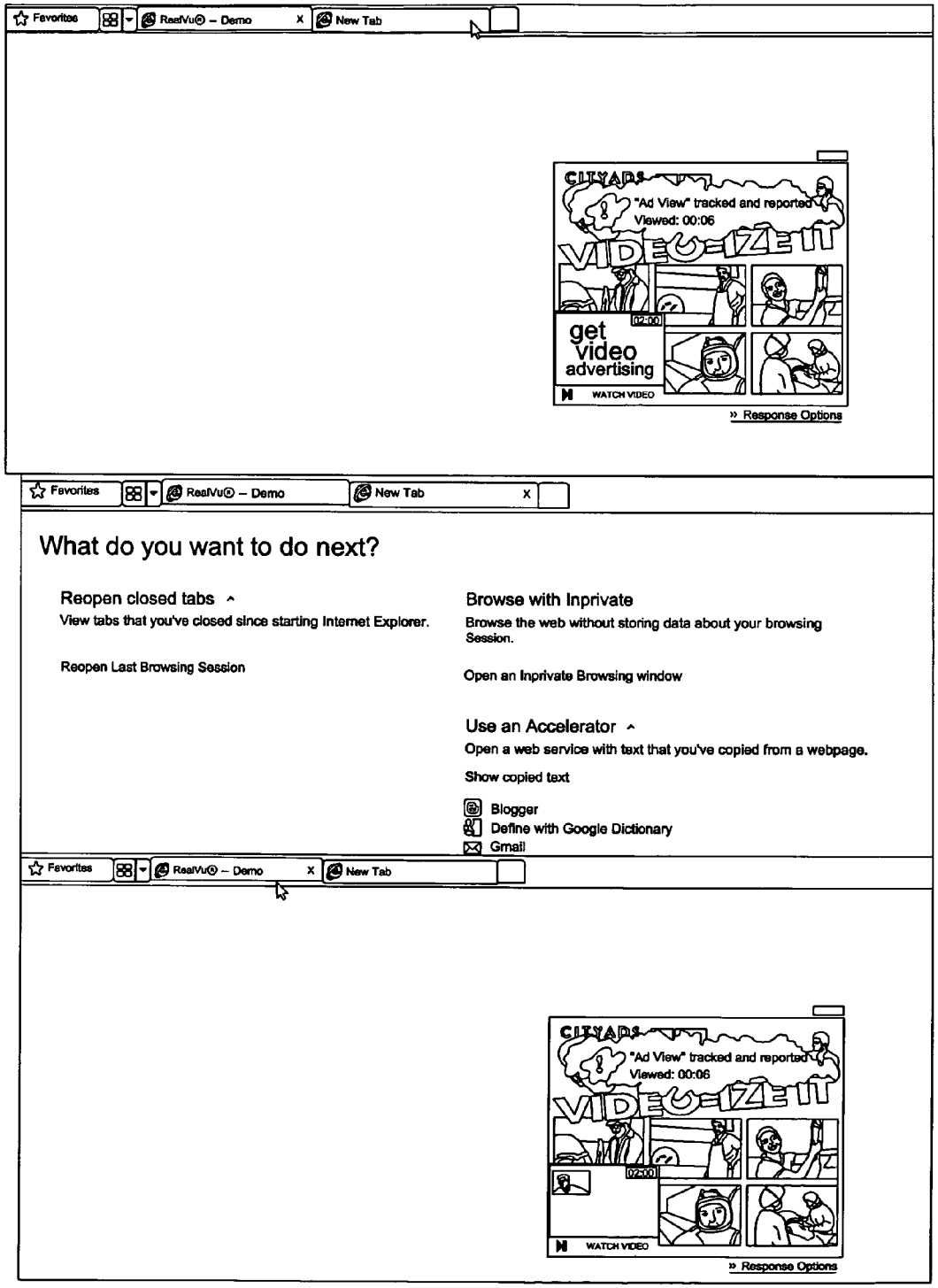
FIG. 35 depicts a sample content page with content rendered and an indicator showing the time period for which the rendered content has been rendered in the designated content rendering area of an electronic content page and the designated content rendering area has been within the viewer's browser screen dimensions and scrolling position, and the content page has been the primary window open on the viewer's display screen and has been unobstructed by another window or application in an embodiment wherein the viewer's browser has a multiple tab feature, with the indicator counting stopped due to the browser window tab for the browser window including the content page with the rendered content being obstructed by another browser window tab being opened, and resuming counting when the viewer returns to the original browser window tab that includes the content page with the rendered content.
Figure 37:
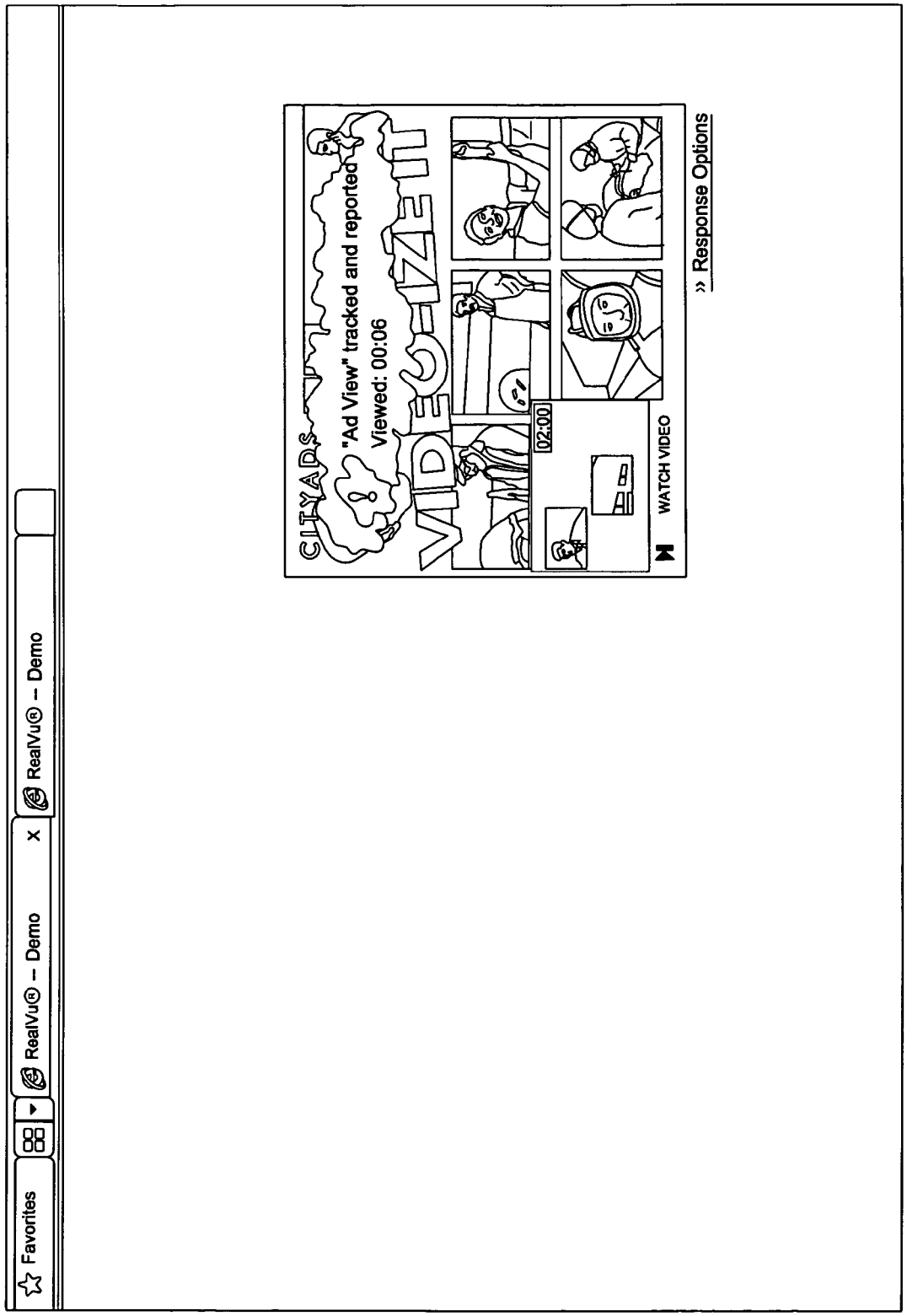
FIG. 37 depicts a sample content page with content rendered and an indicator showing the time period for which the rendered content has been rendered in the designated content rendering area of an electronic content page and the designated content rendering area has been within the viewer's browser screen dimensions and scrolling position, and the content page has been the primary window open on the viewer's display screen and has been unobstructed by another window or application in an embodiment wherein the viewer's browser has a multiple saved home page or multiple saved session feature in which the user opens the browser and multiple browser window tabs open simultaneously to their respective saved pages with only the primary browser window in focus, with the indicator counting the view time with respect to the initial browser window tab. Content on subsequent browser window tabs that are not in focus (i.e., not in view) are not loaded and rendered. Content requests, ad rendered event and view event reporting, and view time counting does not commence until the viewer initiates the respective browser window tab and brings that page into focus (i.e., in view).

Most current browsers support a multi-home page and/or multi-tab session feature where users can save multiple web content pages under different tabs. When the user opens the browser, all pages saved will be loaded simultaneously in all tabs, even in tabs that are not in focus. In the event that this happens, a content rendering module would be in the viewable area of the browser dimensions for all the tabs opened, but only in focus for the default (in front) tab. FIG. 37 depicts a sample content page with content rendered and an indicator showing the time period for which the rendered content has been "in view," i.e., the time period in which the content has been rendered in the designated content rendering area of an electronic content page and the designated content rendering area has been within the viewer's browser screen dimensions and scrolling position, and the content page has been the primary window open on the viewer's display screen and has been unobstructed by another window or application in an embodiment wherein the viewer's browser has a multiple saved home page or saved session feature, where the user opens the browser and multiple browser window tabs open simultaneously to their respective saved pages with only the primary browser window in focus, with the indicator counting the view time with respect to the initial browser window tab. Content on subsequent browser window tabs that are not in focus (i.e., not in view) are not loaded and rendered. Content requests, ad rendered event and view event reporting and view time counting does not commence until the viewer initiates the respective browser window tab and brings the particular page into focus (i.e., in view). If the web page under the second tab is not in focus and a content rendering module located within the viewable area of the browser is on that page, the correlator code considers the page not in focus and the request for ad is not sent until the tab is clicked by the viewer and the web page is brought into focus. With browsers that support a multi-home page or multi-tab session feature, the system determines which page/tab is in focus initially. FIG. 35 depicts a sample content page with content rendered and an indicator showing the time period for which the rendered content has been rendered in the designated content rendering area of an electronic content page and the designated content rendering area has been within the viewer's browser screen dimensions and scrolling position, and the content page has been the primary window open on the viewer's display screen and has been unobstructed by another window or application in an embodiment wherein the viewer's browser has a multiple tab feature, with the indicator counting stopped due to the browser window tab for the browser window including the content page with the rendered content being obstructed by another browser window tab being opened, and resuming counting when the viewer returns to the original browser window tab that includes the content page with the rendered content. As shown in FIG. 35, the window at the top depicts a content page with content rendered in a designated content rendering area of the page and the designated content rendering area is within the viewer's browser window dimensions and scrolling position and the content page is the primary window open on the viewer's display device screen and is unobstructed by another window or application, showing "view time" at 20 seconds. At that point in time, if the viewer opens a new browser tab as indicated in the middle window in the middle of FIG. 35, the "view time" counter stops. If the viewer then returns to the original browser tab that had the content page with the content rendered in the designated content rendering area with the content rendering area within the viewer's browser window dimensions and scrolling position, the return to the original tab causing the content page to again be the primary window open on the viewer's display device screen unobstructed by another window or application, the "view time" counter resumes counting.

Video and Video Pre-Roll

The system in a preferred embodiment includes a video and video pre-roll feature including a "Watch Video" preview button that is set within an ad display and plays a 10 second loop of the video without sound. When a viewer clicks on the Watch Video preview button a larger video window expands to a larger size of the viewable area of the browser window, such as, without limitation, ¾ of the size of the viewable area of the browser window. If a video pre-roll ad campaign was activated in the account where the video originated from, the pre-roll video will play first, and all metrics are reported for the pre-roll video advertisement like any other ad. After playing for one second a view is reported for the pre-roll. View Time is counted for a predefined period. When viewers scroll the web page up or down, the video window will remain within the visible area of the browser window. If the viewer brings the web page that the video is on out of focus, by either minimizing the browser, opening another tab in the browser, or opening another browser or application, video play and view time counting is paused. When the viewer brings the web page that the video is on back into focus video play and view time counting resumes.

In one embodiment, video that is not broadcast as a pre-roll ad works with the same functionality but only a Video View is reported after the video has played for predefined period, such as, for example but without limitation, for at least one second. In one embodiment, view time is not reported for video that is not distributed as a pre-roll ad. If an ad is rendered on the page where a video window is opened, the ad is considered obstructed and view time does not begin. The counting is paused until the video window is closed, at which time view time counting initiates or resumes. An ad may still be visible and considered obstructed if a video window is opened on the same page. Viewer's may click on the expand button on an open video window to expand the video to full screen mode. All ads on the page are considered obstructed when this action is taken.

Filtration of Data

Internal Traffic

In a preferred embodiment, the system user interface offers users the ability to enter any number of IP addresses or IP address ranges for filtering. This engine allows advertisers and web publishers to retrieve reports that hide or view traffic generated by users associated with those IP addresses. When in the reporting interface, users select "hide internal traffic" (exclude) from the "Filters" drop down menu and all traffic from IP addresses entered in the account will be excluded from the report. In the system back office interface users enter IP address by selecting Ad/Edit IP and entering the desired IP addresses to be filtered. The particular user's IP address is revealed to the user for reference. Most impression measurement limitations with ad delivery and reporting occur due to the fact that the reporting of an impression is represented in a server log file record left by a request for an ad or ad beacon. This point of request always happens before the ad content is loaded and rendered in the viewer's browser. Because system architecture is based on monitoring by the correlator code on the client-side and requires a number of events to be executed in the viewer's browser and reported directly to a server side relational database to track a view or click, some limitations previously noted for log file impression methodologies are overcome.

Robots, Spiders and Crawlers

Internet bots, also known as web robots, are software applications that run automated tasks over the Internet. Typically, robots perform tasks that are both simple and structurally repetitive, at a much higher rate than would be possible for a human alone. The largest use of robots is in web spidering, in which an automated script fetches, analyses and files information from web servers at many times the speed of a human. Each server can have a file called robots.txt, containing rules for the spidering of that server that the robot is supposed to obey. A Web crawler is one type of robot or software agent. In general, it starts with a list of URLs to visit, called the seeds. As the crawler visits these URLs, it identifies all the hyperlinks in the page and adds them to the list of URLs to visit, called the crawl frontier. URLs from the frontier are recursively visited according to a set of policies. In addition to spiders and crawlers creating ad impressions that do not actually appear, they can also create non-human clicks. Some web crawlers are able to correctly handle almost any variants of javascript redirects. To "filter" all of this non-human activity, techniques are employed based on identifiers such as blacklists, activity and patterns based on data in log files in an attempt to identify and filter (exclude) invalid activity. The user agent values in the HTTP headers of requests to the ad server delivery engines are compared to the blacklists described above and any that include a matching user agent string are filtered from count processing. The present invention makes such filtering techniques unnecessary. The system architecture overcomes the measurement limitations of spiders, bots and crawlers in a number of ways. System architecture in a preferred embodiment is based on the processing of each http request before it is stored in a database by a server side application. This allows for the verifying on the system application level of the nature of the HTTP to detect whether the request has originated from a legitimate browser, prior to retrieving data from a request and recording it in the reporting database. The system platform, at the point of a tag request, saves every unique user agent signature and IP address in a database. Whether the signature declares that it's a legitimate browser or not, it is allowed to continue in the system process described above, but the agent is flagged and activity data related to the a non-human agent is not reported as legitimate activity. If the agent gets to the point of reporting an "ad render" event the agent is flagged as such. Then the agent, if it can continue to register and report a "view" event is also flagged as such. If this signature is a non-human agent and has made it the point of registering a "view" event it is flagged as a "Bad User-Agent." If this "Bad User-Agent" arrives again to make a request it will not be allowed to render the correlator code or initiate any aspect of the system process. By initiating this process, the database may later be analyzed to determine both non-human agents disguising themselves as legitimate browsers (numerous requests from an "legitimate browser" agent that never manages to get through the system process described above) but also if a non-human agent does manage to register a "view" event. This method of determining non-human agents at the point of request on the system application level is much more reliable than the black-list filtration process which happens later and after the ad serving process and deals only with text left in a log file. With blacklist filtration methods, non-human agents are determined based on their text "signature" which is very often incomplete and may be altered intentionally by the creator of the non-human agent, essentially disguising the agent as a legitimate browser or providing an empty or inaccurate user agent string. Also, with the system architecture, server log files are not used in reporting. In order for a view or click to be reported, all events described earlier for a viewable impression to be counted. The web page must be rendered and in focus, and the correlator code must find that the ad space is within the visible area of a user's browser window. The correlator code performs a number of actions and demands a number of parameters and variables related to: a) viewer's display monitor screen dimensions; b) browser position and the viewable area browser window relative to the screen dimensions; c) whether the browser is in focus; and d) where is the ad space is located on the rendered web page relative to the browser window and scrolling position.

Caching

Web caches are employed by web browsers and web proxy servers to store previous responses from web servers, such as web pages. Web caches reduce the amount of information that needs to be transmitted across the network, as information previously stored in the cache can often be re-used. This reduces bandwidth and processing requirements of the web server, and helps to improve responsiveness for users of the web. Typically caching can result in the undercounting of views because ads or beacons can be delivered from the cache without registering a request in the server log file counting a view. Cache busting techniques, such as random number assignment to identify unique serving occurrences of pages/ads have typically been necessary to overcome this limitation. With the present invention in a preferred embodiment, caching can make ad delivery and reporting more efficient by reducing the need to re-distribute necessary code already loaded. The two elements that may get cached are the javascript tags, and the .swf files (content rendering modules) which are self contained files that render ads requested from the server side ad content database. However, ad content that is delivered to the module from the database is dynamically assembled inside the module and does not get cached. In the present invention, caching has no impact on measurement.

Abandonment

With server log file tracking, if a user abandons the web page after the ad or counting beacon request, but prior to delivery of the ad content, an impression can be reported. Web pages and respective ad content may take seconds to load, as opposed to a request, which can be logged in a fraction of a second. In the present invention in a preferred embodiment, server log files are not used in reporting. In order for a view or click to be reported, all events on the client side described above must occur. If a user abandons a web page before these steps have occurred, a view is not reported. With the present invention, web page abandonment has no impact on measurement.

User-Side Barriers

Typical server log files track an impression at the point of the ad request, and if a user-side barrier such as ad blocking software installed by a viewer, recognizes the advertising content as such, the ad will be blocked and unavailable for view while an impression is counted. In the case of a beacon, the ad content may be blocked but the software does not suppress the beacon which would also result in over counting. With the present invention in a preferred embodiment, if a user utilizes an ad blocking software or configures their browser to block images or javascript, ad views are neither over nor under counted because the system content rendering module, which actually loads and renders an ad and sends all reports, has not actually loaded or rendered. With the present invention, user-side barriers have no impact on measurement of ad views.

Creative Formats

With respect to ad formats, there are typically some types (primarily rich media) that may not render in a viewer's browser that is not updated with the proper plug-in or configured to display the ad format properly. With typical server log file tracking, in these cases, an ad impression would be reported, but the ad content would not actually appear. For this reason, with typical server log file platforms, an alternative file type (e.g., .jpg or .gif image file) would need to be specified as a secondary creative whenever a rich-media file type (e.g., Flash) is specified as the primary creative. With the present invention in a preferred embodiment, the ad content must be fully rendered on an in focus web page in the visible area of a user's browser window and all steps previously described above must occur before a view is reported. If any of these steps do not occur because of an issue with the display of a creative format, a view is not reported. With the present invention creative ad formats have no impact on the measurement process.

Mobile Devices

Since non-PC devices such as Blackberry and mobile phones register ad requests in server log files, server log file tracking systems typically result in impressions that do not manifest as views. Mobile device browser capabilities are not currently up to par with computer browsers with respect to javascript functionality required to support the present invention. With the present invention in a preferred embodiment, any request from a non-PC device such as Blackberry handheld devices will not result in a rendering of an ad and consequently will not result in the counting of an ad view. With the present invention in a preferred embodiment mobile devices have no impact on the measurement process.

Video Pre-Roll Browser Focus

Video pre-roll is advertising that runs prior to a video demanded by an online viewer. Pre-roll advertising view reporting is considered highly accurate due to the fact that a viewer has to initiate the video to start playing, and the delivery of the pre-roll advertisement. Because of this perceived high level of view count accuracy pre-roll advertising garners the highest advertising cost per impression rates in the industry. A significant percentage of these viewers scroll the video out if the visible area of their browser window, minimize their browser or open another application over the browser window playing the video as the pre-roll commences, resulting in an over-counting of actual views. The present invention in a preferred embodiment overcomes this limitation by offering a video and pre-roll video advertising feature which automatically pauses the video if the browser window is scrolled outside of the visible area of the browser window, minimized, tabbed away from or another window is opened by the user. The video resumes playing when scrolled back into the visible area and/or the web page is brought back into focus. Video view time is reported considering these viewer actions.

Hidden Browser Window

In user interface programming, a window, in this case browser window, can be created as a hidden or invisible window. The hidden window can be made visible, hidden back or destroyed. With the present invention, as with all user activity, any webpage which is not in focus will not request, load and render an ad, therefore hidden browser windows have no effect on measurement.

Pop-Unders

Pop-Up windows "pops up" over the parent window. When the parent window is overlaid (covered) by another application window on a screen, the pop-up window becomes "pop-under" that another application window thus is not available to view by user. Such a window will be out of focus and all the System rules and features will act the same way they do in any other browser window (i.e., 'view time' will stop when it gets out of focus and starts counting when it gets to focus.) If the pop-under is brought into focus and a view is recorded, this view would be legitimate. With the present invention, pop-unders have no effect on measurement.

Data Reporting. In a preferred embodiment, system reports for website publishers can provide views in particular website sections, website pages or rendering areas and drill down to detailed specifics, while advertisers can see reports related to their advertising campaigns, including which websites, website sections and rendering areas that their ads appeared on.

Analytics Mode

In one embodiment of the present invention, tags for the analysis of the activity associated with pre-defined content page areas based on actual viewership (when an area is available in the visible area of viewer's browser window) can be implemented in order to gather measurement data for viewer activity with respect to content pages without also using the system features for content delivery through the platform. The system analytics offers web publishers, agencies and advertisers never before seen insight into the performance different areas of web pages, actual available advertising inventory, reach, frequency, viewer display resolutions, visible browser window dimensions, scrolling position at the point of view and geographic location. Transparent content rendering areas are placed on various areas of a content page to gather the data via correlator codes sent to such areas via the system. In such embodiment, the user interacts with the system ad described above and designates one or more content rendering areas on a designated content page for monitoring and data gathering, but does not designate via the system the content files to be rendered in the content rendering areas.

Overview Report for Web Publishers

For website/website section (which may contain multiple rendering areas or ad spaces) and levels, the reporting categories can include, in a preferred embodiment:

Ad/content requests

Ads Rendered (ads load and render when the ad space hits the visible area of an in focus browser window)

Viewable impressions/view events (Ads rendered that have 90% of the their content within the visible area browser window on an in focus web page.)

Clicks

Ad View Rate (percentage of viewable impressions/view events against requests)

Click rate (click percentage against viewable impressions/view events)

Videos watched

Detailed Reports for Web Publishers

Summary

Performance details (viewable impressions/view events and clicks per month, day, hour or 15 min increment)

Individual Reach and Frequency (Browser cookies)

View Time (Display ad and Video View Time are both reported at 1, 2, 3, 5, 10, 15, 20, and 30 seconds)

Ads Broadcasted

Broadcast URL's (i.e., the uniform resource locator addresses of the pages where content was rendered)

Viewer Display Resolution (px)

Avg Viewable Area (px)

Screen/Viewable Area Proportions

Avg Vertical Scroll (px)

Avg Horizontal Scroll (px)

Scrolling position at the time view is reported

Geographic distribution of viewers

Viewer Browser Types

Activity log for each view

Figure 38:
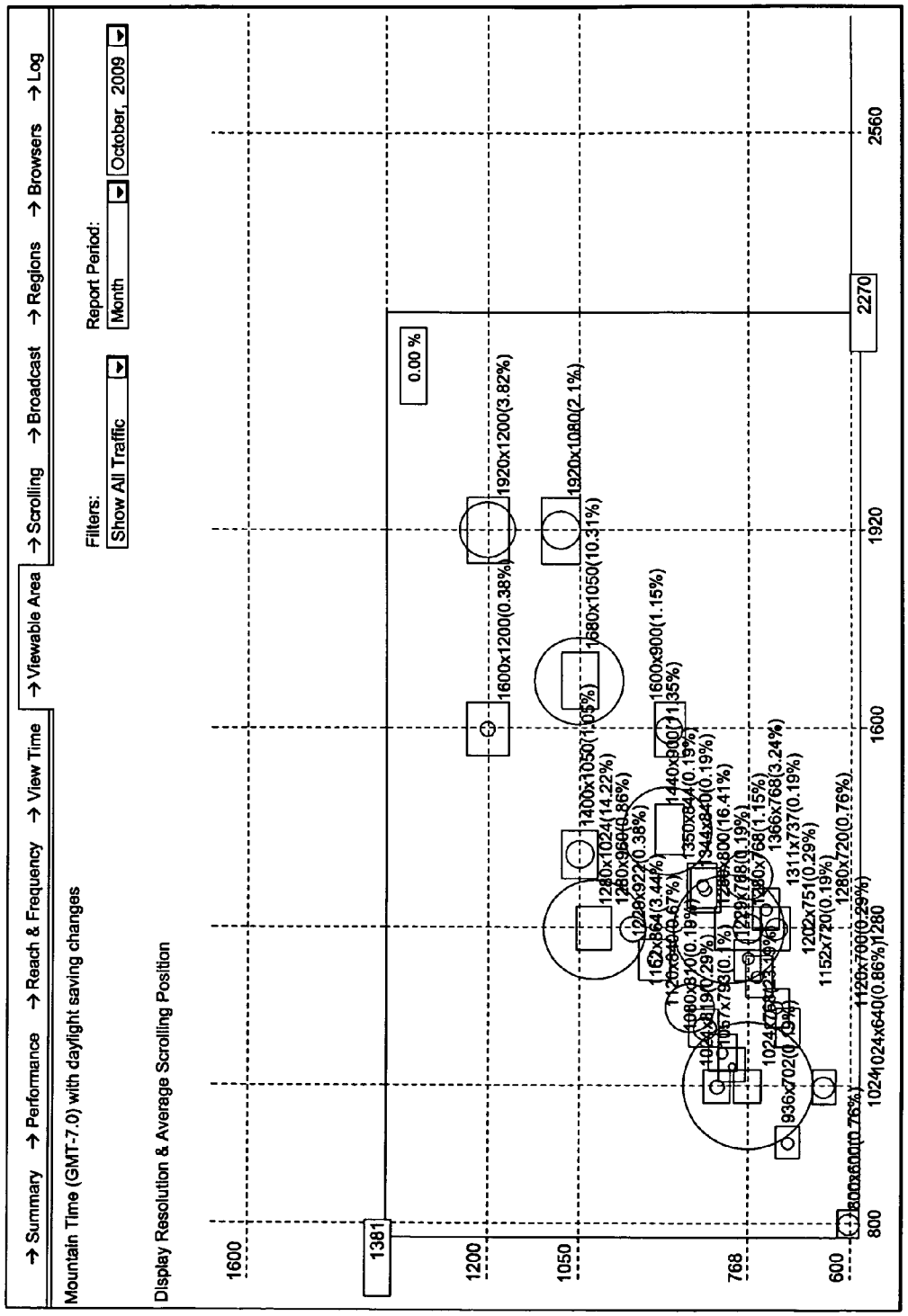
FIG. 38 depicts a sample system graphical report showing system users the display resolution and scrolling position of viewers that received viewable impressions of rendered content via the system, allowing system users to determine how many viewers will view rendered content on content pages without scrolling, based on varied content page dimensions.

FIG. 38 is a sample system graphical report showing system users the display resolution and scrolling position of viewers that received viewable impressions of rendered content via the system, allowing system users to determine how many viewers will view rendered content on content pages without scrolling, based on varied content page dimensions.

FIG. 39 is a sample system graphical report showing system users the display resolution, browser window dimensions and scrolling positions of viewers that received viewable impressions of rendered content via the system, also showing average viewable area, total views, percentage of views as compared to requests or renderings, average vertical scroll in pixels or other units and average horizontal scroll in pixels or other units.

Figure 40:
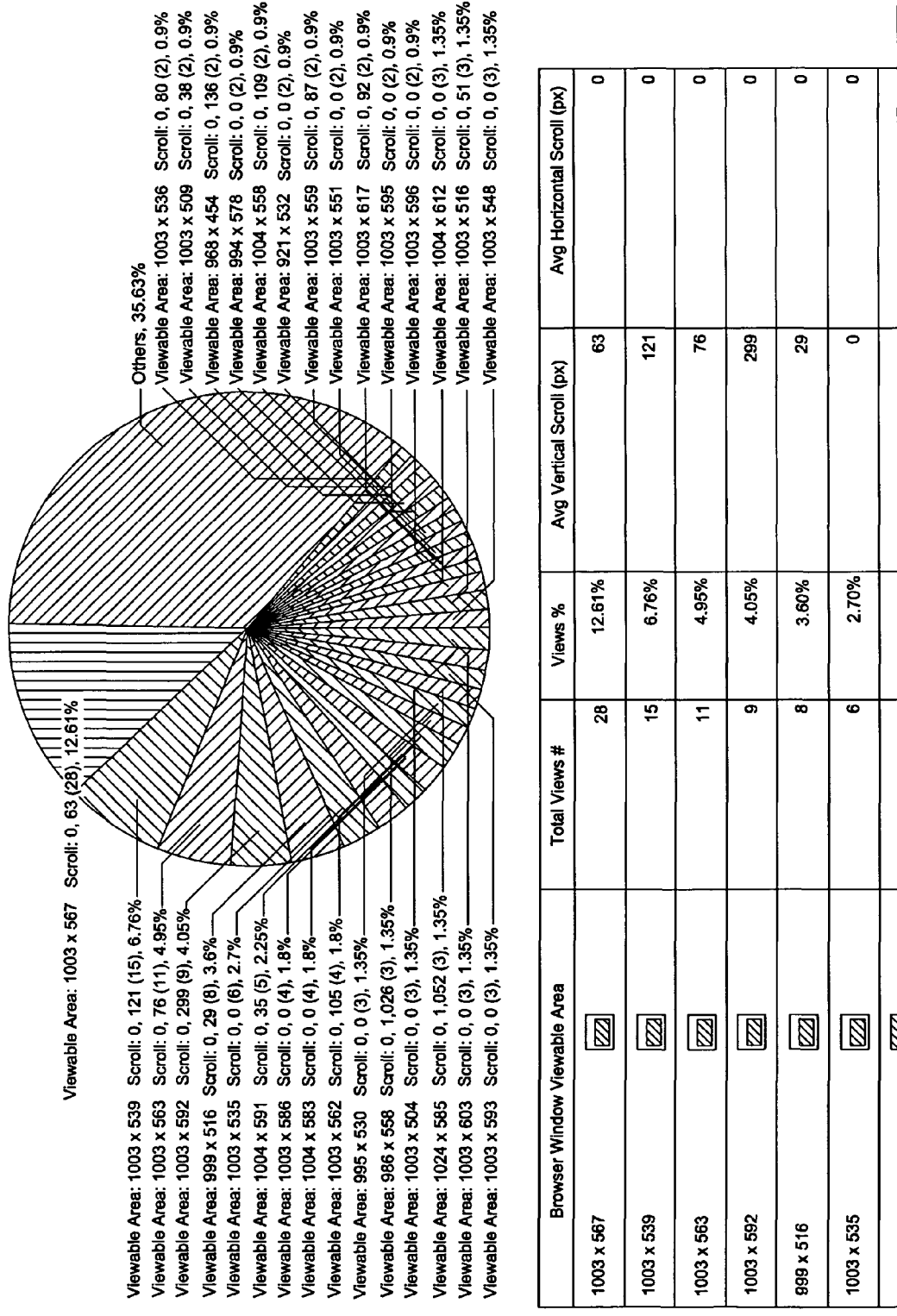
FIG. 40 depicts a sample system graphical report showing viewer browser window dimensions and scrolling positions, indicating browser window viewable area, total views, percentage of views as compared to requests or renderings, average vertical scroll in pixels or other units and average horizontal scroll in pixels or other units. The graph shows a breakdown of various viewable area and scrolling positions for all or a designated portion of the user data.

FIG. 40 is a sample system graphical report showing viewer browser window dimensions and scrolling positions, indicating browser window viewable area, total views, percentage of views as compared to requests or renderings, average vertical scroll in pixels or other units and average horizontal scroll in pixels or other units. The graph shows a breakdown of various viewable area and scrolling positions for all or a designated portion of the user data.

FIG. 41 is a sample system graphical report showing viewer vertical and horizontal scrolling positions at the time that a view event is reported, also showing vertical scroll distribution and horizontal scroll distribution of data, average display resolution, average viewable area and average scroll.

FIG. 42 depicts a sample system graphical report showing a client-side activity log, tabulating times of particular events, content placement ID, content rendering module ID, the unique identifier assigned to a content page/rendering area/content and other parameter system stored data file, viewer Internet Protocol address, operating system, browser type, the particular action (e.g., rendered event, view event, or other as designated), browser and/or viewer display device screen dimensions by width and height and scrolling position (horizontal and vertical) as well as applicable time. System users can select particular data items such as those listed above to be included in the reports and for desired data tracking and can designate the time period to be covered by a report and designate whether to show all traffic data or to filter out designated data items.

System reports can be configured to include and report any measureable event or action, including any one or more of the types of measureable data listed above for any designated date, time period or other measureable parameter. Reports can be aggregated by website section or content rendering area, and parsed by month, day and 15 minute or other increments.

Overview Report for Advertisers

In a preferred embodiment, report categories can include, for campaign (which can contain multiple ads) and ad levels:

Ads Rendered

Viewable impressions/view events

Clicks

Click Rate (click percentage against viewable impressions/view events)

Videos Watched

Detailed Reports for Advertisers

Summary

Performance details (viewable impressions/view events and clicks per month, day, hour or 15 min increment)

Individual Reach and Frequency (Browser cookies),

View Time (Display ad and Video View Time are both reported at 1, 2, 3, 5, 10, 15, 20, and 30 seconds)

Ads Broadcasted

Broadcast URL's (i.e., the uniform resource locator addresses of the pages where content was rendered)

Viewer Display Resolution (px)

Avg Viewable Area (px)

Screen/Viewable Area Proportions

Avg Vertical Scroll (px)

Avg Horizontal Scroll (px)

Scrolling position at the time view is reported

Geographic distribution of viewers

Viewer Browser Types

Activity log for each view

FIG. 38 is a sample system graphical report showing system users the display resolution and scrolling position of viewers that received viewable impressions of rendered content via the system, allowing system users to determine how many viewers will view rendered content on content pages without scrolling, based on varied content page dimensions.

FIG. 39 is a sample system graphical report showing system users the display resolution, browser window dimensions and scrolling positions of viewers that received viewable impressions of rendered content via the system, also showing average viewable area, total views, percentage of views as compared to requests or renderings, average vertical scroll in pixels or other units and average horizontal scroll in pixels or other units.

FIG. 40 is a sample system graphical report showing viewer browser window dimensions and scrolling positions, indicating browser window viewable area, total views, percentage of views as compared to requests or renderings, average vertical scroll in pixels or other units and average horizontal scroll in pixels or other units. The graph shows a breakdown of various viewable area and scrolling positions for all or a designated portion of the user data.

FIG. 41 is a sample system graphical report showing viewer vertical and horizontal scrolling positions at the time that an event is reported, also showing vertical scroll distribution and horizontal scroll distribution of data, average display resolution, average viewable area and average scroll.

FIG. 42 depicts a sample system graphical report showing a client-side activity log, tabulating times of particular events, content placement ID, content rendering module ID, the unique identifier assigned to a content page/rendering area/content and other parameter system stored data file, viewer Internet Protocol address, operating system, browser type, the particular action (e.g., rendered event, view event, or other as designated), browser and/or viewer display device screen dimensions by width and height and scrolling position (horizontal and vertical) as well as applicable time. System users can select particular data items such as those listed above to be included in the reports and for desired data tracking and can designate the time period to be covered by a report and designate whether to show all traffic data or to filter out designated data items.

System reports can be configured to include and report any measureable event or action, including any one or more of the types of measureable data listed above for any designated date, time period or other measureable parameter. Reports can be aggregated by campaign or individual ads and parsed by month, day, hour or 15 minute or other increments.

Time Zone

Reports in a preferred embodiment can be presented in each user account based on the user account local time zone, considering daylight savings time, which is determined by the zip code entered online during the registration of each account. Users may change the time zone setting of their account.

Activity Log Report

Client side activity logs for each recorded view are available to users in their back-office reports section of the system user interface. Logs show all client side activity for any website section, ad rendering area or ad space or ad recorded. This information can be useful for analysis and fraud prevention. Users can sort logs by clicking on the column names and search for particular logs by entering a search term, such as IP address, in the find field.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative and other embodiments may be selected without departing from the spirit and scope of the present invention.

What is claimed is:

1. A system for controlling and monitoring the rendering of electronic content to a viewer via an electronic communications network, comprising:

a system-end computer equipped and configured for communications via said electronic communications network, including one or more computer processors and one or more system servers communicating via said electronic communications network with one or more electronic content pages, said one or more electronic content pages having one or more content rendering areas, said one or more electronic content pages being remotely accessible via said electronic communications network by a viewer, said viewer having an electronic network communications device with a browser application having a window having a viewable area defined by said window's dimensions and scrolling position for perceiving said one or more electronic content pages, said viewer's electronic network communications device further comprising a display screen for perceiving said browser window;

said system further comprising an electronic database for storing one or more data records identifying said one or more electronic content pages, and said one or more content rendering areas within said one or more electronic content pages, and one or more electronic content files for rendering at said one or more content rendering areas;

one or more electronic content file servers for storing said one or more electronic content files;

one or more electronic network communications interface software applications providing an electronic user interface for receiving from system users communicating via said electronic communications network data designating one or more of said electronic content pages, one or more of said content rendering areas within said one or more electronic content pages and one or more of said electronic content files for rendering at said one or more content rendering areas, and for creating a stored data record of the one or more data records for storage in said electronic database containing said data;

a tag that is generated by a said system software application for placement on said designated one or more electronic content pages, said tag having a reference to said stored data record and a link to said system software application, said tag, when the electronic content page wherein said tag is placed is requested by said viewer communicating via said electronic communications network via said electronic network communications device and browser application, causing a communication to be sent from said electronic content page wherein said tag is placed to said system custom software application;

a system software application executing when said communication from said tag is received to retrieve said data from said stored data record corresponding to said data record referenced in said tag and generating and writing to said designated electronic content page a correlator code;

a correlator code that is generated by said system software application and is written to said designated electronic content page, said correlator code generating a marker for said one or more content rendering areas on said one or more electronic content pages designated in said stored data record and causing said one or more electronic content files designated in said stored data record to be retrieved and loaded at said one or more designated content rendering areas designated in said stored data record; and said correlator code further determining, via retrieval of information from said browser application, whether a said content rendering area designated in said stored data record is within said browser window dimensions and scrolling position and whether said browser window is the primary window open on said display screen of said viewer's electronic network communications device and causing said one or more electronic content files designated in said stored data record to be rendered at said one or more content rendering areas of said one or more electronic content pages designated in said stored data record if a predefined area of said electronic content page is within said viewer's browser window dimensions and scrolling position and said browser window is the primary window open on said display screen of said viewer's electronic network communications device.

2. The system of claim 1, wherein said predefined area of said electronic content page is within said designated content rendering area.

3. The system of claim 1, wherein said correlator code further monitors the time period in which said content rendering area is within said browser's window viewable area and said browser window is the primary window open on said viewer's display screen.

4. The system of claim 1, wherein said correlator code further monitors the proportional extent to which said content rendering area of said electronic content page designated in said stored data record is within said browser window dimensions and scrolling position.

5. The system of claim 1, wherein said correlator code further monitors whether said browser window is obstructed from view on said viewer's display screen by another application window.

6. The system of claim 1, wherein said correlator code transmits monitoring data collected by said correlator code to a said system server.

7. The system of claim 6, wherein said correlator code transmits said monitoring data on a real-time basis.

8. The system of claim 6, wherein said correlator code transmits said monitoring data periodically in predefined increments.

9. The system of claim 6, wherein said correlator code transmits said monitoring data via a one-way nonconversational message sent from said correlator code to said system server in the form of a query string and URL corresponding to said system server.

10. The system of claim 6, further comprising one or more system software applications for processing data retrieved from viewer page requests and retrieved via said correlator code from said viewer browser, said data comprising one or more data items selected from the group consisting of viewer identification, viewer geographic location, viewer browser type, viewer electronic communication device operating system type, view event duration, view event time, content rendering frequency, content rendering reach, viewer click-activity with respect to said electronic content files rendered in said content rendering area designated in said stored file, viewer display device viewable area dimensions, viewer browser window dimensions, viewer browser window scrolling position and viewer browser window in-focus status, and generating one or more system user reports regarding said data.

11. The system of claim 1, wherein said correlator code further detects viewer-end activity with respect to said one or more electronic content files designated in said stored data record.

12. The system of claim 11, wherein said one or more system software applications detect whether said viewer-end activity with respect to said one or more electronic content pages designated in said stored data record is manual activity.

13. The system of claim 11, wherein said one or more system software applications detect whether said viewer-end activity with respect to said one or more electronic content pages is automated activity.

14. The system of claim 1, wherein said one or more system software applications measure and record a view event with respect to a said electronic content file designated in said stored data record and a said content rendering area of said electronic content page designated in said stored data record if said electronic content file is rendered at said content rendering area of said electronic content page and a predefined proportion of said content rendering area is within said viewer browser window viewable area and said browser window is the primary window open on said viewer's display screen.

15. The system of claim 1, wherein said one or more system software applications measure and record a view event with respect to a said electronic content file designated in said stored data record and a said content rendering area of said electronic content page if said electronic content file is rendered at said content rendering area of said electronic content page and said content rendering area is within said viewer browser window viewable area and said browser window is the primary window open on said viewer's display screen for a predefined period of time.

16. The system of claim 1, wherein said one or more system software applications measure and record a content rendered event with respect to a said electronic content file designated in said stored data record and a said content rendering area of said electronic content page if said electronic content file is rendered at said content rendering area of said electronic content page.

17. The system of claim 1, wherein said one or more system software applications generate a dynamic log of system activity events in relation to rendering of said one or more electronic content files at said electronic content page occurring in response to viewer activity events in relation to said electronic content page, said dynamic log being generated in a real-time manner as said system activity events and said viewer activity events occur.

18. The system of claim 17, wherein said dynamic log of events is displayed to a system user in a window displayed adjacent to said electronic content page wherein said one or more electronic content files are designated to be rendered.

19. The system of claim 17, wherein said dynamic log is provided to a system user apart from said electronic content page via a system user interface.

20. The system of claim 1, wherein said one or more system software applications provide a user interface for users to designate a broadcast schedule for said one or more electronic content files designated in said stored data record to be available for rendering at said one or more content rendering areas of said one or more electronic content pages designated in said stored data record.

21. The system of claim 1, wherein said electronic content page wherein said one or more electronic content files are to be rendered has a rendering mode, and wherein said system-generated tag placed on said electronic content page is capable of functioning to interact with said system server-side application regardless of the rendering mode utilized by said electronic content page wherein said tag is placed.

22. The system of claim 1, wherein said one or more system software applications comprise an application for controlling the placement of said tag on said electronic content page to ensure correct placement of said tag when said tag is placed within a table.

23. The system of claim 1, wherein said one or more system software applications comprise an application for controlling the placement of said tag on said electronic content page to ensure correct placement of said tag when said tag is placed on a electronic content page that has a layer positioned to overlap a said content rendering area on said electronic content page.

24. The system of claim 1, wherein said one or more system software applications comprise an application for controlling the placement of said tag on said electronic content page to ensure correct placement of said tag when said tag is placed within a <div> layer of an electronic content page that has more than one layer.

25. The system of claim 1, wherein said one or more system software applications comprise an application for controlling the placement of said tag on said electronic content page to ensure correct placement of said tag when said tag is placed within a <div> layer of an electronic content page that has more than one layer and a layer overlaps a said content rendering area on said electronic content page.

26. The system of claim 1, wherein said one or more system software applications comprise an application for controlling the placement of said tag on said electronic content page to ensure correct placement of said tag when said tag is placed within a table within a <div> layer of an electronic content page that has more than one layer.

27. The system of claim 1, wherein said electronic content page is served by a server having an Internet domain, and wherein the number of unique browser users and the number of times each said unique browser user viewed an electronic content file at a content rendering page area of an electronic content page is tracked by retrieving information from cookies, and wherein the cookies from which said information is retrieved are only those cookies set by said server or another server having the same Internet domain as said server.

28. The system of claim 1, wherein said browser has two or more pages loaded at the same time and wherein said correlator code detects which of said two or more pages is the primary page viewable on said viewer's display screen.

29. The system of claim 28, wherein said one or more system software applications measure and record a view event with respect to a said electronic content file designated in said stored data record and a said content rendering area of said electronic content page if said electronic content file is rendered at said content rendering area of said electronic content page and said content rendering area is within the viewable area of one of said pages of said browser and said page is the primary page open on said viewer's display screen for a predefined period of time.

30. The system of claim 1, wherein said one or more software applications generate a watch video preview button for display on said electronic content page which when activated by a viewer causes a video window to expand to cover a larger portion of the viewable area of said viewer's browser window than said watch video preview button and causes a video content file designated in said stored file to render, said expanded video window remaining within the viewable area of said browser window even when said viewer scrolls up or down said electronic content page.

31. The system of claim 30, wherein said correlator code measures the time period in which said video content file is rendered.

32. The system of claim 31, wherein said video content file rendering and said correlator code's measurement of the time period in which said video content file is rendered pauses if said viewer causes said browser window to not be the primary unobstructed window open on said viewers' display screen before said video content file has been fully rendered, and wherein said video content file rendering and said correlator code's measurement of the time period in which said video content file is rendered resumes if said browser window again becomes the primary unobstructed window open on said viewer's display screen.

33. The system of claim 30, wherein said watch video preview button displays a preview loop of said video content file before said watch video preview button is activated by said viewer.

34. The system of claim 3, wherein said correlator code's measurement of the time period in which said content rendering area is within said browser window's dimensions and scrolling position and said browser window is the primary window open on said viewer's display screen pauses if said viewer causes said browser window to not be the primary unobstructed window open on said viewers' display screen and wherein said correlator code's measurement of said time period resumes if said content rendering area is within said browser window's dimensions and scrolling position and said browser window is the primary window open on said viewer's display screen and said electronic content file is still rendered in said content rendering area.

35. The system of claim 1, wherein said one or more system software applications further comprise a content rendering module software application that is embedded at a said specified content page rendering area when said correlator code determines that said specified content page rendering area is within the dimensions and scrolling position of said viewer's browser window and communicates with said one or more electronic content servers to retrieve and render said electronic content files designated in said stored data record at said content page rendering area designated in said stored data record.

* * * * *